(12) United States Patent
Takahashi et al.

(10) Patent No.: US 8,910,517 B2
(45) Date of Patent: *Dec. 16, 2014

(54) ANGULAR VELOCITY SENSOR, ELECTRONIC APPARATUS, AND METHOD OF DETECTING AN ANGULAR VELOCITY

(75) Inventors: Kazuo Takahashi, Miyagi (JP); Junichi Honda, Miyagi (JP)

(73) Assignee: Sony Corporation, Tokyo (JP)

( * ) Notice: Subject to any disclaimer, the term of this patent is extended or adjusted under 35 U.S.C. 154(b) by 297 days.

This patent is subject to a terminal disclaimer.

(21) Appl. No.: 13/202,918

(22) PCT Filed: Dec. 2, 2010

(86) PCT No.: PCT/JP2010/007041
§ 371 (c)(1),
(2), (4) Date: Aug. 23, 2011

(87) PCT Pub. No.: WO2011/086633
PCT Pub. Date: Jul. 21, 2011

(65) Prior Publication Data
US 2011/0296914 A1    Dec. 8, 2011

(30) Foreign Application Priority Data
Jan. 12, 2010    (JP) .................. 2010-003786

(51) Int. Cl.
*G01C 19/56*    (2012.01)
*G01C 19/5726*    (2012.01)
*G01C 19/5747*    (2012.01)
*H01L 41/08*    (2006.01)

(52) U.S. Cl.
CPC ........ *G01C 19/5726* (2013.01); *G01C 19/5747* (2013.01); *H01L 41/08* (2013.01)
USPC ..................................................... 73/504.12

(58) Field of Classification Search
USPC ............... 73/504.12, 504.14, 504.15, 504.16, 73/504.04
See application file for complete search history.

(56) References Cited

U.S. PATENT DOCUMENTS 5,203,208 A *    4/1993    Bernstein .................... 73/504.12
5,313,835 A *    5/1994    Dunn .......................... 73/514.15
(Continued)

FOREIGN PATENT DOCUMENTS

JP    06-147902    5/1994
JP    09-014972    1/1997
(Continued)

OTHER PUBLICATIONS

European Search Report issued May 14, 2013 in corresponding European Patent Application No. 10842993.7.

(Continued)

*Primary Examiner* — Helen Kwok
(74) *Attorney, Agent, or Firm* — K&L Gates LLP

(57) ABSTRACT

An angular velocity sensor includes an annular frame, a drive part, and a detection part. The frame has first beams and second beams. The first beams extend in an a-axis direction and are opposed to each other in a b-axis direction orthogonal to the a-axis direction. The second beams extend in the b-axis direction and are opposed to each other in the a-axis direction. The drive part causes the frame to oscillate within an XY plane to which the a-axis and the b-axis belong, in an oscillation mode where, when one of the first and second beams come closer to each other, the other separates from each other. The detection part detects an angular velocity around an axis in the Z-axis direction orthogonal to the XY plane, based on an amount of deformation of the frame oscillating in the oscillation mode within the XY plane.

16 Claims, 31 Drawing Sheets

(56) References Cited

U.S. PATENT DOCUMENTS

| | | | |
|---|---|---|---|
| 5,490,420 A * | 2/1996 | Burdess | 73/504.02 |
| 5,915,276 A | 6/1999 | Fell | |
| 6,192,756 B1 * | 2/2001 | Kikuchi et al. | 73/504.12 |
| 6,227,048 B1 | 5/2001 | Kikuchi et al. | |
| 6,349,597 B1 | 2/2002 | Folkmer et al. | |
| 2007/0151332 A1 | 7/2007 | Nagata et al. | |
| 2010/0199762 A1 * | 8/2010 | Meisel et al. | 73/504.12 |
| 2010/0223996 A1 | 9/2010 | Fukumoto | |
| 2011/0023601 A1 | 2/2011 | Ikeda et al. | |
| 2011/0041606 A1 | 2/2011 | Ikeda et al. | |
| 2012/0216613 A1 * | 8/2012 | Honda | 73/504.15 |

FOREIGN PATENT DOCUMENTS

| | | |
|---|---|---|
| JP | 09-210690 | 8/1997 |
| JP | HEI 10-160783 | 6/1998 |
| JP | HEI 11-64002 | 3/1999 |
| JP | HEI 11-281372 | 10/1999 |
| JP | HEI 11-325917 | 11/1999 |
| JP | 2000-009473 | 1/2000 |
| JP | 2000-283765 | 10/2000 |
| JP | 2001-050751 | 2/2001 |
| JP | 2001-508537 | 6/2001 |
| JP | 2003-240557 | 8/2003 |
| JP | 2005-195574 | 7/2005 |
| JP | 2007-198778 | 8/2007 |
| JP | 2007-333643 | 12/2007 |
| JP | 2009-128135 | 6/2009 |
| JP | 2010-156591 | 7/2010 |
| JP | HEI 11-211481 | 8/2011 |
| JP | 4858662 | 1/2012 |
| WO | 98/17973 | 4/1998 |
| WO | 2009/050021 | 4/2009 |
| WO | 2009/119204 | 10/2009 |
| WO | 2009/119205 | 10/2009 |
| WO | 2009/157246 | 12/2009 |

OTHER PUBLICATIONS

Japanese Written Opinion of the International Searching Authority mailed Jan. 18, 2011 for PCT/JP2010/007041.

Japanese Office Action issued Apr. 30, 2014 in corresponding Japanese Patent Application No. 2010-269805.

Chinese Office Action issued Nov. 1, 2013 in corresponding Chinese Patent Application No. 201080009704.5.

Japanese Office Action issued Jul. 1, 2014 in corresponding Japanese Patent Application No. 2011226515.

* cited by examiner

ANGULAR VELOCITY SENSOR, ELECTRONIC APPARATUS, AND METHOD OF DETECTING AN ANGULAR VELOCITY

CROSS REFERENCE TO RELATED APPLICATIONS

The present application is a National Stage of International Application No. PCT/JP2010/007041 filed on Dec. 2, 2010, which claims priority to Japanese Patent Application No. 2010-003786, filed in the Japanese Patent Office on Jan. 12, 2010, the entire contents of which are being incorporated herein by reference.

BACKGROUND

The present invention relates to angular velocity sensors, electronic apparatuses, and methods of detecting an angular velocity, which are used for shake detection on video cameras, motion detection on virtual reality apparatuses, and direction detection on car navigation systems, for example.

Oscillating gyro sensors are widely used as consumer-use angular velocity sensors. The oscillating gyro sensors cause an oscillator to oscillate at a predetermined frequency, and use a piezoelectric element or the like to sense Coriolis force generated on the oscillator to thereby detect an angular velocity. Such oscillating gyro sensors are installed in electronic apparatuses such as video cameras, virtual reality apparatuses, and car navigation systems, for use as sensors for shake detection, motion detection, and direction detection, respectively.

To detect posture changes in a space using this type of gyro sensors, there is a known arrangement in which the gyro sensors are disposed in the directions of two or three axes orthogonal to one another. For example, Patent Document 1 discloses an arrangement in which three gyroscopes have oscillators mounted on a flexible substrate and the flexible substrate is folded to make the three oscillators orthogonal to one another, thereby realizing three-dimensional angular velocity detection. Similarly, Patent Document 2 discloses a three-dimensional angular velocity sensor that is disposed on a base stand in such a manner that tripod tuning-fork oscillators are orthogonal to one another in the directions of three axes.

Patent Document 1: Japanese Patent Application Laid-open No. 11-211481 (paragraph [0017] and FIG. 1)
Patent Document 2: Japanese Patent Application Laid-open No. 2000-283765 (paragraph [0019] and FIG. 8)

SUMMARY

In recent years, with advanced miniaturization of electronic apparatuses, there has been growing demand for smaller and thinner electronic components to be mounted on the electronic apparatuses. In both the arrangements disclosed in Patent Documents 1 and 2, one of the three oscillators is longitudinally disposed in a vertical direction (thickness direction). This causes a problem that the sensor is increased in thickness.

In addition, it is conceivable that the sensor can be reduced in thickness by shortening the oscillator disposed in the vertical direction. In this case, however, there is another problem that it is difficult to detect with high accuracy an angular velocity about an axis in the thickness direction.

In consideration of such circumstances, an object of the present invention is to provide an angular velocity sensor, an electronic apparatus, and a method of detecting an angular velocity, which allows a sensor to be made thinner.

Another object of the present invention is to provide an angular velocity sensor, an electronic apparatus, and a method of detecting an angular velocity, which allow high-accuracy detection of an angular velocity about an axis in the thickness direction within a plane.

To attain the foregoing objects, an angular velocity sensor in one embodiment of the present invention includes an annular frame, a drive part, a first detection part, and a support part.

The annular frame has a first set of beams, a second set of beams, and a plurality of connection parts. The first set of beams extends in a first direction, and is opposed to each other in a second direction orthogonal to the first direction. The second set of beams extends in the second direction, and is opposed to each other in the first direction. The connection parts connect the first beams and the second beams.

The drive part causes the frame to oscillate within a first plane to which the first and second directions belong, in an oscillation mode where, when one of the first and second sets of beams comes closer to each other, the other set separates from each other, and when the one set separates from each other, the other set comes closer to each other.

The first detection part detects an angular velocity about an axis in a third direction orthogonal to the first and second directions, on the basis of an amount of deformation of the frame oscillating in the oscillation mode within the first plane.

The support part is connected to the connection parts to support the frame.

The frame is excited by the drive part in the oscillation mode within the first plane. At that time, the first and second beams oscillate in a beam form supported at both ends with the connection parts as support points (oscillation nodes). In this state, when an angular velocity about an axis in the third direction acts on the frame, Coriolis force is generated on the beams in a direction orthogonal to an oscillation direction at that moment (single direction). The Coriolis force acts on the first and second sets of beams to deform the frame in the shape of an approximate parallelogram within the first plane. The first detection part senses the strain deformation of the frame within the first plane, and then detects an angular velocity acting on the frame on the basis of the amount of the deformation. The support part is connected to the connection parts of the frame, and therefore can support the frame without inhibiting the oscillation mode or the strain deformation.

According to the foregoing angular velocity sensor, it is possible to detect an angular velocity about an axis in the third direction, on the basis of deformation of the frame within a plane orthogonal to the third direction, the frame oscillating within the plane. Therefore, the longitudinal direction of the oscillating beams does not necessarily need to be aligned with a direction of a rotation axis of rotation to be detected. Specifically, if an angular velocity about an axis in the vertical direction (thickness direction) is to be detected, the longitudinal direction of the beams does not need to be aligned with the vertical direction (thickness direction). This makes it possible to detect with high accuracy an angular velocity about an axis in the thickness direction without increasing the thickness of the sensor, and allow the sensor to be made thinner.

The angular velocity sensor may further include a first pendulum part, a second pendulum part, and a second detection part.

The first pendulum part is disposed at the connection parts so as to extend in a fourth direction intersecting with the first and second directions within the first plane, and oscillates within the first plane in synchronization with oscillation of the frame.

The second pendulum part is disposed at the connection parts so as to extend in a fifth direction intersecting with the first, second, and fourth directions within the first plane, and oscillates within the first plane in synchronization with oscillation of the frame.

The second detection part detects angular velocities about axes in two predetermined directions within the first plane, on the basis of amounts of deformation of the first and second pendulum parts in directions orthogonal to the first plane.

In the angular velocity sensor, the first and second pendulum parts oscillate within the first plane in synchronization with oscillation of the frame. In this state, when angular velocities about axes parallel to the first plane act on the first and second pendulum parts, Coriolis force is generated on the first and second pendulum parts in directions orthogonal to oscillation directions at that moment (single direction). The Coriolis force acts on the first and second pendulum parts to deform (oscillate) the first and second pendulum parts in a direction orthogonal to the first plane (third direction). The second detection part senses deformation of the first and second pendulum parts in the direction orthogonal to the first plane (third direction), and detects angular velocities acting on the first and second pendulum parts, on the basis of amounts of the deformations. Therefore, according to the angular velocity sensor, it is possible to detect not only an angular velocity about an axis in the third direction but also angular velocities about axes in two predetermined directions within the first plane.

The first detection part may be disposed on at least one of the first and second beams.

When an angular velocity acts about an axis in the third direction, Coriolis force subjects the entire frame including the first and second beams to strain deformation within the first plane. Therefore, it is possible to detect the angular velocity by providing at least one beam with the detection part for detecting strain deformation of the beam. The first detection part may include a piezoelectric layer for detecting electrically the deformation of the beam.

Meanwhile, the angular velocity sensor may further include a first pendulum part and a third detection part.

The first pendulum part is disposed at the connection parts so as to extend in a fourth direction intersecting with the first and second directions within the first plane. The first pendulum part oscillates within the first plane in synchronization with oscillation of the frame.

The third detection part detects an angular velocity about an axis in the fourth direction, on the basis of an amount of deformation of the first pendulum part in a direction orthogonal to the first plane.

In this case, the angular velocity sensor may further include a second pendulum part and a fourth detection part.

The second pendulum part is disposed at the connection parts so as to extend in a fifth direction intersecting with the first, second, and fourth directions within the first plane. The second pendulum part oscillates within the first plane in synchronization with oscillation of the frame.

The fourth detection part detects an angular velocity about an axis in the fifth direction, on the basis of an amount of deformation of the second pendulum part in a direction orthogonal to the first plane.

Meanwhile, the third detection part may include a piezoelectric layer disposed on the first pendulum part, to thereby detect electrically deformation of the first pendulum part in a direction orthogonal to the first plane. Similarly, the fourth detection part may include a piezoelectric layer disposed on the second pendulum part, to thereby detect electrically deformation of the second pendulum part in a direction orthogonal to the first plane. In addition, the second detection part may also include piezoelectric layers disposed on the first pendulum part and the second pendulum part, to thereby detect electrically deformation of the first and second pendulum parts in a direction orthogonal to the first plane.

There may be formed pluralities of first and second pendulum parts. In this case, the first pendulum parts are formed at the connection parts of the frame so as to be opposed to each other in the fourth direction. The second pendulum parts are formed at the connection parts of the frame so as to be opposed to each other in the fifth direction. The first and second pendulum parts may extend toward an outside of the frame or may extend toward an inside of the frame. In this case, all the plurality of first and second pendulum parts may have piezoelectric layers or at least one each of the first and second pendulum parts may have a piezoelectric layer.

The support part is disposed at the connection parts as oscillation nodes of the frame oscillating in the oscillation mode. The support part has a base and a coupling part. The base is mechanically fixed to a fixing part. The coupling part is configured in a deformable manner to couple the base and the connection parts.

This arrangement makes it possible to fix the frame to the fixing part without inhibiting oscillation of the frame in the oscillation mode and without inhibiting strain deformation of the frame and the pendulum parts due to Coriolis force.

The base may be formed in the shape of a box surrounding the outside of the frame. This allows the frame to be stably fixed to the fixing part.

The frame may further have a weight portion formed on at least one of the first and second beams. This allows the first and second beams to be readily adjusted in amplitude, resonance frequency, detuning degree, and the like.

An angular velocity sensor in an another embodiment of the present invention includes an annular frame, a drive part, a first pendulum part, a second pendulum part, a detection part, and a support part.

The frame has a first set of beams, a second set of beams, and a plurality of connection parts. The first set of beams extends in a first direction, and is opposed to each other in a second direction orthogonal to the first direction. The second set of beams extends in the second direction, and is opposed to each other in the first direction. The plurality of connection parts connect the first beams and the second beams.

The drive part causes the frame to oscillate within a first plane to which the first and second directions belong, in an oscillation mode where, when one of the first and second sets of beams comes closer to each other, the other set separates from each other, and when the one set separates from each other, the other set comes closer to each other.

The first pendulum part is disposed at the connection parts so as to extend in a third direction intersecting with the first and second directions within the first plane. The first pendulum part oscillates within the first plane in synchronization with oscillation of the frame.

The second pendulum part is disposed at the connection parts so as to extend in a fourth direction intersecting with the first, second, and third directions within the first plane. The second pendulum part oscillates within the first plane in synchronization with oscillation of the frame.

The detection part detects angular velocities about axes in two predetermined directions within the first plane, on the basis of amounts of deformation of the first and second pendulum parts in directions orthogonal to the first plane.

The support part is connected to the connection parts to support the frame.

In the angular velocity sensor, the first and second pendulum parts oscillate within the first plane in synchronization with oscillation of the frame. The support part supports the frame and the first and second pendulum parts so as to be capable of oscillating in the oscillation mode and deforming by Coriolis force. In this state, when angular velocities about axes parallel to the first plane act on the first and second pendulum parts, Coriolis force is generated on the first and second pendulum parts in directions orthogonal to oscillation directions at that moment (single direction). The Coriolis force acts on the first and second pendulum parts to deform (oscillate) the first and second pendulum parts in a direction orthogonal to the first plane. The detection part senses deformation of the first and second pendulum parts in the direction orthogonal to the first plane, and detects angular velocities acting on the first and second pendulum parts, on the basis of amounts of the deformations. Therefore, according to the angular velocity sensor, it is also possible to detect angular velocities about axes in two predetermined directions within the first plane.

An electronic apparatus in one embodiment of the present invention is equipped with an angular velocity sensor including an annular frame, a drive part, a detection part, and a support part.

The annular frame has a first set of beams, a second set of beams, and a plurality of connection parts. The first set of beams extends in a first direction, and is opposed to each other in a second direction orthogonal to the first direction. The second set of beams extends in the second direction, and is opposed to each other in the first direction. The connection parts connect the first beams and the second beams.

The drive part causes the frame to oscillate within a first plane to which the first and second directions belong, in an oscillation mode where, when one of the first and second sets of beams comes closer to each other, the other set separates from each other, and when the one set separates from each other, the other set comes closer to each other.

The detection part detects an angular velocity about an axis in a third direction orthogonal to the first and second directions, on the basis of an amount of deformation of the frame oscillating in the oscillation mode within the first plane.

The support part is connected to the connection parts to support the frame.

A method of detecting an angular velocity in one embodiment of the present invention includes supporting by a support part an annular frame having a first set of beams that extends in a first direction and is opposed to each other in a second direction orthogonal to the first direction, a second set of beams that extends in the second direction and is opposed to each other in the first direction, and a plurality of connection parts that connect the first beams and the second beams, the support part being connected to the connection parts.

The frame is caused to oscillate within a first plane to which the first and second directions belong, in an oscillation mode where, when one of the first and second sets of beams comes closer to each other, the other set separates from each other, and when the one set separates from each other, the other set comes closer to each other.

An angular velocity about an axis in a third direction orthogonal to the first and second directions is detected, on the basis of an amount of deformation of the frame oscillating in the oscillation mode within the first plane.

According to the present invention as described above, it is possible to allow a sensor to be made thinner. In addition, according to the present invention, it is possible to detect with high accuracy an angular velocity about an axis in the thickness direction within a plane. Specifically, in the present invention, the longitudinal direction of the oscillating beams does not necessarily need to be aligned with a direction of a rotation axis of rotation to be detected. Accordingly, if an angular velocity about an axis in the vertical direction (thickness direction) is to be detected, the longitudinal direction of the beams does not need to be aligned with the vertical direction (thickness direction). Therefore, in rotation detection about one axis, or two or three axes orthogonal to one another including rotation detection in the thickness direction, it is theoretically possible to detect three axes orthogonal to one another by the sensor with the same thickness as that of a sensor for rotation detection about one axis. This allows high-accuracy detection of an angular velocity about an axis in the thickness direction without increasing the thickness of the sensor, and allows the sensor to be made thinner.

Additional features and advantages of the present invention are described herein, and will be apparent from, the following Detailed Description and the Figures.

BRIEF DESCRIPTION OF THE FIGURES

FIG. 24A shows that an angular velocity is generated about the X-axis, and FIG. 24B shows that an angular velocity is generated about the Y-axis.

DETAILED DESCRIPTION

Embodiments of the present invention will be described below with reference to the drawings.

(First Embodiment)

Figure 1:
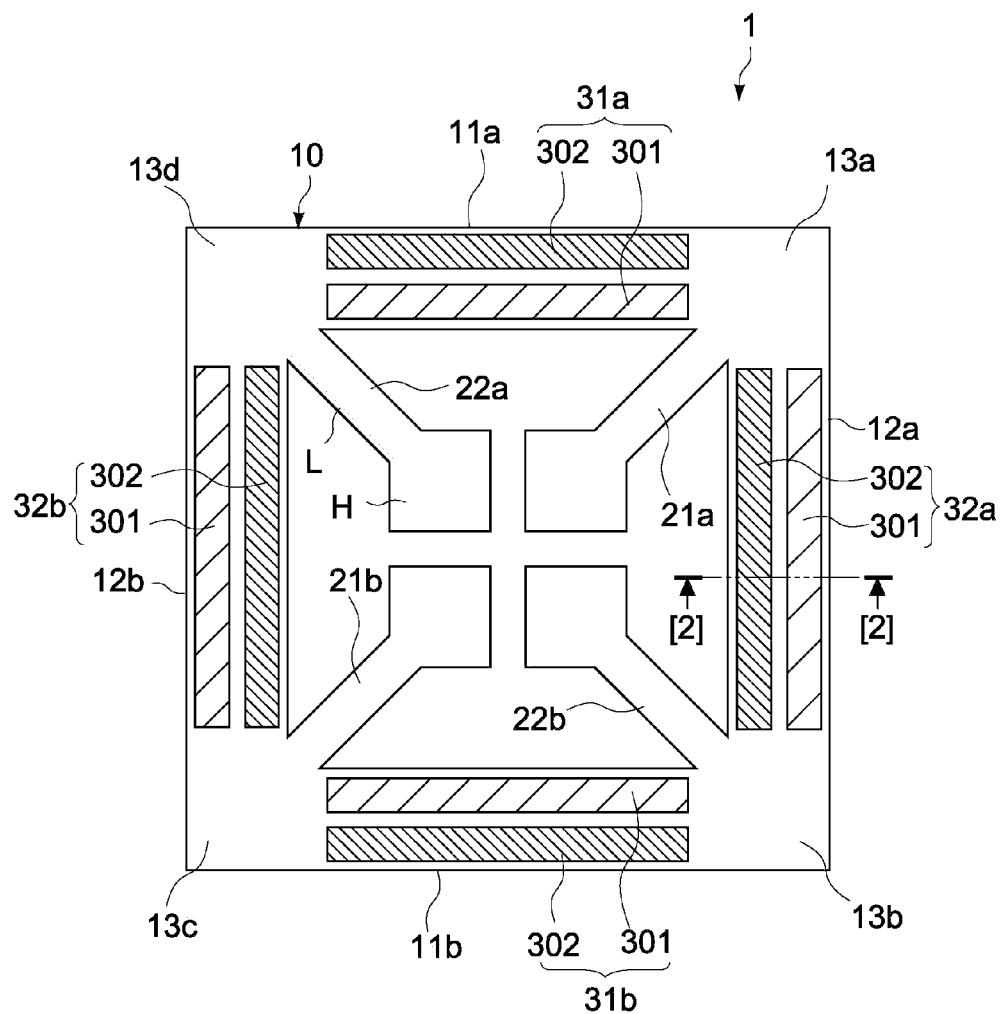
FIG. 1 is a plane view of a basic configuration of an angular velocity sensor in a first embodiment of the present invention.
Figure 6:
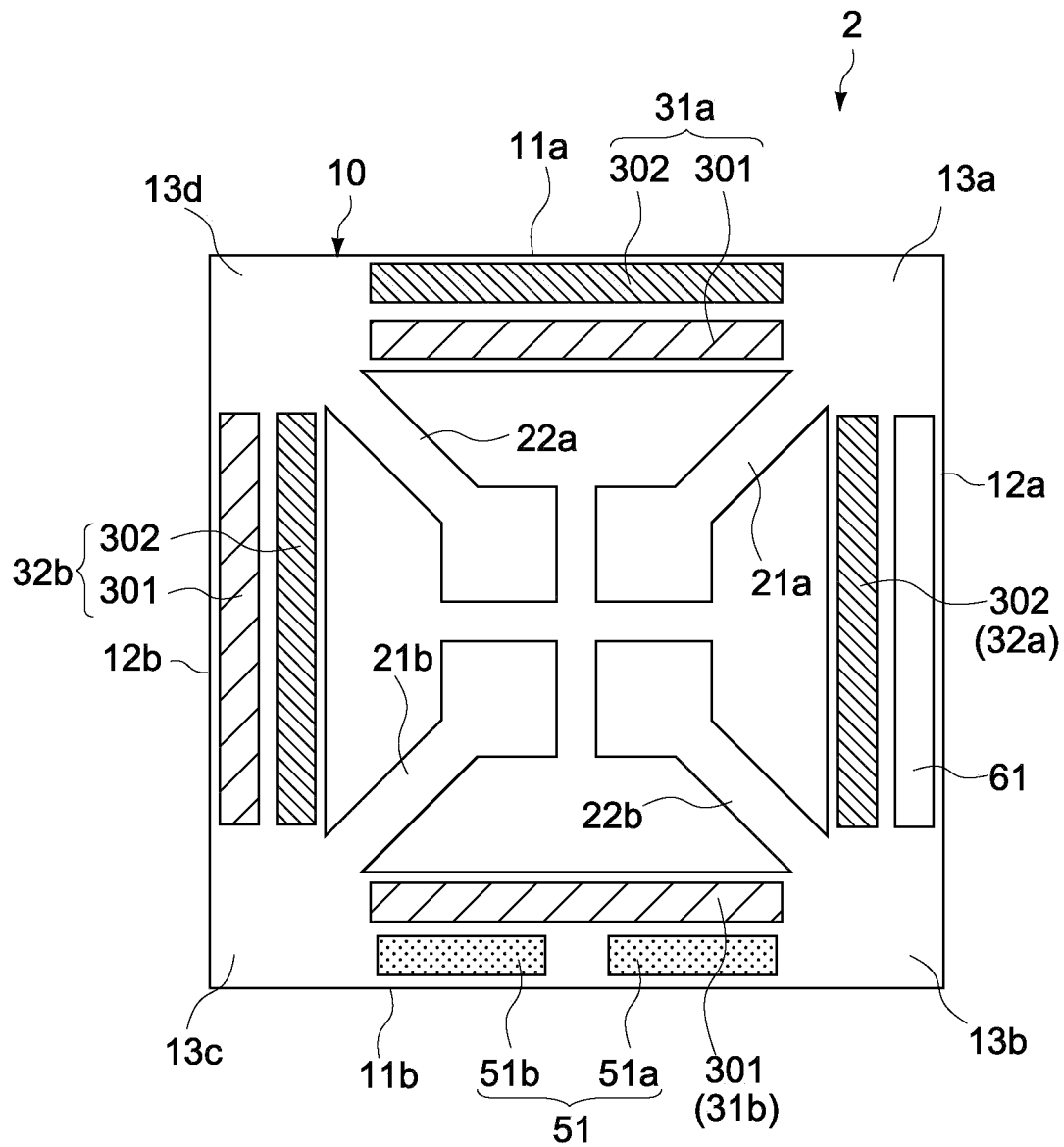
FIG. 6 is a plane view of a configuration of the angular velocity sensor in the first embodiment of the present invention.
Figure 9:
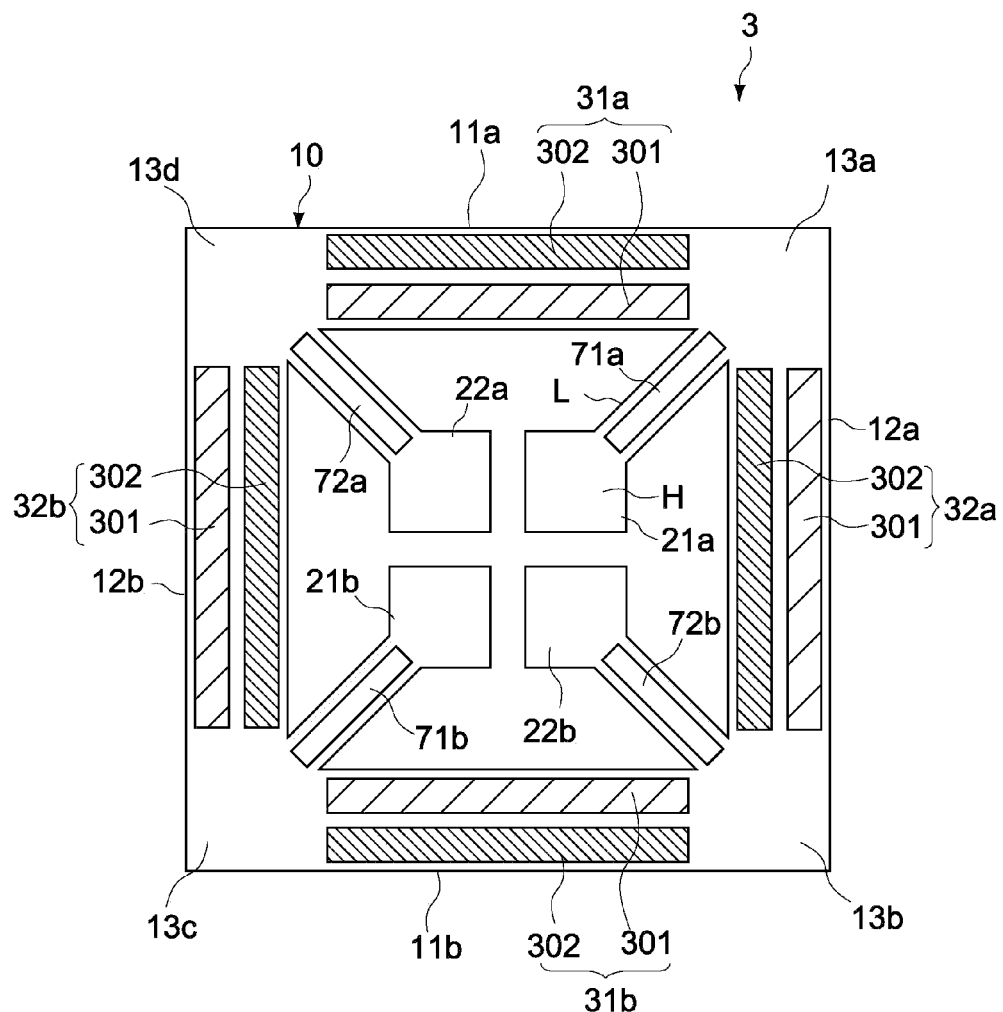
FIG. 9 is a plane view of a configuration of an angular velocity sensor in a second embodiment of the present invention.
Figure 9:
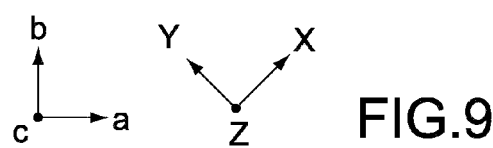
Figure 13:
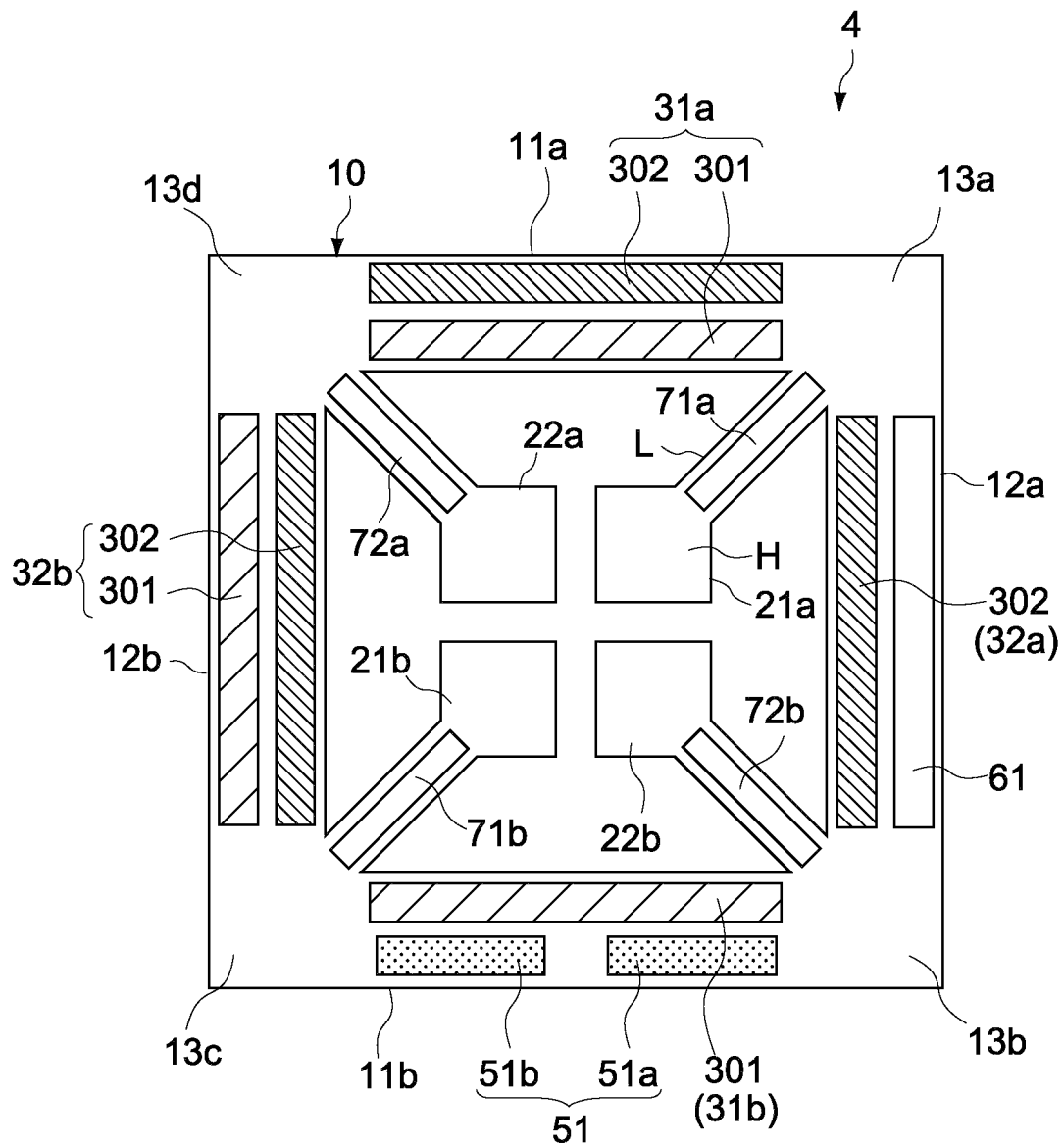
FIG. 13 is a plane view of a configuration of an angular velocity sensor in a third embodiment of the present invention.

FIG. 1 is a plane view of a basic configuration of a drive part of an angular velocity sensor in one embodiment of the present invention. FIG. 1 is an example of a configuration of a frame and a drive part of the angular velocity sensor. FIGS. 6, 9, 13 and others show examples of configurations of an angular velocity detection part. Referring to FIG. 1, the basic configuration of the drive part of the angular velocity sensor will be described below.

[Frame]

An angular velocity sensor 1 of this embodiment includes an annular frame 10 with four sides. The frame 10 has a width along an a-axis direction, a length along a b-axis direction, and a thickness along a c-axis direction. In FIG. 1, an X-axis direction is equivalent to an axial direction in which the a-axis turns about the c-axis counterclockwise at 45 degrees, and a Y-axis direction is equivalent to an axial direction in which the b-axis turns about the c-axis counterclockwise at 45 degrees. A Z-axis direction is equivalent to an axis direction parallel to the c-axis direction.

The sides of the frame 10 function as oscillating beams including a first set of beams 11a and 11b and a second set of beams 12a and 12b. In FIG. 1, the first set of beams 11a and 11b is constituted by one set of opposite sides that extend parallel to the a-axis direction (first direction) and are opposed to each other in the b-axis direction (second direction) orthogonal to the a-axis direction. The second set of beams 12a and 12b is constituted by the other set of opposite sides that extend parallel to the b-axis direction and are opposed to each other in the a-axis direction. The beams 11a, 11b, 12a, and 12b are identical in length, width, and thickness. The frame 10 has a hollow foursquare appearance.

The frame 10 is formed by performing a micro fabrication process on a silicon monocrystalline substrate. For example, the frame 10 can be formed using publicly-known micro-electro-mechanical systems (MEMS) manufacturing technique. There is no particular limitation on the size of the frame 10. For example, the frame 10 is 1,000 to 4,000 µm long at one side and 10 to 200 µm thick, and the beams 11a, 11b, 12a, and 12b are 50 to 200 µm wide.

The frame 10 has at sections equivalent to four corners, connection parts 13a, 13b, 13c, and 13d connecting the first set of beams 11a and 11b and the second set of beams 12a and 12b. The first set of beams 11a and 11b and the second set of beams 12a and 12b are supported at both ends by the connection parts 13a to 13d. As described later, the beams 11a, 11b, 12a, and 12b function as oscillating beams supported at both ends by the connection parts 13a to 13d. The four corners of the frame 10 do not need to have the angular shape as shown in the drawing, and may be formed in a chamfered or rounded shape.

The frame 10 has further first pendulum parts 21a and 21b and second pendulum parts 22a and 22b. The first pendulum parts 21a and 21b are formed at the two connection parts 13a and 13c opposed to each other in the X-axis direction, respectively, and extend toward the inside of the frame 10 along the X-axis direction. One-side ends of the first pendulum parts 21a and 21b are fixed by the connection parts 13a and 13c, respectively, and the other-side ends of the same are opposed to each other near a center of the frame 10. The second pendulum parts 22a and 22b are formed at the two connection parts 13b and 13d opposed to each other in the Y-axis direction, respectively, and extend toward the inside of the frame 10 along the Y-axis direction. One-side ends of the second pendulum parts 22a and 22b are fixed by the connection parts 13b and 13d, respectively, and the other-side ends of the same are opposed to each other near the center of the frame 10.

The pendulum parts 21a, 21b, 22a, and 22b are typically identical in shape and size, and are formed all together at formation of an outer shape of the frame 10. The pendulum parts 21a, 21b, 22a, and 22b are not particularly limited in shape or size, and do not need to be absolutely identical in shape. In this embodiment, the pendulum parts 21a, 21b, 22a, and 22b each have a head portion H at a free end side and an arm portion L for connecting the head portions H and the connection parts 13a to 13d. The arm portions L are excited within an XY plane by oscillation of the beams 11a, 11b, 12a, and 12b as described later. The head portions H function as oscillating weights from the standpoints of the beams 11a, 11b, 12a, and 12b. The pendulum parts 21a, 21b, 22a, and 22b may not be formed.

The frame 10 is not limited to the foregoing foursquare shape, and may have any other foursquare shape including a rectangle and a parallelogram. In addition, the frame 10 may not have a foursquare shape but may have any other multiangular shape such as an octagon. The beams supported at both ends by the connection parts of the four corners may be formed not in a straight line but in a flexed straight line or a curved line, and may project toward an inner periphery or an outer periphery. In addition, the connection parts 13a to 13d are connected to the support part for supporting the frame 10 at the fixing parts, but the support part is not shown in the drawings.

[Drive Electrodes]

The angular velocity sensor 1 has piezoelectric drive layers as drive parts for oscillating the frame 10. The piezoelectric drive layers include first piezoelectric drive layers 31a and 31b disposed on the first set of beams 11a and 11b, respectively, and second piezoelectric drive layers 32a and 32b disposed on the second set of beams 12a and 12b, respectively. The piezoelectric drive layers 31a, 31b, 32a, and 32b deform mechanically in response to an input voltage, and cause the beams 11a, 11b, 12a, and 12b to oscillate by drive force of the deformation. The direction of the deformation is controlled by the polarity of the input voltage.

The first piezoelectric drive layers 31a and 31b and the second piezoelectric drive layers 32a and 32b each have first piezoelectric drivers 301 and second piezoelectric drivers 302. The piezoelectric drivers 301 and 302 are linearly formed on the beams 11a, 11b, 12a, and 12b in symmetrical positions with respect to axis lines of the beams. FIG. 1 shows the first and second piezoelectric drivers 301 and 302 in different hatching patterns for easy understanding. The first piezoelectric drivers 301 are disposed parallel to inner edge sides of the first set of beams 11a and 11b and parallel to outer edge sides of the second set of beams 12a and 12b. The second piezoelectric drivers 302 are disposed parallel to outer edge sides of the first set of beams 11a and 11b and inner edge sides of the second set of beams 12a and 12b.

Figure 2:
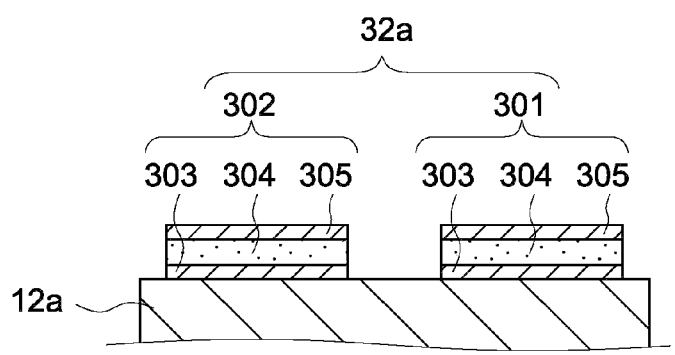
FIG. 2 is a cross-sectional view of FIG. 1 taken along a [2]-[2] line.

The first and second piezoelectric drivers 301 and 302 are identical in configuration. FIG. 2 is a cross-sectional view of the second piezoelectric drive layer 32a disposed on the second beam 12a. The first and second piezoelectric drivers 301 each have a lamination structure with a lower electrode layer 303, a piezoelectric material layer 304, and an upper electrode layer 305. The piezoelectric drivers 301 and 302 are formed with a thickness of 0.5 to 3 μm, for example. The frame having the beams with the piezoelectric drivers is formed from a silicon monocrystalline substrate. The frame has insulating films such as silicon oxide films formed in advance on planes on which the piezoelectric drivers are to be formed, although those insulating films are not shown in FIG. 2.

The piezoelectric material layer 304 is arranged in polarization orientation so as to expand and contract in response to a potential difference between the lower electrode layer 303 and the upper electrode layer 305. Therefore, when the respective lower electrode layers 303 of the piezoelectric drivers 301 and 302 are connected to a common reference potential and alternating-current voltage is applied in opposite phases to the respective upper electrode layers 305 of the same, the piezoelectric drivers 301 and the piezoelectric drivers 302 expand and contract in opposite phases.

There is no particular limitation on constitutional materials for the lower electrode layers 303, the piezoelectric material layers 304, and the upper electrode layers 305. For example, the lower electrode layers 303 are formed by a laminated film of titanium (Ti) and platinum (Pt), the piezoelectric material layers 304 are formed by lead zirconate titanate (PZT), and the upper electrode layers 305 are formed by platinum. These layers can be formed using thin-film fabrication techniques such as sputtering, vacuum vapor deposition, and CVD. In addition, the formed films can be patterned by an etching process using a photolithography technique.

Throughout the subsequent description, the first piezoelectric drivers 301 may also be called "first drive electrodes 301", and the second piezoelectric drivers 302 may also be called "second drive electrodes 302". The first and second drive electrodes 301 and 302 may not be formed on all the beams 11a, 11b, 12a, and 12b. For example, either of the first and second drive electrodes 301 and 302 may be formed on the beams. In addition, if one beam in the set of opposed beams oscillates, the oscillation of the beam can be transferred to the other beam via the connection parts of the frame, to thereby excite oscillation of the other beam. Accordingly, the drive electrode may be disposed only on one beam in the set of opposed beams.

[Operating Principles of the Angular Velocity Sensor]

Figure 3:
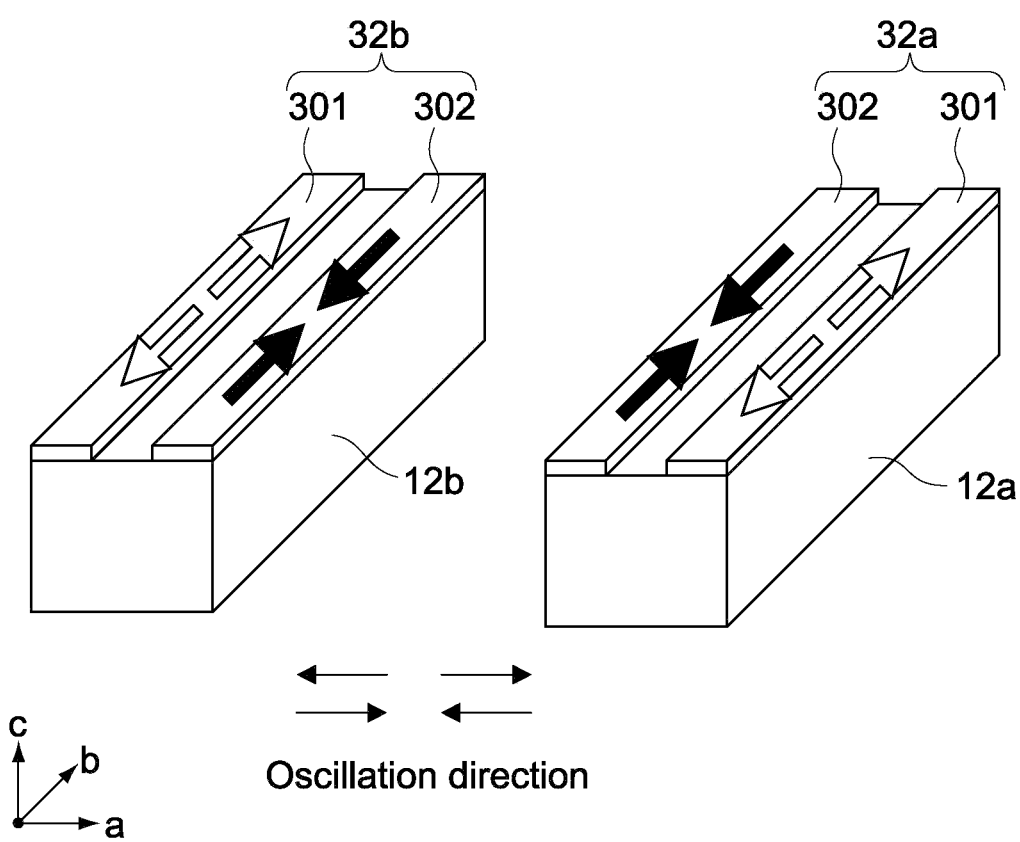
FIG. 3 is a schematic perspective view of an operation of major components in FIG. 1.

FIG. 3 is a schematic diagram for describing a mode of oscillation of the second set of beams 12a and 12b in FIG. 1. Opposite-phase voltage is applied to the first drive electrodes 301 and the second drive electrodes 302 such that, when one expands, the other contracts. Accordingly, the beams 12a and 12b are subjected to flexural deformation in the a-axis direction while both ends of the beams are supported by the connection parts 13a to 13d, and the beams 12a and 12b oscillate within the XY plane alternately in a direction in which the two beams separate from each other and in a direction in which the two beams come closer to each other. Similarly, the first set of beams 11a and 11b in FIG. 1 are also subjected to flexural deformation in the b-axis direction while both ends of the beams are supported by the connection parts 13a to 13d, and the beams 11a and 11b oscillate within the XY plane alternately in the direction in which the two beams separate from each other and in the direction in which the two beams come closer to each other.

On the first set of beams 11a and 11b and the second set of beams 12a and 12b, the first and second drive electrodes 301 and 302 are arranged in reversed positions at the inner edge sides and the outer edge sides of the beam sets. Therefore, when (middle portions of the opposed beams in) the first set of beams 11a and 11b oscillate in the direction in which the two come closer to each other, (middle portions of the opposed beams in) the second set of beams 12a and 12b oscillate in a direction in which the two separate from each other. In contrast, when the first set of beams 11a and 11b oscillate in a direction in which the two separate from each other, the second set of beams 12a and 12b oscillate in a direction in which the two come closer to each other. At that time, the middle portions of the beams 11a, 11b, 12a, and 12b constitute antinodes of oscillation, and the both ends (connection parts 13a to 13d) of these beams constitute nodes of oscillation. Oscillation in such a mode will be hereinafter referred to as basic oscillation of the frame 10.

The beams 11a, 11b, 12a, and 12b are driven by their resonance frequency. The resonance frequency of the beams 11a, 11b, 12a, and 12b is determined by their shape, length, and the like. Detection output can be more enhanced with an increasing proximity of a resonance frequency at the basic oscillation of the frame 10 to a resonance frequency at angular velocity detection. If an angular velocity about the Z-axis is to be detected, the two resonance frequencies hardly depend on the thickness of the frame 10. Accordingly, it is possible to increase piezoelectrically-driven mechanical displacement of the frame 10 by reducing the thickness of the frame 10. Meanwhile, since the thinner frame 10 becomes lower in mechanical strength, the thickness of the frame 10 is set so as to provide device reliability.

In addition, the oscillator becomes larger in amplitude with a lower operating frequency of the oscillating beams, which allows high performance of the angular velocity sensor. Meanwhile, when the oscillating beams are smaller in size, the operating frequency of the same tends to be higher. In this embodiment, the resonance frequency of the beams 11a, 11b, 12a, and 12b is set within a range of 1 to 100 kHz.

Figure 4:
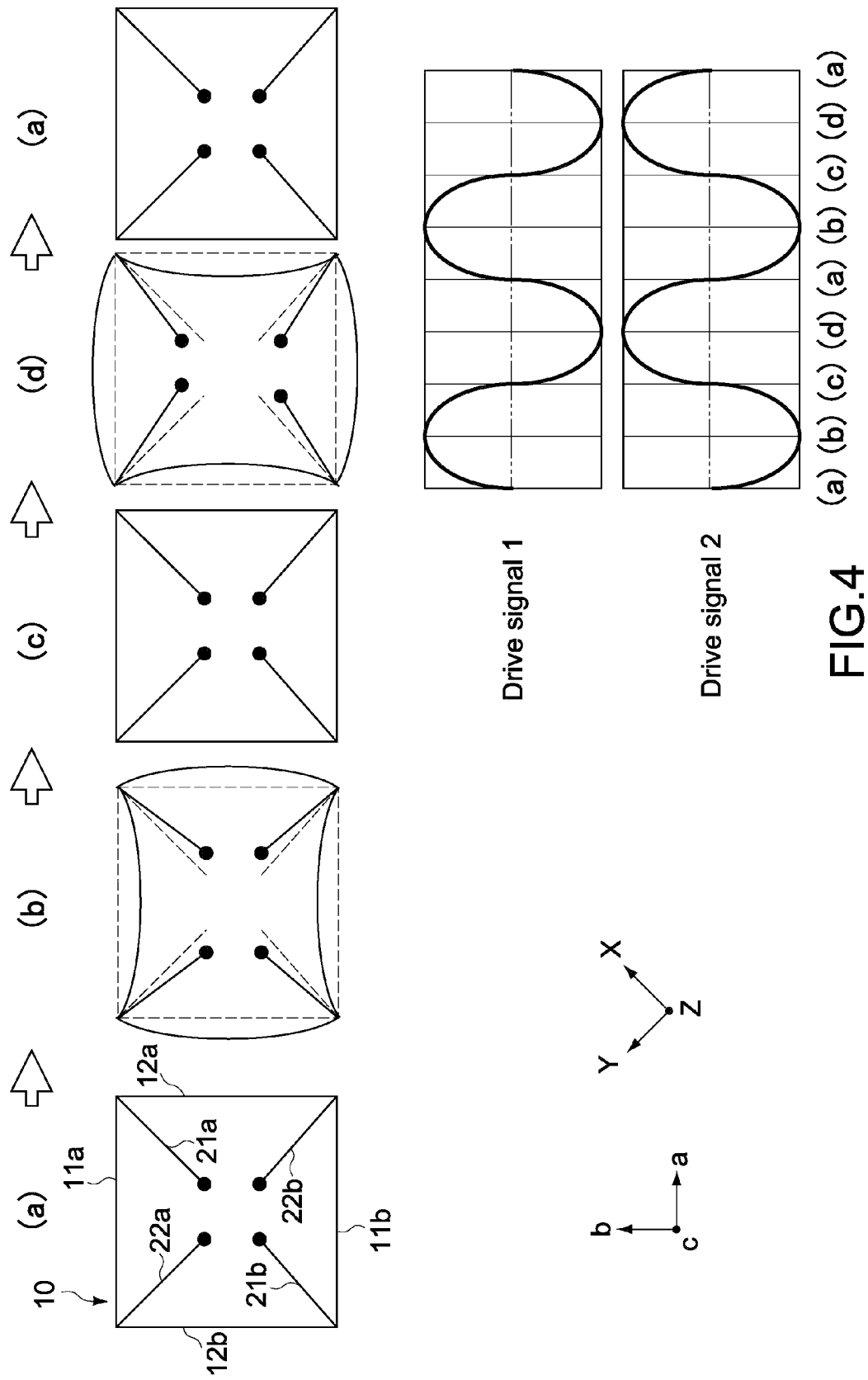
FIG. 4 is a diagram showing basic oscillation of the angular velocity sensor shown in FIG. 1.

FIG. 4 is a schematic diagram showing temporal changes in the basic oscillation of the frame 10. In FIG. 4, a "drive signal 1" shows temporal changes in input voltage applied to the first drive electrode 301, and a "drive signal 2" shows temporal changes in input voltage applied to the second drive electrode 302. As shown in FIG. 4, the drive signal 1 and the drive signal 2 have alternating waveforms with changes in opposite phases. Accordingly, the frame 10 changes in the order of (a), (b), (c), (d), (a), . . . , and the frame 10 oscillates in the oscillation mode where, if the beams in one of the first set of beams 11a and 11b and the second set of beams 12a and 12b come closer to each other, the beams in the other set separate from each other, and if the beams in the one set separate from each other, the beams in the other set come closer to each other.

In actuality, there exists some delay time between the instant when an input signal is applied and the instant when the frame changes (displaces), by the influences of piezoelectric bodies' response time, input operating frequency, frame resonance frequency, and the like. In this example, the temporal changes in FIG. 4 are described on the assumption that delay time is significantly short.

In addition, on the basic oscillation of the frame 10, the first pendulum parts 21a and 21b and the second pendulum parts 22a and 22b also oscillate within the XY plane around the connection parts 13a to 13d, in synchronization with the oscillation of the frame 10. The oscillation of the pendulum parts 21a, 21b, 22a, and 22b are excited by the oscillation of the beams 11a, 11b, 12a, and 12b. In this case, the first pendulum parts 21a and 21b and the second pendulum parts 22a and 22b oscillate (swing) in opposite phases in a direction of transverse swing from the support points of the pendulum parts, that is, the connection parts 13a to 13d, within the XY plane.

As shown in FIG. 4, when the first set of beams 11a and 11b oscillates in a direction in which the two comes closer to each other, the first pendulum part 21a and the second pendulum part 22a oscillate in a direction in which the two separate from each other (state (b)). In contrast, when the first set of beams 11a and 11b oscillates in a direction in which the two separate from each other, the first pendulum part 21a and the second pendulum part 22a oscillate in a direction in which the two come closer to each other (state (d)). The first pendulum part 21b and the second pendulum part 22b also oscillate alternately in a direction in which the two separate from each other and in a direction in which the two come closer to each other, depending on an oscillation direction of the second set of beams 12a and 12b. As described above, the first pendulum parts 21a and 21b and the second pendulum parts 22a and 22b oscillate in opposite phases in synchronization with the basic oscillation of the frame 10.

Figure 5:
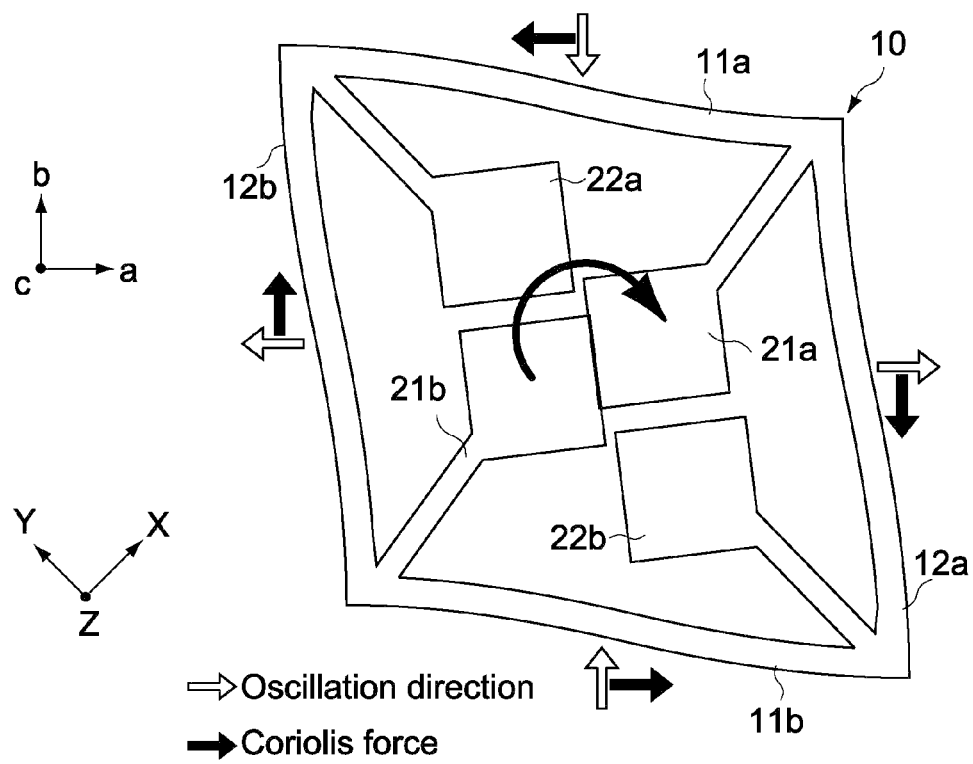
FIG. 5 is a schematic plane view for describing an operation of the angular velocity sensor shown in FIG. 1, with an angular velocity generated about a Z-axis.
Figure 5:
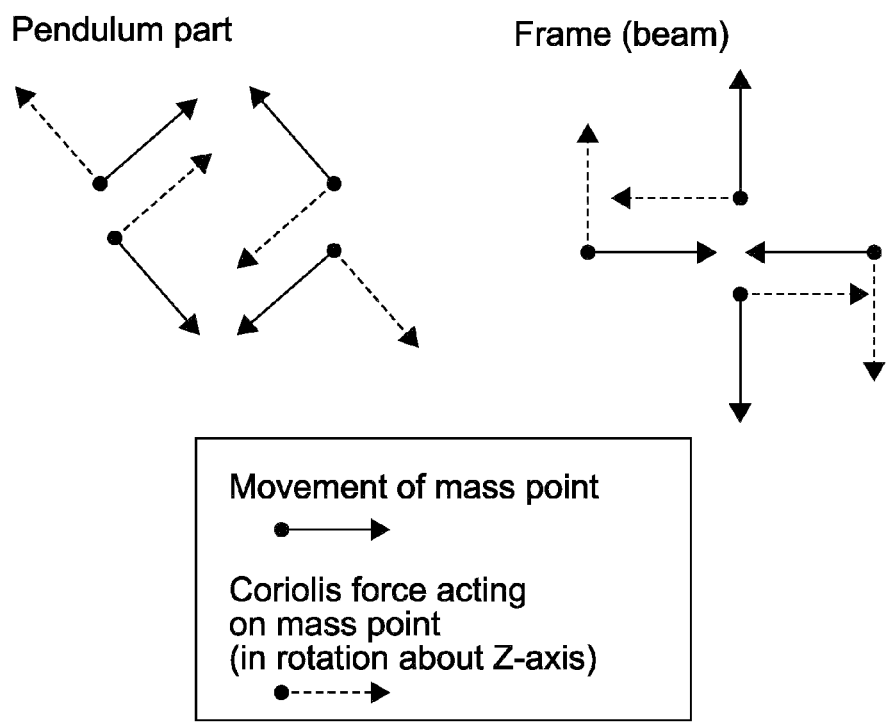

In the thus configured angular velocity sensor 1 in this embodiment, when alternating-current voltages are applied in opposite phases to the drive electrodes 301 and 302, the beams 11a, 11b, 12a, and 12b of the frame 10 oscillate in the oscillation mode shown in FIG. 4. When an angular velocity about the Z-axis acts on the frame 10 continuing the basic oscillation, Coriolis force resulting from the angular velocity acts on specific points of the frame 10 to subject the frame 10 to strain deformation within the XY plane as shown in FIG. 5. Therefore, it is possible to detect the magnitude and direction of the angular velocity acing on the frame 10 by sensing an amount of deformation of the frame 10 within the XY plane.

FIG. 5 is a schematic plane view of deformation of the frame 10 at a moment when an angular velocity about the Z-axis acts on the frame 10. For the purpose of illustration, the shape and deformation of the frame 10 are slightly exaggerated in the drawing. If a clockwise angular velocity about the Z-axis acts on the frame 10 under the basic oscillation, Coriolis force is generated at the points of the frame 10 (the beams 11a, 11b, 12a, and 12b and the pendulum parts 21a, 21b, 22a, and 22b) within the XY plane orthogonal to the Z-axis, in directions forming an angle of 90 degrees clockwise with respect to movement directions (oscillation directions) of the points at that moment, in proportion to a magnitude of the angular velocity. That is, directions of Coriolis force are determined by directions of oscillation of the points on which the Coriolis force acts at the moment as shown in FIG. 5. Accordingly, the frame 10 is squashed (deformed) within the XY plane so as to change in shape from a foursquare to an approximate parallelogram.

FIG. 5 shows that a predetermined angular velocity acts clockwise about the Z-axis. If the direction of the angular velocity is opposite (counterclockwise), the Coriolis force also acts on the points in the opposite directions.

The angular velocity acting on the frame 10 can be detected by any means. For example, the frame 10 may be provided with a piezoelectric detection layer. FIG. 6 is a plane view of an angular velocity sensor including a piezoelectric detection layer 51 for angular velocity detection (first detection part). In FIG. 6, components corresponding to those shown in FIG. 1 are given reference symbols identical to those shown in FIG. 1, and detailed descriptions on the same are omitted.

[Detection Electrodes]

An angular velocity sensor 2 shown in FIG. 6 is different from the angular velocity sensor 1 shown in FIG. 1, in an electrode structure formed on one beam 11b in the first set of beams 11a and 11b. Specifically, in this embodiment, the piezoelectric detection layer 51 is disposed in place of the second drive electrode 302. The piezoelectric detection layer 51 has a first piezoelectric detector 51a and a second piezoelectric detector 51b. The first and second piezoelectric detectors 51a and 51b are disposed in symmetrical positions with respect to a middle portion of the first beam 11b in a direction of an axis line. The first and second piezoelectric detectors 51a and 51b are identical in configuration to the piezoelectric drivers 301 and 302, and are formed by a laminate of a lower electrode layer, a piezoelectric material layer, and an upper electrode layer (FIG. 2). The first and second piezoelectric detectors 51a and 51b have a function of converting mechanical deformation of the beam 11b into an electrical signal.

Throughout the following description, the first piezoelectric detector 51a may also be called "first detection electrode 51a", and the second piezoelectric detector 51b may also be called "second detection electrode 51b".

As shown in FIG. 5, when an angular velocity is generated about the Z-axis, the beams 11a, 11b, 12a, and 12b are subjected by Coriolis force to strain deformation within the XY plane. This strain deformation takes place at the same time on the beams 11a, 11b, 12a, and 12b. Therefore, it is possible to detect an angular velocity acting on the frame 10 by disposing the piezoelectric detection layer 51 on some of the beams.

In addition, the piezoelectric detection layer 51 detects not only deformation of the frame 10 resulting from an angular velocity but also deformation of the beam 11b due to the basic oscillation. Herein, the deformation of the frame 10 due to generation of the angular velocity is symmetrical with respect to middle portions of the beams in directions of axis lines. Specifically, one area of the beam 11b with a boundary at the middle portion of the beam 11b is deformed in a convex shape toward the inside of the frame 10, and the other area of the same is deformed in a convex shape toward the outside of the frame 10. Accordingly, the one area of the beam 11b contracts at an outer edge side, whereas the other area of the same expands at the outer edge side. The first and second detection electrodes 51a and 51b disposed on the outer edge sides of these areas output detection signals in opposite phases. Therefore, generating a differential signal of these detection signals makes it possible to detect an angular velocity component with high accuracy while eliminating a basic oscillation component of the beam 11b.

Meanwhile, the angular velocity sensor 2 shown in FIG. 6 is different from the angular velocity sensor 1 shown in FIG. 1, in an electrode structure formed on one beam 12a in the second set of beams 12a and 12b. Specifically, in this embodiment, a reference electrode 61 (reference part) is disposed in place of the first drive electrode 301. The reference electrode 61 is identical in configuration to the drive electrodes 301 and 302, and is formed by a laminate of a lower electrode layer, a piezoelectric detection layer, and an upper electrode layer (FIG. 2). The reference electrode 61 has a function of converting mechanical deformation of the beam 12a into an electrical signal.

The reference electrode 61 is disposed at an outer edge side of the beam 12a to detect oscillation of the beam 12a excited by the drive electrode 302. Detection output from the reference electrode 61 is used to generate a reference signal for oscillating the frame 10 in the basic oscillation. Instead of generation of the reference electrode 61, a sum signal of outputs from the first and second detection electrodes 51a and 51b may be generated as a reference signal.

[Drive Circuit of the Angular Velocity Sensor]

Figure 7:
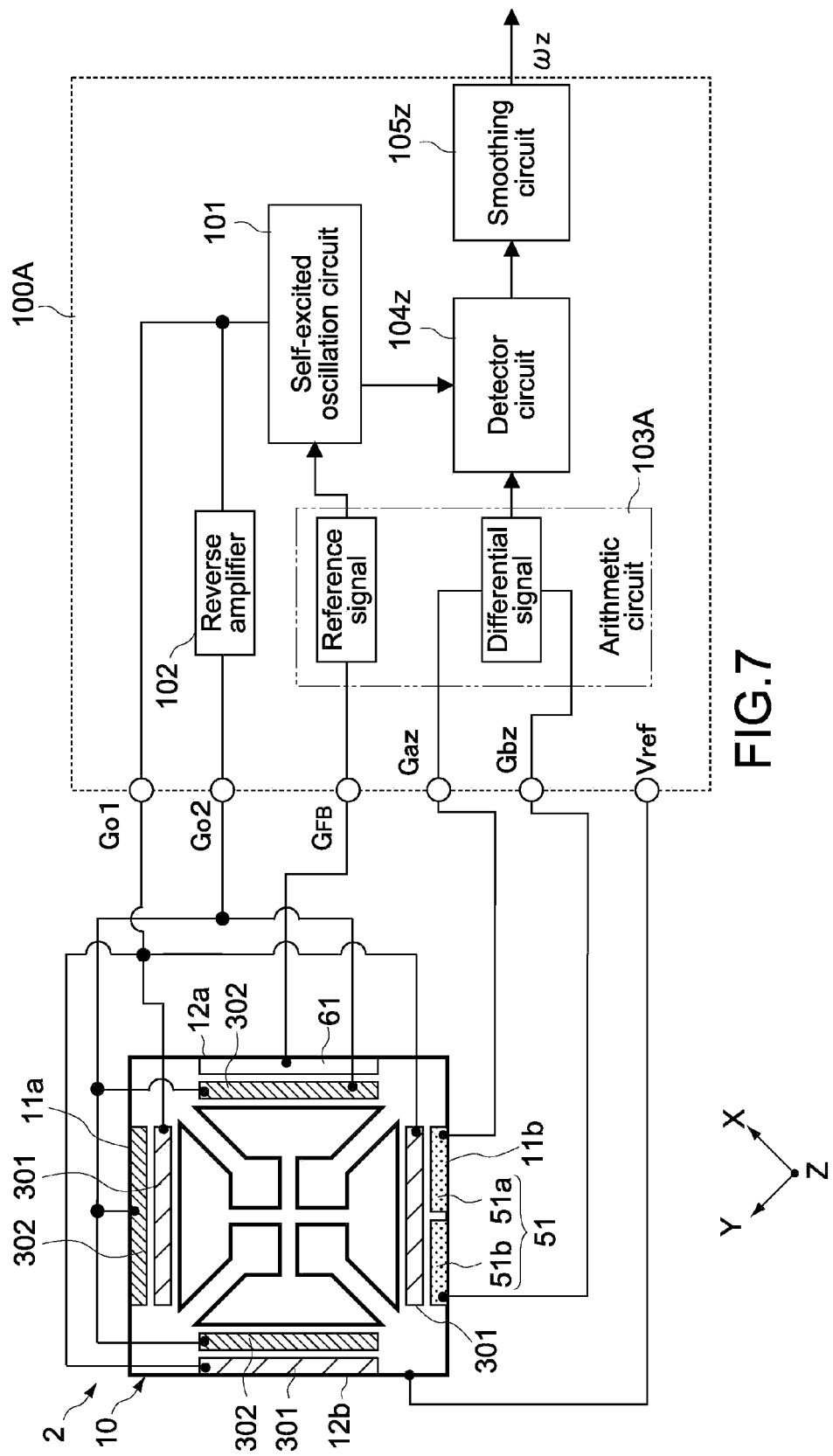
FIG. 7 is a block diagram showing one example of a drive circuit of the angular velocity sensor shown in FIG. 6.

Next, a drive circuit of the thus configured angular velocity sensor 2 will be described below. FIG. 7 is a block diagram of a drive circuit 100A of the angular velocity sensor 2. The drive circuit 100A is formed by an IC chip or IC components packaged as one chip, for example.

The drive circuit 100A has a Go1 terminal, a Go2 terminal, a GFB terminal, a Gaz terminal, a Gbz terminal, and a Vref terminal. The Go1 terminal is connected to the upper electrode layer 305 of the first drive electrode 301 (FIG. 2). The Go2 terminal is connected to the upper electrode layer 305 of the second drive electrode 302 (FIG. 2). The GFB terminal is connected to the reference electrode 61. The Gaz terminal is connected to the upper electrode layer of the first detection electrode 51a, and the Gbz terminal is connected to the upper electrode layer of the second detection electrode 51b. The Vref terminal is connected to the lower electrode layers 303 of the first and second drive electrodes 301 and 302 (FIG. 2) and the lower electrode layers of the first and second detection electrodes 51a and 51b.

In the drive circuit 100A, the Go1 terminal is connected to an output terminal of a self-excited oscillation circuit 101. The self-excited oscillation circuit 101 generates drive signals (alternating-current signals) for driving the drive electrodes 301 and 302. The Go2 terminal is connected to the output terminal of the self-excited oscillation circuit 101 via a reverse amplifier 102. The reverse amplifier 102 reverses a phase of the drive signal generated by the self-excited oscillation circuit 101. Accordingly, the first drive electrode 301 and the second drive electrode 302 expand and contract alternately in opposite phases. The Vref terminal is connected to a predetermined reference potential. The reference potential may be a ground potential or a specific offset potential.

The drive circuit 100A further has an arithmetic circuit 103A, a detector circuit 104z, and a smoothing circuit 105z. The GFB terminal, the Gaz terminal, and the Gbz terminal are connected to input terminals of the arithmetic circuit 103A. The arithmetic circuit 103A generates a reference signal on the basis of an output voltage of the reference electrode 61 supplied via the GFB terminal, and outputs the same to the self-excited oscillation circuit 101. In addition, the arithmetic circuit 103A generates a differential signal of output voltages of the detection electrodes 51a and 51b supplied via the Gaz terminal and the Gbz terminal, and outputs the same to the detector circuit 104z.

The detector circuit 104z subjects the differential signal to full-wave rectification for conversion into direct current, in synchronization with the output of the drive signal from the self-excited oscillation circuit 101 or the reference signal. The smoothing circuit 105z smoothes out the output from the detector circuit. A direct-current voltage signal $\omega z$ output from the smoothing circuit 105z contains information on magnitude and direction of an angular velocity about the Z-axis. Specifically, the magnitude of the direct-current voltage signal $\omega z$ with respect to the reference potential Vref constitutes information on the magnitude of the angular velocity, and the polarity of the direct-current voltage constitutes information on the direction of the angular velocity.

Figure 8:
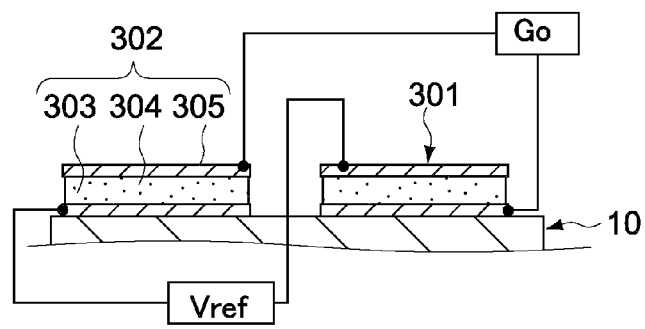
FIG. 8 is a cross-sectional view of major components of an angular velocity sensor as a modification example of the arrangement in FIG. 6.

In the embodiment shown in FIG. 7, all the lower electrode layers 303 of the drive electrodes 301 and 302 in the angular velocity sensor 2 are connected to the reference potential (Vref). However, the present invention is not limited to this embodiment, and an input voltage may be applied to the lower electrode layer 303 in either one of the drive electrodes 301 and 302. FIG. 8 is a cross-sectional view of major components of the drive electrodes 301 and 302, showing an example of such a connection. In the example of FIG. 8, the drive signal (Go terminal) is connected to the lower electrode layer 303 of the first drive electrode 301, and the Vref terminal is connected to the upper electrode layer 305 of the same. In this connection example, the first and second drive electrodes 301 may expand and contract alternately in opposite phases. In addition, the reverse amplifier 102 may not be provided to the drive circuit 100A, and the Go1 terminal and the Go2 terminal may be configured as a common Go terminal.

The angular velocity sensor 2 is mounted together with the drive circuit 100A on a circuit substrate (not shown) as a fixing part to thereby constitute one sensor component (package component). The mounting of the angular velocity sensor 2 on the circuit substrate may be carried out by a flip-chip method or a wire-bonding method. The angular velocity sensor 2 is mounted on the circuit substrate via the connection parts 13a to 13d forming oscillation nodes at the oscillation of the frame 10. This makes it possible to support the frame 10 without inhibiting the oscillation of the frame 10. In addition, the connection parts 13a to 13d may have some support part to support the frame 10 elastically via the support part so as to be capable of oscillatory deformation, as described later. Electric connection between the circuit substrate and the angular velocity sensor 2 can also be made via the connection parts 13a to 13d.

According to this embodiment as described above, it is possible to detect an angular velocity about an axis in the Z-axis direction, on the basis of deformation of the frame 10 within the XY plane, the frame 10 oscillating within the XY plane. That is, in this embodiment, the longitudinal direction of the oscillating beams does not need to be aligned with a direction of a rotation axis of rotation to be detected. Specifically, if an angular velocity about an axis in the vertical direction (thickness direction) is to be detected, the longitudinal direction of the beams does not need to be aligned with the vertical direction (thickness direction). This makes it possible to detect with high accuracy an angular velocity about an axis in the thickness direction without increasing the thickness of the sensor, and allow the sensor to be made thinner.

In addition, the angular velocity sensor of this embodiment can be incorporated into electronic apparatuses such as digital still cameras, video cameras, virtual reality apparatuses, and car navigation systems, and can be widely used as a sensor component for shake detection, motion detection, direction detection and the like. In particular, according to this embodiment, the sensor can be made smaller and thinner to thereby satisfy sufficiently demands for compact and thinner electronic apparatuses and the like.

(Second Embodiment)

FIG. 9 shows an angular velocity sensor in a second embodiment of the present invention. The angular velocity sensor in this embodiment is configured to be capable of detecting angular velocities about axes in parallel to the X-axis and Y-axis directions.

FIG. 9 is a plane view of a configuration of an angular velocity sensor 3 of this embodiment. In FIG. 9, components identical to those shown in FIG. 1 are given reference symbols identical to those shown in FIG. 1, and detailed descriptions on the same are omitted. The angular velocity sensor 3 of this embodiment is configured with the addition of detection electrodes 71a and 71b for detecting an angular velocity about the X-axis and detection electrodes 72a and 72b for detecting an angular velocity about the Y-axis, to the angular velocity sensor 1 shown in FIG. 1.

As shown in FIG. 9, the detection electrodes 71a and 71b detecting an angular velocity about the X-axis are disposed on surfaces of the first pendulum parts 21a and 21b, respectively. The detection electrodes 72a and 72b detecting an angular velocity about the Y-axis are disposed on surfaces of the second pendulum parts 22a and 22b, respectively. The detection electrodes 71a, 71b, 72a, and 72b are formed linearly on axis cores of arm parts L of the pendulum parts 21a, 21b, 22a, and 22b.

The detection electrodes 71a, 71b, 72a, and 72b are identical in configuration to the first and second drive electrodes 301 and 302, and are each constituted by a laminate of a lower electrode layer, a piezoelectric material layer, and an upper electrode layer (FIG. 2). The detection electrodes 71a, 71b, 72a, and 72b have a function of converting mechanical deformation of the arm parts L into electrical signals. In particular, the detection electrodes 71a, 71b, 72a, and 72b have a function of detecting deformation of the arm parts L in the Z-axis direction.

Figure 10:
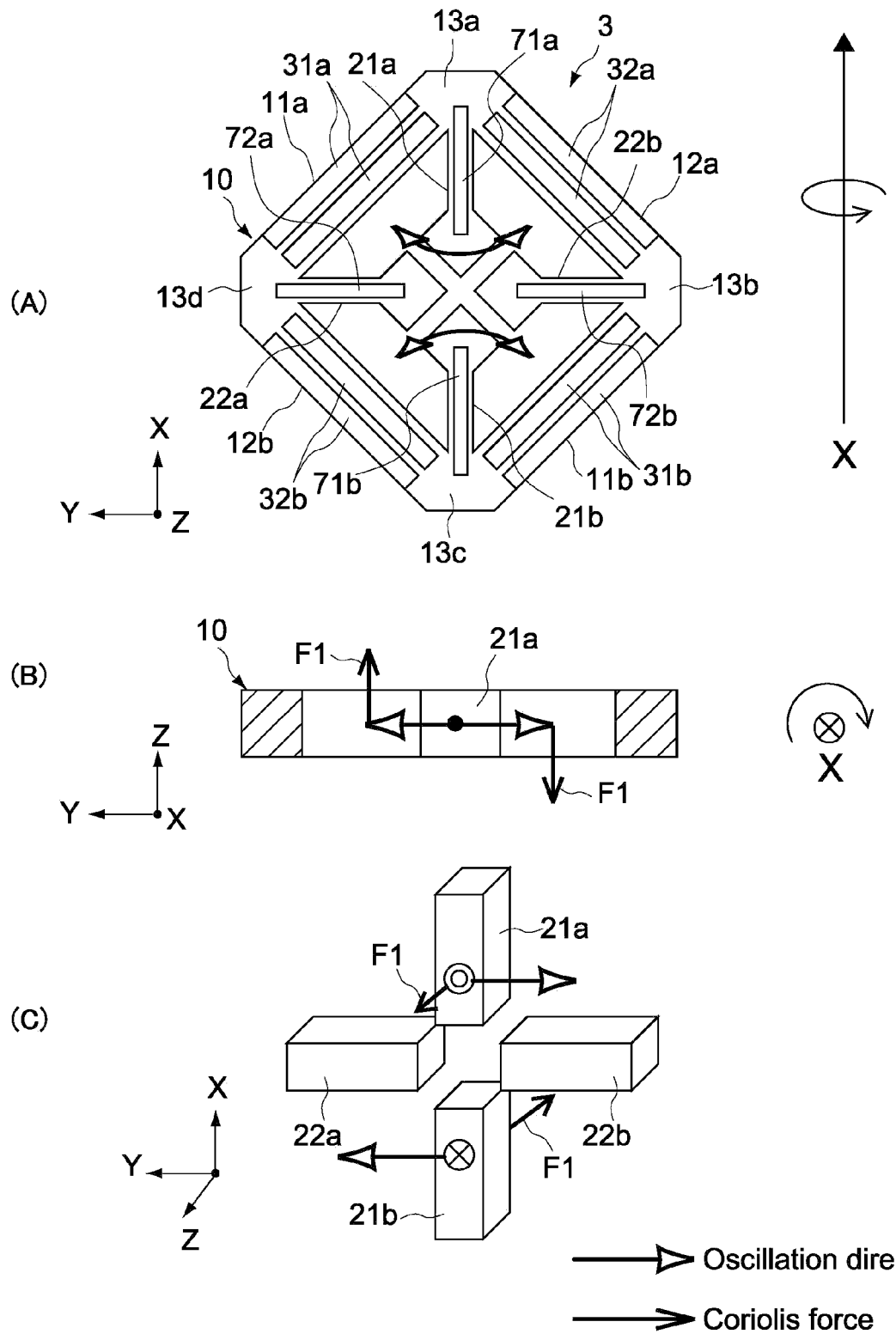
FIG. 10 are diagrams for describing an operation of the angular velocity sensor shown in FIG. 9, with an angular velocity generated about an X-axis.
Figure 11:
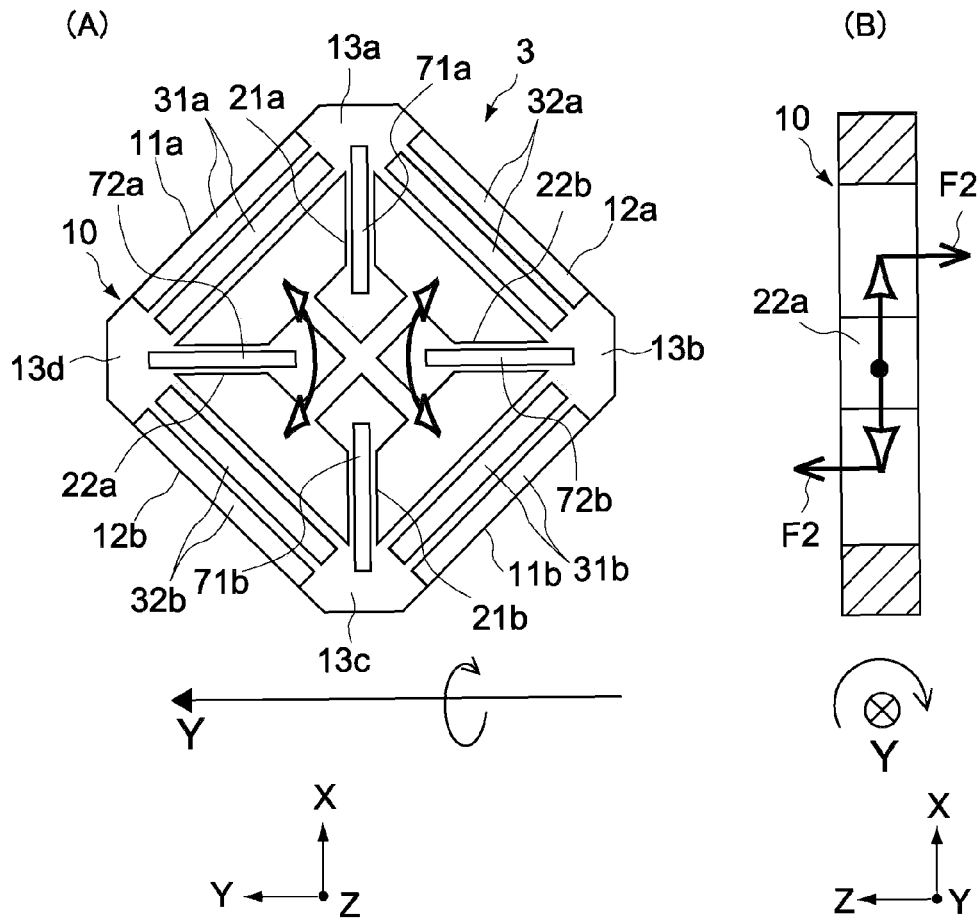
FIG. 11 are diagrams for describing an operation of the angular velocity sensor shown in FIG. 9, with an angular velocity generated about a Y-axis.
Figure 11:
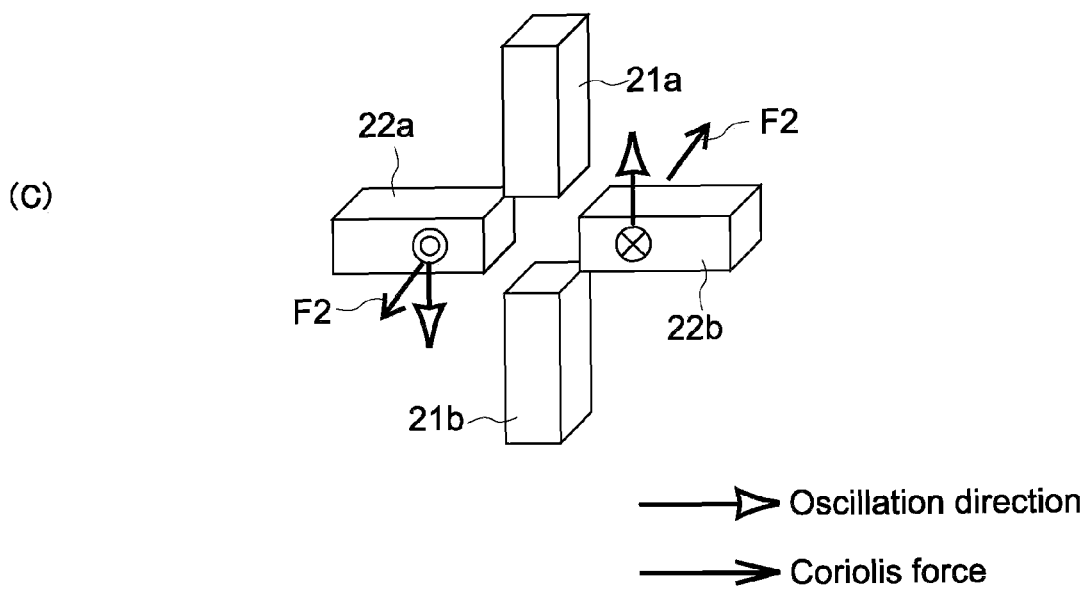

In the angular velocity sensor 3 of this embodiment, when alternating-current voltages are applied to the drive electrodes 301 and 302 in opposite phases, the beams 11a, 11b, 12a, and 12b, the first pendulum parts 21a and 21b, and the second pendulum parts 22a and 22b of the frame 10 oscillate in the oscillation mode shown in FIG. 4. FIGS. 10(A), 10(B), and 10(C) are diagrams for describing oscillation forms of the pendulum parts 21a and 21b with an angular velocity about the X-axis acting on the frame 10: FIG. 10(A) is a plane view; FIG. 10(B) is a sectional view as seen from the X-axis direction; and FIG. 10(C) is a schematic perspective view of the pendulum parts. FIGS. 11(A), 11(B), and 11(C) are diagrams for describing oscillation forms of the pendulum parts 22a and 22b with an angular velocity about the Y-axis acting on the frame 10: FIG. 11(A) is a plane view; FIG. 11(B) is a sectional view as seen from the Y-axis direction; and FIG. 11(C) is a schematic perspective view of the pendulum parts.

As shown in FIG. 10(A), when an angular velocity about the X-axis acts on the frame 10 continuing the basic oscillation, Coriolis force F1 is generated on the first pendulum parts 21a and 21b in directions orthogonal to oscillation directions at that moment. Accordingly, the first pendulum parts 21a and 21b deform in directions orthogonal to the XY plane as shown in FIG. 10(B). The detection electrodes 71a and 71b detect electrically amounts of deformation of the first pendulum parts 21a and 21b within the XZ plane. This makes it possible to detect the angular velocity about the X-axis acting on the frame 10. In addition, since the Coriolis force F1 acts on the first pendulum parts 21a and 21b in the opposite directions, the pendulum parts 21a and 21b are excited in the Z-axis direction in opposite phases. Therefore, detection signals from the detection electrodes 71a and 71b are opposite in phase. Accordingly, it is possible to generate an angular velocity signal about the X-axis by acquiring a differential signal of these detection signals. In addition, it is possible to provide about twofold detection sensitivity as compared with the case where only either one of the detection electrodes 71a and 71b is used, for example.

Similarly, as shown in FIG. 11(A), when an angular velocity about the Y-axis acts on the frame 10 continuing the basic oscillation, Coriolis force F2 is generated on the second pendulum parts 22a and 22b in directions orthogonal to oscillation directions at that moment. Accordingly, the second pendulum parts 22a and 22b deform in directions orthogonal to the XY plane as shown in FIG. 11(B). The detection electrodes 72a and 72b detect electrically amounts of deformation of the second pendulum parts 22a and 22b within a YZ plane. This makes it possible to detect the angular velocity about the Y-axis acting on the frame 10. In addition, since the Coriolis force F2 acts on the second pendulum parts 22a and 22b in the opposite directions, the pendulum parts 22a and 22b are excited in the Z-axis direction in opposite phases. Therefore, detection signals from the detection electrodes 72a and 72b are opposite in phase. Accordingly, it is possible to generate an angular velocity signal about the Y-axis by acquiring a differential signal of these detection signals.

Figure 12:
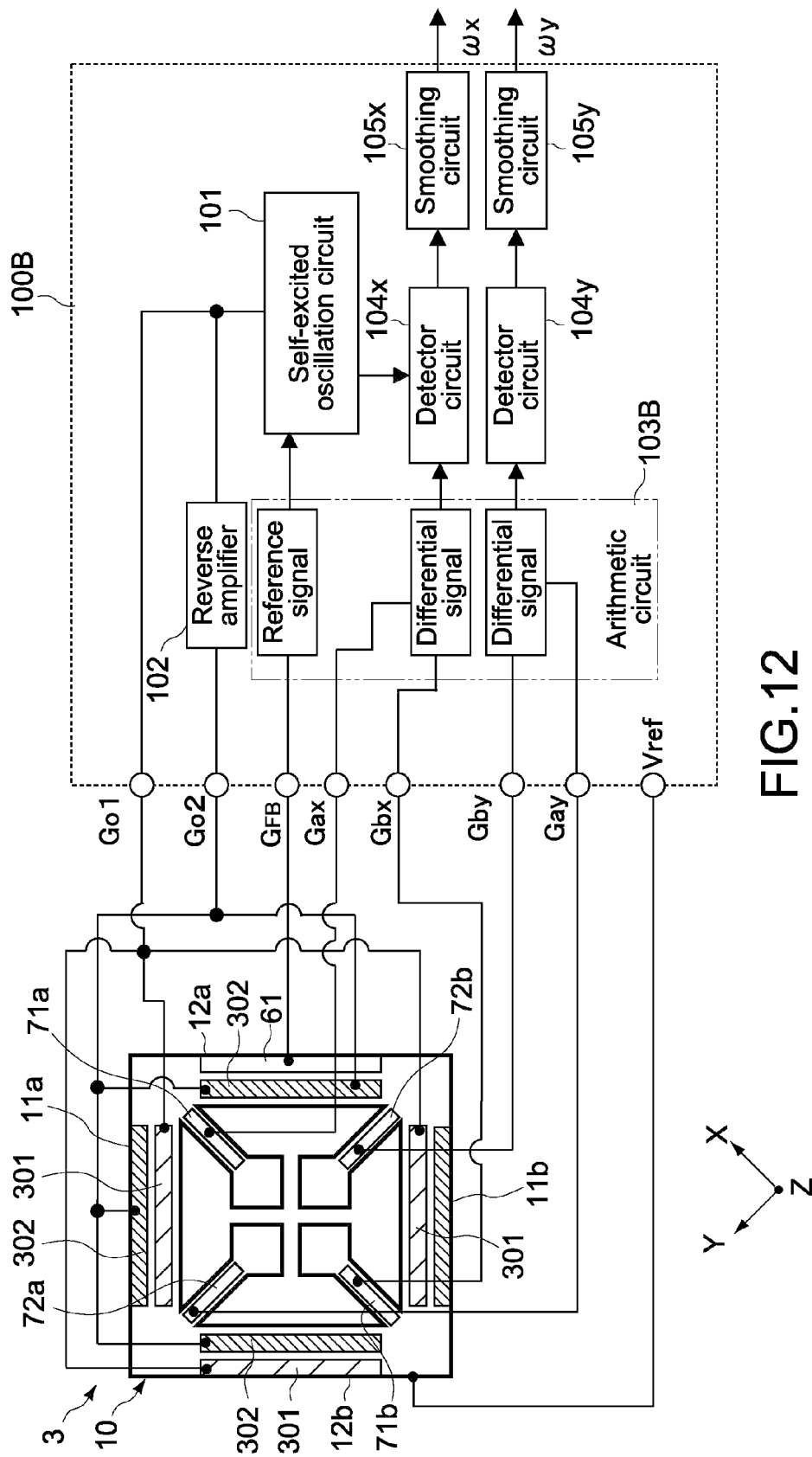
FIG. 12 is a block diagram showing one example of a drive circuit of the angular velocity sensor shown in FIG. 9.

Next, a drive circuit of the thus configured angular velocity sensor 3 will be described below. FIG. 12 is a block diagram of a drive circuit 100B of the angular velocity sensor 3. The drive circuit 100B is formed by an IC chip or an IC component packaged as one chip, for example. The angular velocity sensor 3 shown in FIG. 12 has the reference electrode 61 on the beam 12a, instead of the first drive electrode 301. In addition, constitutional elements in FIG. 12 identical to those in the drive circuit 100A shown in FIG. 7 are given reference symbols identical to those shown in FIG. 7.

The drive circuit 100B has a Go1 terminal, a Go2 terminal, a GFB terminal, a Gax terminal, a Gbx terminal, a Gay terminal, a Gby terminal, and a Vref terminal. The Go1 terminal is connected to the upper electrode layer 305 of the first drive electrode 301 (FIG. 2). The Go2 terminal is connected to the upper electrode layer 305 of the second drive electrode 302 (FIG. 2). The GFB terminal is connected to the reference electrode 61. The Gax terminal is connected to the upper electrode layer of the detection electrode 71*a*, and the Gbx terminal is connected to the upper electrode layer of the detection electrode 71*b*. The Gay terminal is connected to the upper electrode layer of the detection electrode 72*a*, and the Gby terminal is connected to the upper electrode layer of the detection electrode 72*b*. The Vref terminal is connected to the lower electrode layers 303 of the drive electrodes 301 and 302 (FIG. 2), and to the lower electrode layers of the detection electrodes 71*a*, 71*b*, 72*a*, and 72*b*.

In the drive circuit 100B, the Go1 terminal is connected to an output terminal of a self-excited oscillation circuit 101. The self-excited oscillation circuit 101 generates drive signals (alternating-current signals) for driving the drive electrodes 301 and 302. The Go2 terminal is connected to the output terminal of the self-excited oscillation circuit 101 via a reverse amplifier 102. The reverse amplifier 102 reverses a phase of the drive signal generated by the self-excited oscillation circuit 101. Accordingly, the first drive electrode 301 and the second drive electrode 302 expand and contract alternately in opposite phases. The Vref terminal is connected to a predetermined reference potential. The reference potential may be a ground potential or a specific offset potential.

The drive circuit 100B further has an arithmetic circuit 103B, detector circuits 104*x* and 104*y*, and smoothing circuits 105*x* and 105*y*. The GFB terminal, the Gax terminal, the Gbx terminal, the Gay terminal, and the Gby terminal are connected to input terminals of an arithmetic circuit 103B. The arithmetic circuit 103B generates a reference signal on the basis of an output voltage of the reference electrode 61 supplied via the GFB terminal, and outputs the same to the self-excited oscillation circuit 101. In addition, the arithmetic circuit 103B generates a differential signal of output voltages of the detection electrodes 71*a* and 71*b* supplied via the Gax terminal and the Gbx terminal, and outputs the same to the detector circuit 104*x*. Further, the arithmetic circuit 103B generates a differential signal of output voltages of the detection electrodes 72*a* and 72*b* supplied via the Gay terminal and the Gby terminal, and outputs the same to the detector circuit 104*y*.

The detector circuit 104*x* and 104*y* subject the differential signal to full-wave rectification for conversion into direct current, in synchronization with the output of the drive signal from the self-excited oscillation circuit 101 or the reference signal. The smoothing circuits 105*x* and 105*y* smooth out the output from the detector circuits. A direct-current voltage signal ωx output from the smoothing circuit 105*x* contains information on magnitude and direction of an angular velocity about the X-axis. A direct-current voltage signal ωy output from the smoothing circuit 105*y* contains information on magnitude and direction of an angular velocity about the Y-axis. Specifically, the magnitudes of the direct-current voltage signals ωx and ωy with respect to the reference potential Vref constitute information on the magnitudes of the angular velocities, and the polarities of the direct-current voltages constitute information on the directions of the angular velocities.

According to this embodiment as described above, it is possible to detect angular velocities about axes in the X-axis and Y-axis directions, on the basis of deformation of the frame 10 within the XZ and YZ planes, the frame 10 oscillating within the XY plane. This makes it possible to detect with high accuracy angular velocities about two axes in the X-axis and Y-axis directions without increasing the thickness of the sensor, and allow the sensor to be made thinner.

In addition, the angular velocity sensor of this embodiment can be incorporated into electronic apparatuses such as digital still cameras, video cameras, virtual reality apparatuses, and car navigation systems, and can be widely used as a sensor component for shake detection, motion detection, direction detection and the like. In particular, according to this embodiment, the sensor can be made smaller and thinner to thereby satisfy sufficiently demands for compact and thinner electronic apparatuses and the like.

(Third Embodiment)

FIG. 13 shows an angular velocity sensor in a third embodiment of the present invention. The angular velocity sensor in this embodiment is configured to be capable of detecting angular velocities about axes parallel to the X-axis, Y-axis, and Z-axis directions.

FIG. 13 is a plane view of a configuration of an angular velocity sensor 4 of this embodiment. In FIG. 13, components identical to those shown in FIGS. 6 and 9 are given reference symbols identical to those shown in FIGS. 6 and 9, and detailed descriptions on the same are omitted. The angular velocity sensor 4 of this embodiment is configured with the addition of detection electrodes 71*a* and 71*b* for detecting an angular velocity about the X-axis and detection electrodes 72*a* and 72*b* for detecting an angular velocity about the Y-axis, to the angular velocity sensor 2 shown in FIG. 6.

As shown in FIG. 13, the detection electrodes 71*a* and 71*b* detecting an angular velocity about the X-axis are disposed on surfaces of the first pendulum parts 21*a* and 21*b*, respectively. The detection electrodes 72*a* and 72*b* detecting an angular velocity about the Y-axis are disposed on surfaces of the second pendulum parts 22*a* and 22*b*, respectively. The detection electrodes 71*a*, 71*b*, 72*a*, and 72*b* are formed linearly on axis cores of arm parts L of the pendulum parts 21*a*, 21*b*, 22*a*, and 22*b*.

The detection electrodes 71*a*, 71*b*, 72*a*, and 72*b* are identical in configuration to the first and second drive electrodes 301 and 302, and are each constituted by a laminate of a lower electrode layer, a piezoelectric material layer, and an upper electrode layer (FIG. 2). The detection electrodes 71*a*, 71*b*, 72*a*, and 72*b* have a function of converting mechanical deformation of the arm parts L into electrical signals. In particular, the detection electrodes 71*a*, 71*b*, 72*a*, and 72*b* have a function of detecting deformation of the arm parts L in the Z-axis direction.

Figure 14:
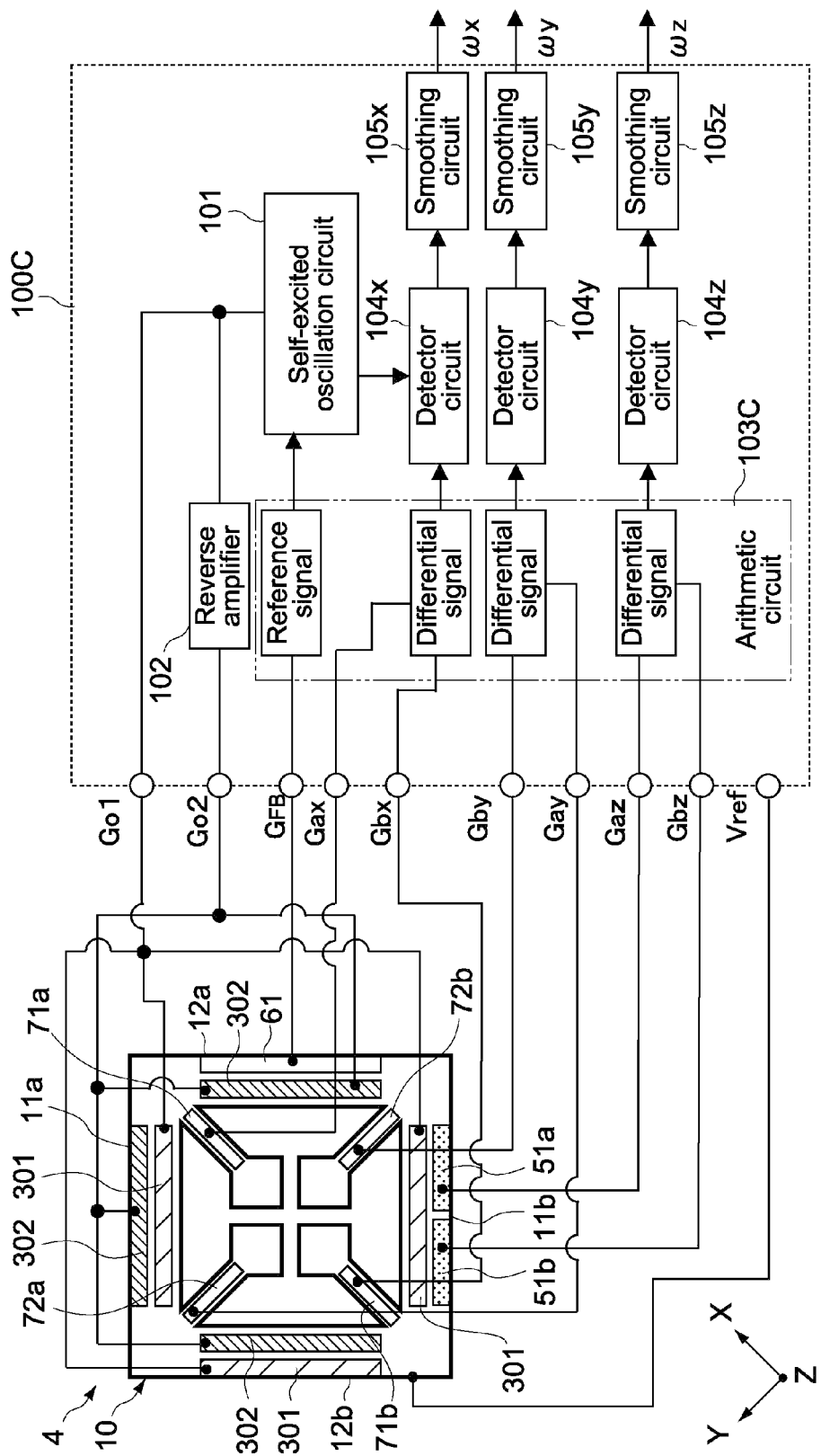
FIG. 14 is a block diagram showing one example of a drive circuit of the angular velocity sensor shown in FIG. 13.

Next, a drive circuit of the thus configured angular velocity sensor 4 will be described below. FIG. 14 is a block diagram of a drive circuit 100C of the angular velocity sensor 4. The drive circuit 100C is formed by an IC chip or an IC component packaged as one chip, for example. In addition, constitutional elements in FIG. 14 identical to those in the drive circuits 100A and 100B shown in FIGS. 7 and 12 are given reference symbols identical to those shown in FIGS. 7 and 12.

The drive circuit 100C has a Go1 terminal, a Go2 terminal, a GFB terminal, a Gax terminal, a Gbx terminal, a Gay terminal, a Gby terminal, a Gaz terminal, a Gbz terminal, and a Vref terminal. The Go1 terminal is connected to the upper electrode layer 305 of the first drive electrode 301 (FIG. 2). The Go2 terminal is connected to the upper electrode layer 305 of the second drive electrode 302 (FIG. 2). The GFB terminal is connected to the reference electrode 61. The Gax terminal is connected to the upper electrode layer of the detection electrode 71a, and the Gbx terminal is connected to the upper electrode layer of the detection electrode 71b. The Gay terminal is connected to the upper electrode layer of the detection electrode 72a, and the Gby terminal is connected to the upper electrode layer of the detection electrode 72b. The Gaz terminal is connected to the upper electrode layer of the detection electrode 51a, and the Gbz terminal is connected to the upper electrode layer of the detection electrode 51b. The Vref terminal is connected to the lower electrode layers 303 of the drive electrodes 301 and 302 (FIG. 2), and to the lower electrode layers of the detection electrodes 51a, 51b, 71a, 71b, 72a, and 72b.

In the drive circuit 100C, the Go1 terminal is connected to an output terminal of a self-excited oscillation circuit 101. The self-excited oscillation circuit 101 generates drive signals (alternating-current signals) for driving the drive electrodes 301 and 302. The Go2 terminal is connected to the output terminal of the self-excited oscillation circuit 101 via a reverse amplifier 102. The reverse amplifier 102 reverses a phase of the drive signal generated by the self-excited oscillation circuit 101. Accordingly, the first drive electrode 301 and the second drive electrode 302 expand and contract alternately in opposite phases. The Vref terminal is connected to a predetermined reference potential. The reference potential may be a ground potential or a specific offset potential.

The drive circuit 100C further has an arithmetic circuit 103C, detector circuits 104x, 104y, and 104z, and smoothing circuits 105x, 105y, and 105z. The GFB terminal, the Gax terminal, the Gbx terminal, the Gay terminal, the Gby terminal, the Gaz terminal, and the Gbz terminal are connected to input terminals of an arithmetic circuit 103C. The arithmetic circuit 103C generates a reference signal on the basis of an output voltage of the reference electrode 61 supplied via the GFB terminal, and outputs the same to the self-excited oscillation circuit 101. The arithmetic circuit 103C generates a differential signal of output voltages of the detection electrodes 71a and 71b supplied via the Gax terminal and the Gbx terminal, and outputs the same to the detector circuit 104x. Further, the arithmetic circuit 103C generates a differential signal of output voltages of the detection electrodes 72a and 72b supplied via the Gay terminal and the Gby terminal, and outputs the same to the detector circuit 104y. Moreover, the arithmetic circuit 103C generates a differential signal of output voltages of the detection electrodes 51a and 51b supplied via the Gaz terminal and the Gbz terminal, and outputs the same to the detector circuit 104z.

The detector circuits 104x, 104y, and 104z subject the differential signal to full-wave rectification for conversion into direct current, in synchronization with the output of the drive signal from the self-excited oscillation circuit 101 or the reference signal. The smoothing circuits 105x, 105y, and 105z smooth out the output from the detector circuits. A direct-current voltage signal ωx output from the smoothing circuit 105x contains information on magnitude and direction of an angular velocity about the X-axis. A direct-current voltage signal ωy output from the smoothing circuit 105y contains information on magnitude and direction of an angular velocity about the Y-axis. In addition, a direct-current voltage signal ωz output from the smoothing circuit 105z contains information on magnitude and direction of an angular velocity about the Z-axis. Specifically, the magnitudes of the direct-current voltage signals ωx, ωy, and ωz with respect to the reference potential Vref constitute information on the magnitudes of the angular velocities, and the polarities of the direct-current voltages constitute information on the directions of the angular velocities.

According to this embodiment as described above, it is possible to detect angular velocities about axes in the X-axis, Y-axis, and Z-axis directions, on the basis of deformation of the frame 10 within the XZ, YZ, and XY planes, the frame 10 oscillating within the XY plane. This makes it possible to detect with high accuracy angular velocities about three axes in the X-axis, Y-axis, and Z-axis directions without increasing the thickness of the sensor, and allows the sensor to be made thinner.

In addition, the angular velocity sensor of this embodiment can be incorporated into electronic apparatuses such as digital still cameras, video cameras, virtual reality apparatuses, and car navigation systems, and can be widely used as a sensor component for shake detection, motion detection, direction detection and the like. In particular, according to this embodiment, the sensor can be made smaller and thinner to thereby satisfy sufficiently demands for compact and thinner electronic apparatuses and the like.

(Fourth Embodiment)

Figure 15:
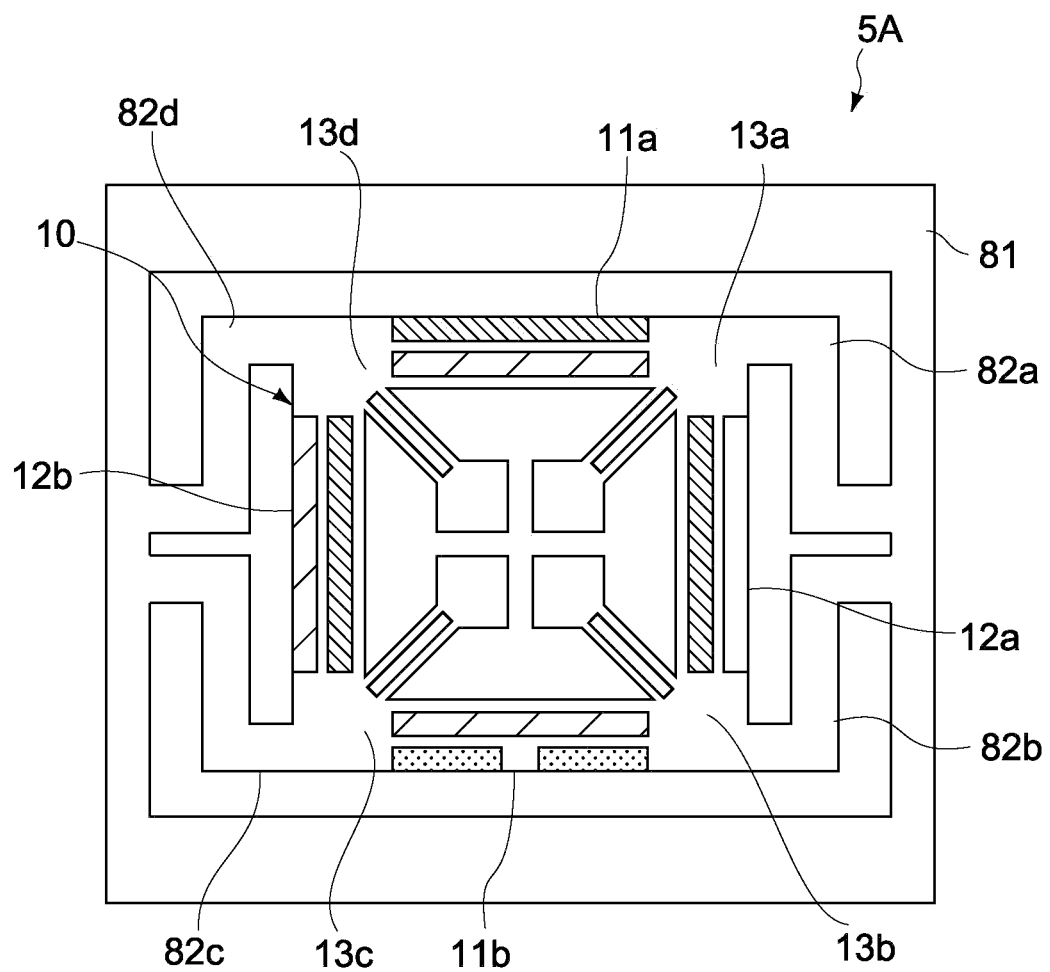
FIG. 15 is a plane view of a configuration of an angular velocity sensor in a fourth embodiment of the present invention.
Figure 16:
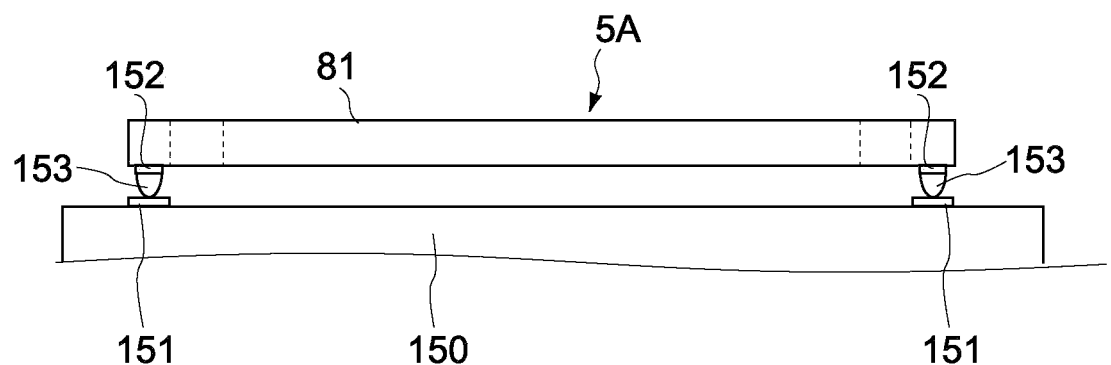
FIG. 16 is a side view of the angular velocity sensor shown in FIG. 15.

FIGS. 15 and 16 show an angular velocity sensor in a fourth embodiment of the present invention. The frame 10 may be identical in configuration and electrode disposition to those in any of the first to third embodiments. In this embodiment, electrode disposition on the frame 10 is identical to the electrode disposition shown in FIG. 13.

FIG. 15 is a plane view of a configuration of an angular velocity sensor 5A of this embodiment. FIG. 16 is a side view of the angular velocity sensor 5A mounted on a circuit substrate 150. The angular velocity sensor 5A of this embodiment includes a support part for connecting the frame 10 to the circuit substrate 150 as a fixing part. The support part has a base 81 and coupling parts 82a, 82b, 82c, and 82d.

The base 81 is formed in the shape of a square box surrounding the outside of the frame 10. The base 81 has a plurality of electrode pads 152 connected electrically to the circuit substrate. The electrode pads 152 each have a bump 153. The electrode pads 152 are connected electrically and mechanically via the bumps 153 to a plurality of lands 151 on the circuit substrate 150. That is, the angular velocity sensor 5A of this embodiment is mounted on the circuit substrate 150 by the flip-chip method. Alternatively, the angular velocity sensor 5A may be mounted by connecting electrically and mechanically the electrode pads and the circuit substrate by simple soldering without formation of bumps.

In addition, the angular velocity sensor 5A may be mounted by a wire bonding method. In this case, the angular velocity sensor 5A is mechanically connected by bonding or the like in a reversed state to the circuit board in contrast to the example shown in FIG. 16, that is, such that a plurality of electrode pads are located upward. After that, the electrode pads are electrically connected by wire bonding to the circuit substrate.

The coupling parts 82a to 82d are formed between the connection parts 13a to 13d and the base 81, respectively. The coupling parts 82a to 82d have bend portions bending in a crank pattern at about 90 degrees, and are formed integrally with the frame 10 so as to be capable of deforming mainly within the XY plane in response to oscillation of the frame 10. The coupling parts 82a and 82b are connected to the base 81 in areas opposed to the beam 12a, and the coupling parts 82c and 82d are connected to the base 81 in areas opposed to the beam 12b. In addition, the coupling parts 82a to 82d have on surfaces thereof wiring layers for electrically connecting the upper electrode layers and lower electrode layers of the drive electrodes 301 and 302 and the detection electrodes 51a, 51b, 71a, 71b, 72a, and 72b and the corresponding electrode pads 152.

According to the thus configured angular velocity sensor 5A of this embodiment, it is possible to absorb or moderate an oscillation component transferred from the frame 10 to the base 81 through deformation of the coupling parts 82a to 82d. Accordingly, it is possible to mount the angular velocity sensor 5A stably on the circuit board 150 without inhibiting oscillation of the frame 10, thereby providing a high-accuracy angular velocity detecting function and reliable mounting.

In the foregoing example, the frame, the coupling parts, and the base are all formed in identical thickness. Accordingly, the thickness of the frame, the coupling parts, and the base is determined by the thickness of a silicon monocrystalline substrate as a starting material at a manufacturing process. This reduces thickness variations and provides stable characteristics of the angular velocity sensor.

However, the frame, the coupling parts, and the base do not necessarily need to be identical in thickness. For example, the base may be thicker than the frame and the coupling parts. This improves handling properties of the angular velocity sensor at the time of manufacture. In addition, this prevents deformation and breakage of the base when mounting the angular velocity sensor on the circuit substrate or the like.

Figure 17:
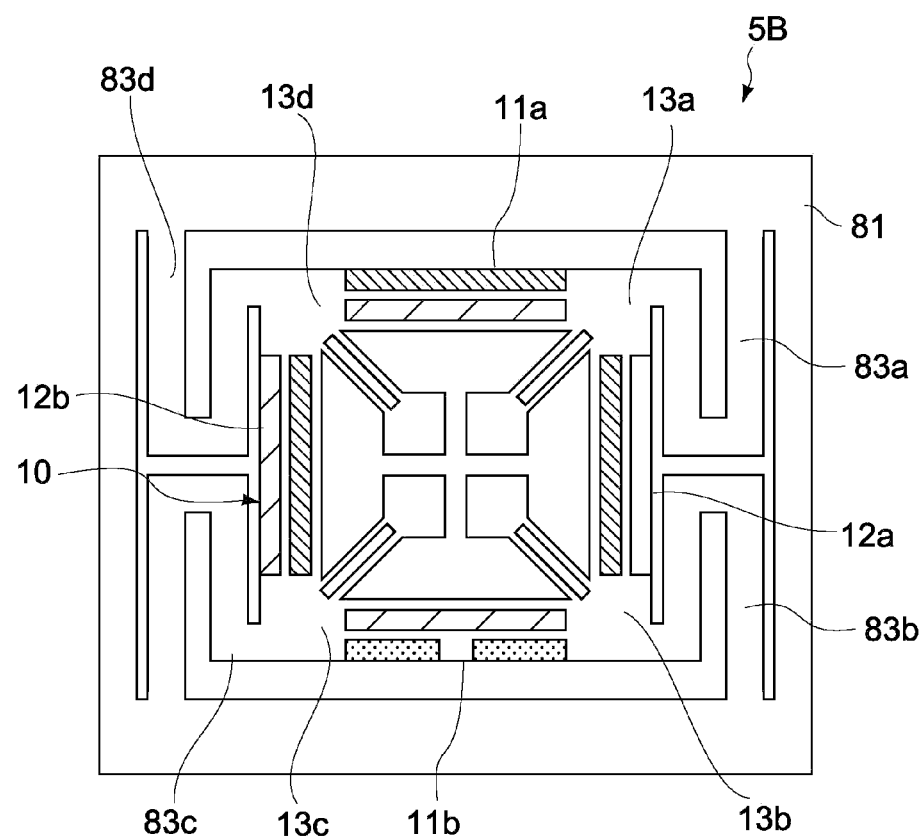
FIG. 17 is a plane view of one modification example of a configuration of the angular velocity sensor shown in FIG. 15.
Figure 18:
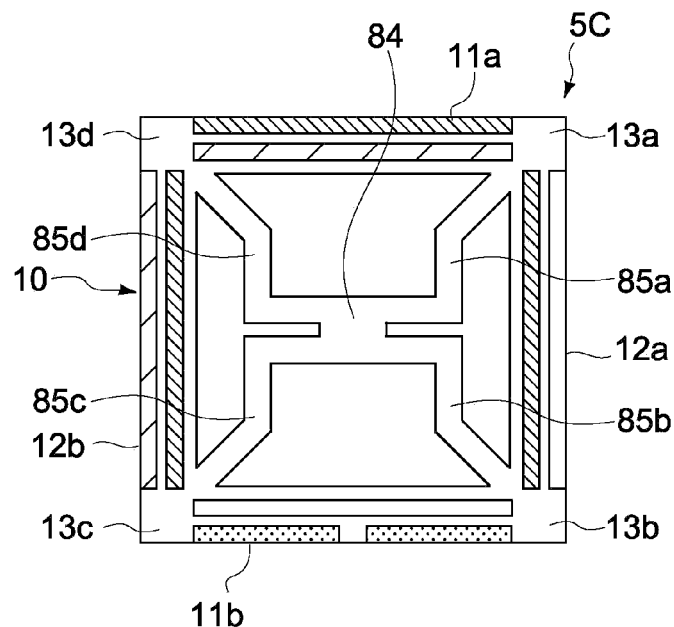
FIG. 18 is a plane view of one modification example of a configuration of the angular velocity sensor shown in FIG. 15.

The coupling parts for coupling the frame 10 with the base 81 are not limited to the foregoing example, and may be configured as shown in FIGS. 17 and 18, for instance. In the angular velocity sensor 5B shown in FIG. 17, the coupling parts 83a to 83d for coupling the connection parts 13a to 13d of the frame 10 with the base 81 have turn parts with an approximate 180-degree turn. In this example, the coupling parts 83a and 83d are connected to an area opposed to the beam 11a of the base 81, and the coupling parts 83b and 83c are connected to an area opposed to the beam 11b of the base 81. The angular velocity sensor 5B of this embodiment provides the same advantages as those of the angular velocity sensor 5A.

Since the angular velocity sensor 5B has the coupling parts longer than those of the angular velocity sensor 5A, the angular velocity sensor 5B is excellent in being less prone to inhibit oscillation of the frame 10, but on the other hand, the angular velocity sensor 5B becomes larger in size including the base. Accordingly, the size of the angular velocity sensor may be decided in a fine balance between the two embodiments upon due consideration of oscillation characteristics.

In addition, both of the angular velocity sensors 5A and 5B have the coupling parts disposed in line symmetry to the a-axis and the b-axis. Alternatively, the coupling parts may be disposed in of four-rotation symmetry, for example. However, it is difficult to design the frame in such a manner that, when the frame is subjected by Coriolis force to strain deformation as shown in FIG. 5, the frame is stably deformed in symmetry even if the Coriolis force acts in both of forward and reverse directions. Accordingly, the coupling parts are preferably configured in line symmetry to the a-axis and the b-axis, as shown in FIGS. 15 and 17.

Meanwhile, an angular velocity sensor 5C shown in FIG. 18 is configured to be connected to the circuit substrate 150 on the inner periphery side of the frame 10, and has a base 84 and coupling parts 84a to 84d for coupling the connection parts 13a to 13d of the frame 10 with the base 84. The angular velocity sensor 5C of this example provides the same advantages as those of the angular velocity sensor 5A. In particular, according to this example, it is possible to mount the angular velocity sensor 5C in an area size identical to that of the frame 10, thereby resulting in reduction of an mounting area on the circuit substrate 150.

(Fifth Embodiment)

FIGS. 19 to 22 show angular velocity sensors in a fifth embodiment of the present invention. In each of the illustrated sensors, a configuration of the frame 10 and electrode disposition on the frame 10 may be identical to any of those in the first to third embodiments. In this embodiment, electrode disposition on the frame 10 is identical to the electrode disposition shown in FIG. 13.

Figure 19:
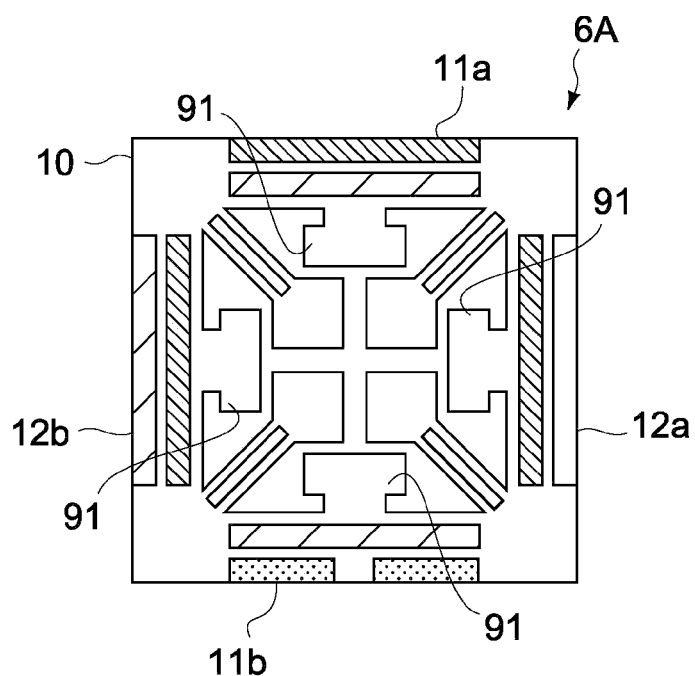
FIG. 19 is a plane view of a configuration of an angular velocity sensor in a fifth embodiment of the present invention.

An angular velocity sensor 6A shown in FIG. 19 has on the beams 11a, 11b, 11c, and 11d of the frame 10 weight portions 91 constituting oscillation weights of these beams. The weight portions 91 are formed on inner middle portions of the beams. The weight portions 91 may be configured to be capable of deformation with respect to the beams 11a, 11b, 12a, and 12b. By setting as appropriate the shape, size, weight, and number of the weight portions 91, it is possible to adjust easily the beams 11a, 11b, 12a, and 12b in amplitude, resonance frequency, degree of detuning, and the like, at the basic oscillation of the frame 10.

The weight portions may be formed on not all the beams but only one arbitrary beam. In addition, the weight portions may be formed on not the insides of the beams but the outsides of the same or both the insides and outsides of the same. In the latter case, the weight portions may be identical in shape, size, or weight between the insides and outsides of the beams or may be different. In addition, the weight portions may be formed integrally with the beams or may be formed as members different from the beams.

Figure 20:
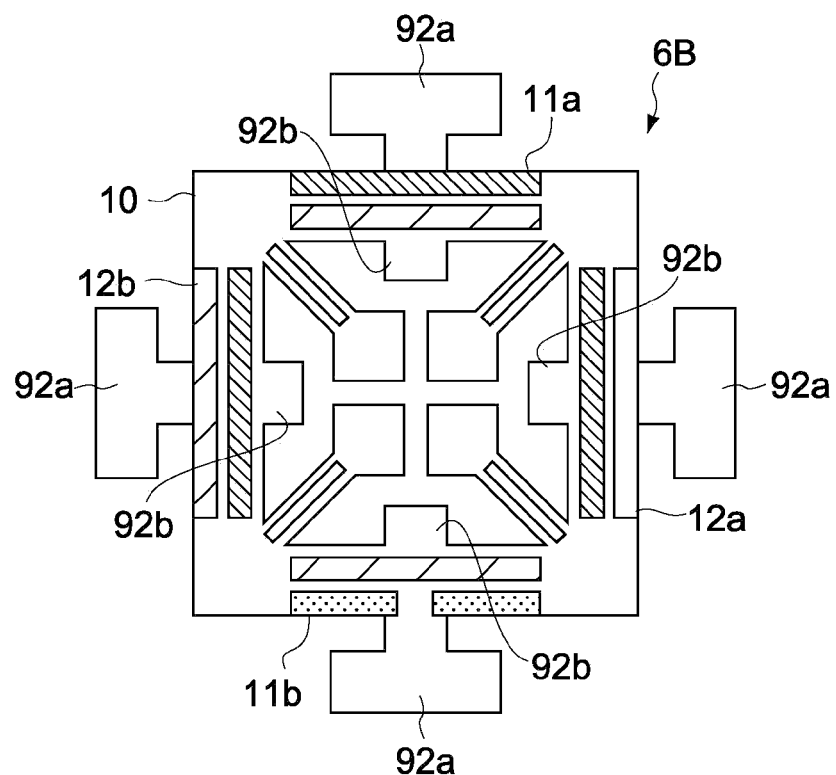
FIG. 20 is a plane view of one modification example of a configuration of the angular velocity sensor shown in FIG. 19.

For example, the angular velocity sensor 6B shown in FIG. 20 has weight portions 92a and 92b at the beams 11a, 11b, 12a, and 12b on the insides and outsides of middle portions. In this example, the weight portions 92a and 92b are different in shape, and the weight portions 92b are heavier in weight than the weight portions 92a.

Figure 21:
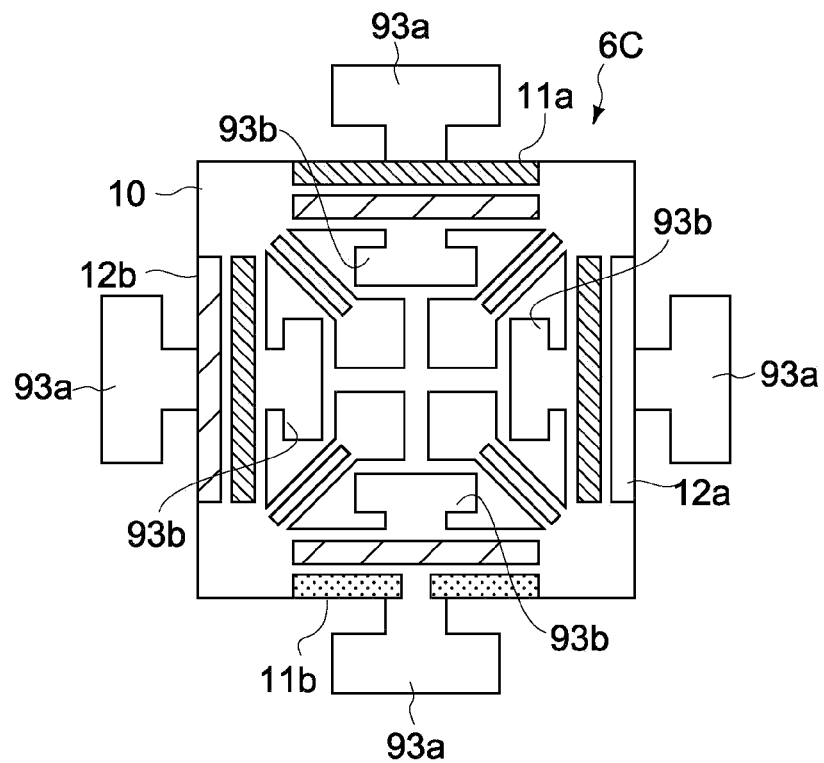
FIG. 21 is a plane view of one modification example of a configuration of the angular velocity sensor shown in FIG. 19.

In addition, the angular velocity sensor 6C shown in FIG. 21 has weight portions 93a and 93b on the insides and outsides of middle portions of the beams 11a, 11b, 12a, and 12b. In this example, the weight portions 93a and 93b are different in size, and the weight portions 93a are heavier in weight than the weight portions 93b.

Figure 22:
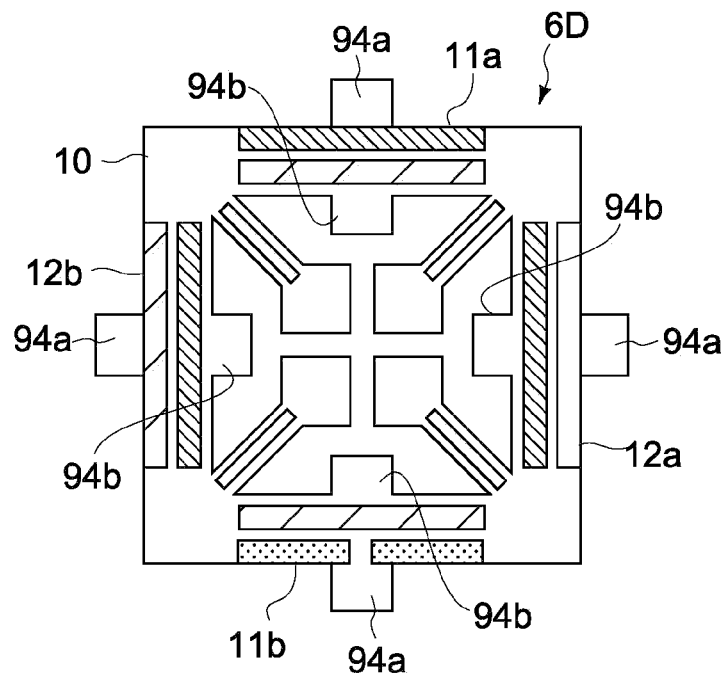
FIG. 22 is a plane view of one modification example of a configuration of the angular velocity sensor shown in FIG. 19.

Further, an angular velocity sensor 6D shown in FIG. 22 has weight portions 94a and 94b on the insides and outsides of middle portions of the beams 11a, 11b, 12a, and 12b. In this example, the weight portions 94a and 94b are identical in shape, size, and weight.

(Sixth Embodiment)

Figure 23:
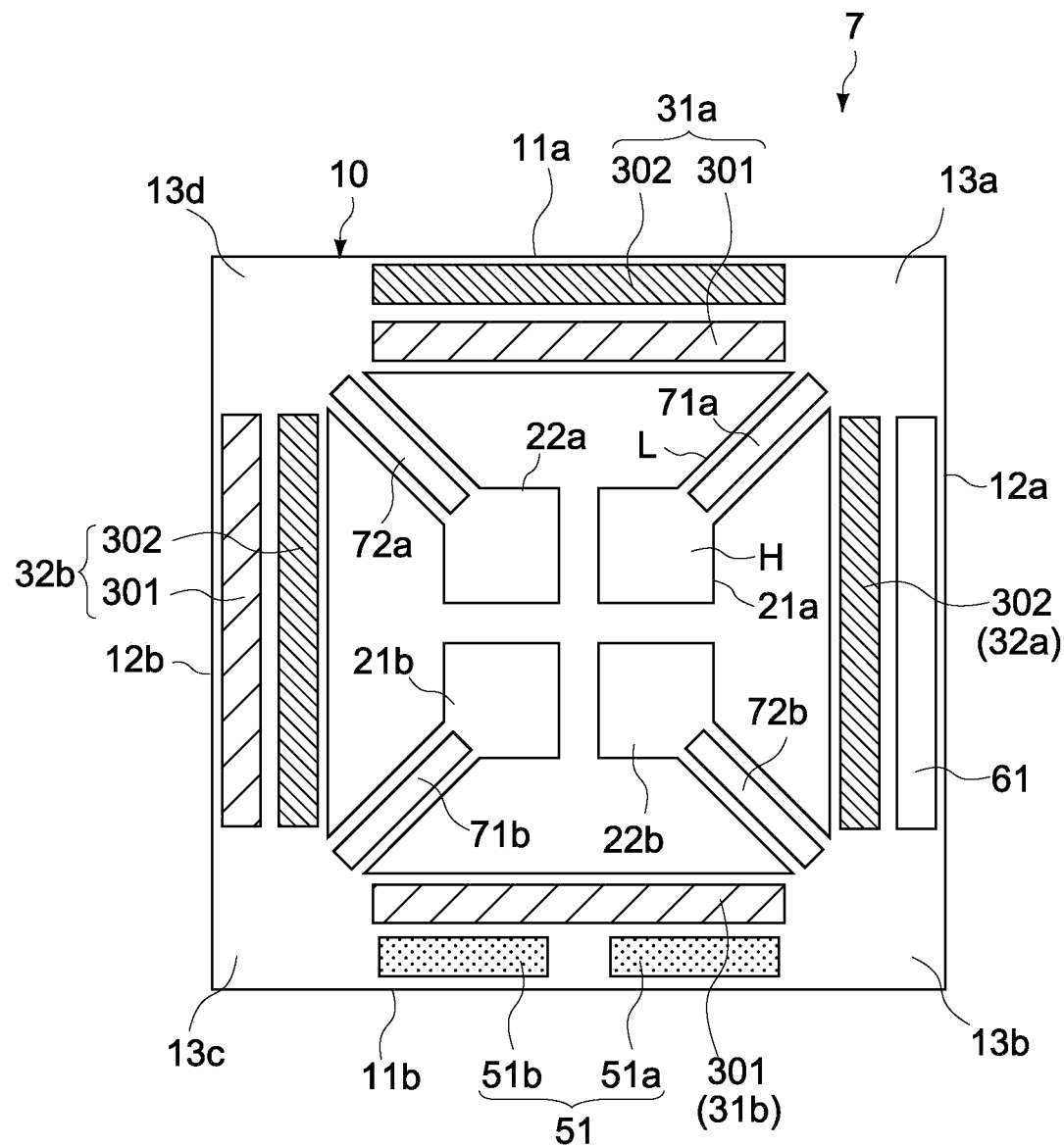
FIG. 23 is a plane view of a configuration of an angular velocity sensor in a sixth embodiment of the present invention.
Figure 24:
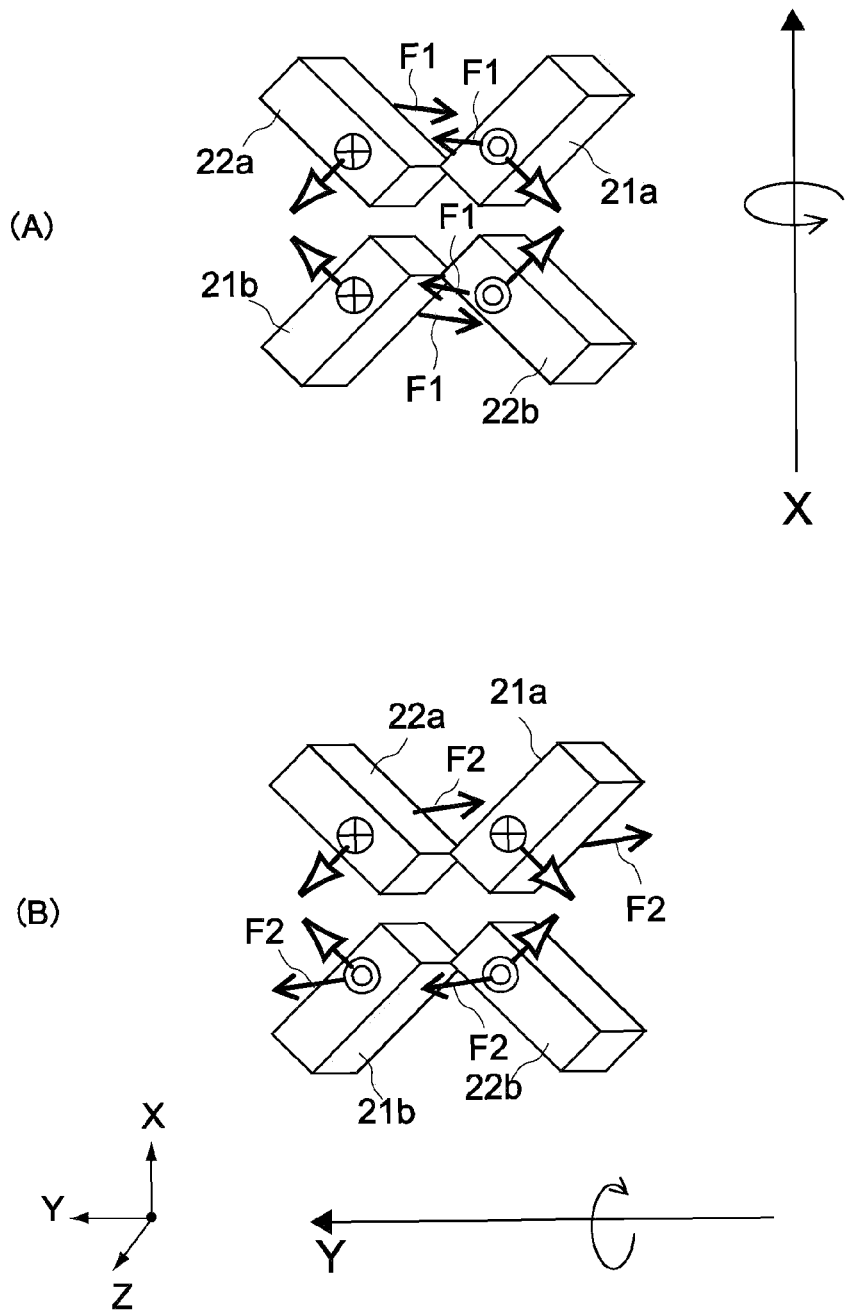
FIG. 24 are diagrams for describing an operation of the angular velocity sensor shown in FIG. 23.
Figure 25:
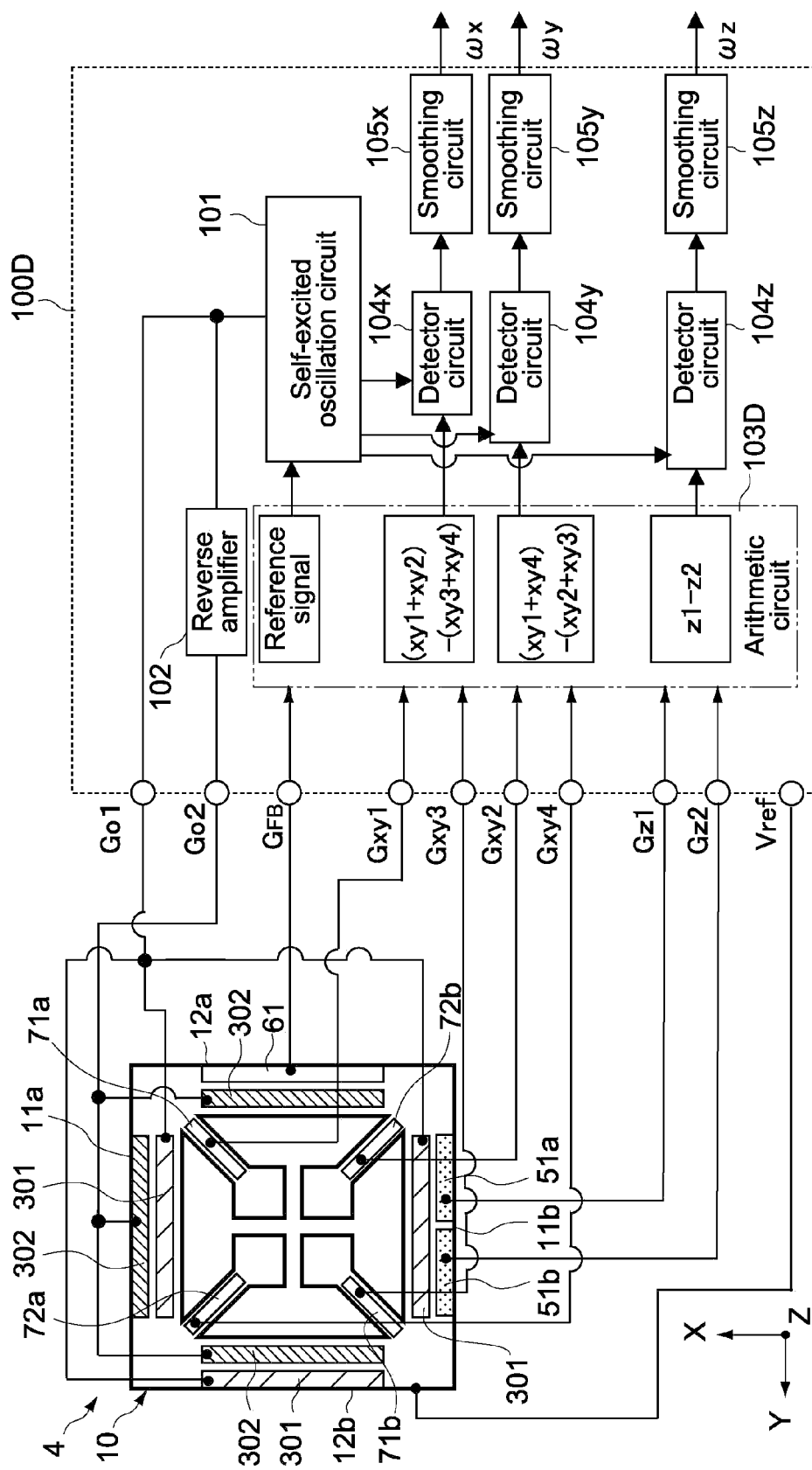
FIG. 25 is a block diagram of one example of a drive circuit of the angular velocity sensor shown in FIG. 23.

FIGS. 23 to 25 show an angular velocity sensor in a sixth embodiment of the present invention. The angular velocity sensor will be described below mainly as to arrangements different from those in the first to third embodiments, and components identical to those in the foregoing embodiments are given reference symbols identical to those in the foregoing embodiments, and descriptions on the same are omitted or made briefly.

FIG. 23 is a plane view of an angular velocity sensor 7 of this embodiment. In this embodiment, one angular velocity detection axis (Y-axis) is set in an axial direction parallel to the a-axis, and the other angular velocity detection axis (X-axis) is set in an axial direction parallel to the b-axis. In this arrangement, the detection electrodes 71a, 71b, 72a, and 72b formed on the pendulum parts 21a, 21b, 22a, and 22b function as detection parts for detecting an angular velocity about the X-axis and an angular velocity about the Y-axis.

Alternating-current voltages are applied to the drive electrodes 301 and 302 in opposite phases. Accordingly, the beams 11a, 11b, 12a, and 12b and the pendulum parts 21a, 21b, 22a, and 22b of the frame 10 oscillate in the oscillation mode (basic oscillation) shown in FIG. 4. FIG. 24(A) is a schematic perspective diagram for describing oscillation forms of the pendulum parts 21a, 21b, 22a, and 22b with an angular velocity about the X-axis acting on the frame 10. FIG. 24(B) is a schematic perspective diagram for describing oscillation forms of the pendulum parts 21a, 21b, 22a, and 22b with an angular velocity about the Y-axis acting on the frame 10.

When an angular velocity about the X-axis acts on the frame 10 oscillating in the basic oscillation, Coriolis force F1 is generated on the pendulum parts 21a, 21b, 22a, and 22b in directions orthogonal to oscillation directions at that moment as shown in FIG. 24(A). Accordingly, one set of the pendulum part 21a and the pendulum part 22b adjacent to each other in the X-axis direction are deformed by the Coriolis force F1 in a positive direction of the Z-axis, and then amounts of deformation of the same are detected by the detection electrodes 71a and 72b. In addition, the other set of the pendulum part 22a and the pendulum part 21b adjacent to each other in the X-axis direction are deformed by the Coriolis force F1 in a negative direction of the Z-axis, and then amounts of deformation of the same are detected by the detection electrodes 72a and 71b.

In contrast, when an angular velocity about the Y-axis acts on the frame 10 oscillating in the basic oscillation, Coriolis force F2 is generated on the pendulum parts 21a, 21b, 22a, and 22b in directions orthogonal to oscillation directions at that moment as shown in FIG. 24(B). Accordingly, one set of the pendulum part 21a and the pendulum part 22a adjacent to each other in the Y-axis direction are deformed by the Coriolis force F2 in a negative direction of the Z-axis, and then amounts of deformation of the same are detected by the detection electrodes 71a and 72a. In addition, the other set of the pendulum parts 21b and 22b adjacent to each other in the Y-axis direction are deformed by Coriolis force F2 in a positive direction of the Z-axis, and then amounts of deformation of the same are detected by the detection electrodes 71b and 72b.

Even if angular velocities are generated about axes intersecting obliquely with the X-axis and the Y-axis, angular velocity detection is also carried out on the same principles as described above. Specifically, the pendulum parts 21a, 21b, 22a, and 22b are deformed by Coriolis force in accordance with an X-direction component and a Y-direction component of the angular velocities, and amounts of deformation of the same are detected by the detection electrodes 71a, 71b, 72a, and 72b. A drive circuit of the angular velocity sensor 7 extracts an angular velocity about the X-axis and an angular velocity about the Y-axis, on the basis of output from these detection electrodes. Accordingly, it is possible to detect an angular velocity about an arbitrary axis parallel to the XY plane.

FIG. 25 is a block diagram of a drive circuit 100D of the angular velocity sensor 7. The drive circuit 100D has a Gxy1 terminal, a Gxy2 terminal, a Gxy3 terminal, a Gxy4 terminal, a Gz1 terminal, and a Gz2 terminal, which are electrically connected to detection electrodes of the angular velocity sensor 7. The Gxy1 terminal is connected to a detection electrode 71a of the pendulum part 21a, and the Gxy2 terminal is connected to a detection electrode 72b of the pendulum part 22a. The Gxy3 terminal is connected to a detection electrode 71b of the pendulum part 21b, and the Gxy4 terminal is connected to a detection electrode 72a of the pendulum part 22b. The Gz1 terminal is connected to a detection electrode 51a of the frame 10, and the Gz2 terminal is connected to a detection electrode 51b of the frame 10.

An arithmetic part 103D of the drive circuit 100D has a first difference circuit for generating an angular velocity signal about the X-axis, a second difference circuit for generating an angular velocity signal about the Y-axis, and a third difference circuit for generating an angular velocity signal about the Z-axis. The assumption is made that output from the detection electrode 71a is designated as xy1, output from the detection electrode 72b is designated as xy2, output from the detection electrode 71b is designated as xy3, output from the detection electrode 72a is designated as xy4, output from the detection electrode 51a is designated as z1, and output from the detection electrode 51b is designated as z2. On the assumption, the first difference circuit calculates (xy1+xy2)−(xy3+xy4), and outputs a calculated value to the detector circuit 104x. The second difference circuit calculates (xy1+xy4)−(xy2+xy3), and outputs a calculated value to the detector circuit 104y. The third difference circuit calculates (z1−z2), and outputs a calculated value to the detector circuit 104z.

That is, the angular velocity sensor 7 of this embodiment outputs an angular velocity about the Y-axis parallel to the a-axis and an angular velocity about the X-axis parallel to the b-axis.

The angular velocity sensor is housed in a square package for mounting on an external circuit. In this mode, generally, the angular velocity sensor outputs angular velocities about axes in directions parallel to sides of the square of the package. In such a case, the package can be reduced in size by using this embodiment capable of outputting angular velocities about axes parallel to the a- and b-axes.

In addition, the thus configured angular velocity sensor 7 of this embodiment allows high-accuracy detection of an angular velocity in the X-axis direction and an angular velocity in the Y-axis direction, which makes it possible to output an angular velocity about an axis in an arbitrary direction within the XY plane, through simple calculations with the detected angular velocities.

Similarly, the angular velocity sensors of the second and third embodiments allow high-accuracy detection of an angular velocity in the X-axis direction and an angular velocity in the Y-axis direction with a 45-degree turn with respect to the a-axis and b-axis within an ab plane. Therefore, it is possible to output an angular velocity about an axis in an arbitrary direction within the ab (XY) plane, through simple calculations with these detected angular velocities.

(Seventh Embodiment)

Figure 26:
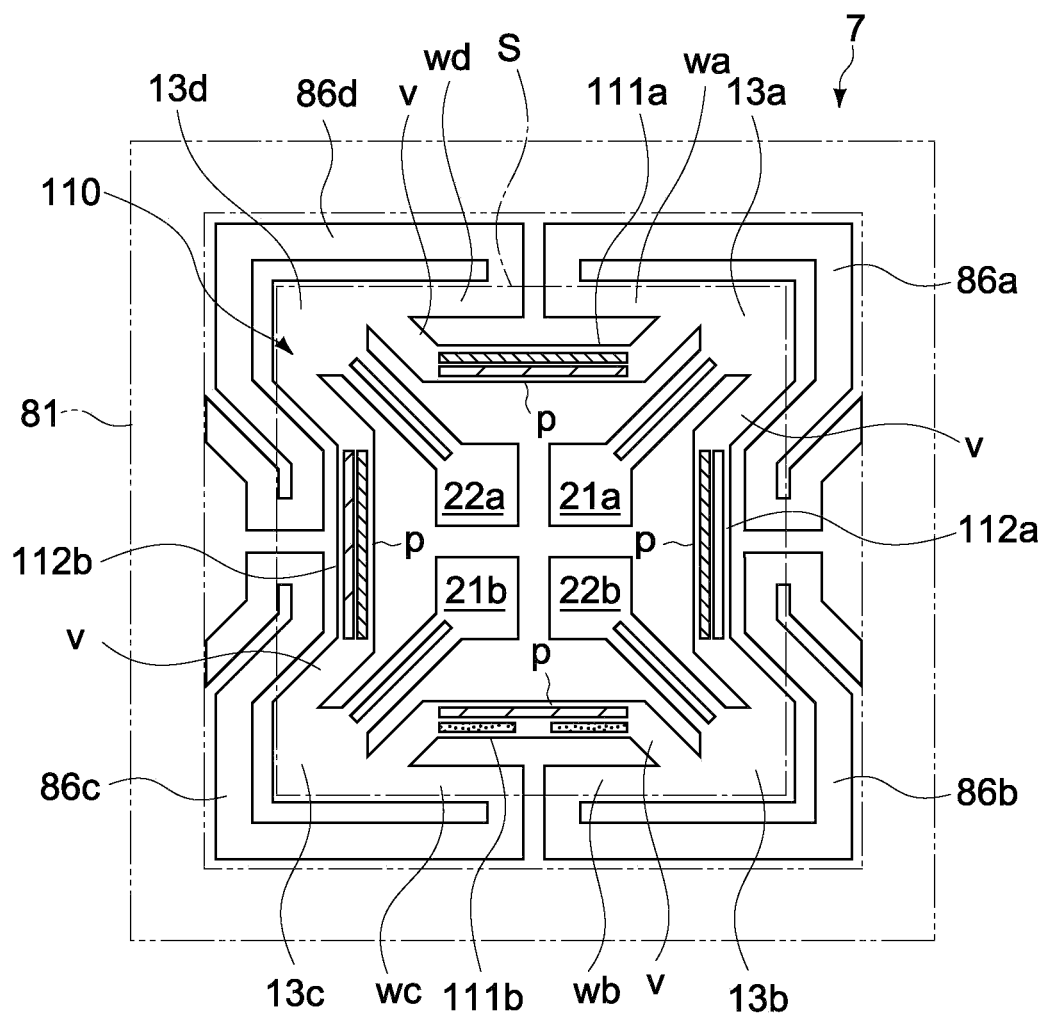
FIG. 26 is a plane view of a configuration of an angular velocity sensor in a seventh embodiment of the present invention.

FIG. 26 is a plane view of an angular velocity sensor in a seventh embodiment of the present invention. Hereinafter, arrangements different from those in the first to fourth embodiments will be mainly described. Components identical to those in the foregoing embodiments are given reference symbols identical to those in the foregoing embodiments, and descriptions on the same are omitted or made briefly.

The angular velocity sensor 7 of this embodiment has an annular frame 110 of an approximate foursquare shape. The frame 110 has a plurality of connection parts 13a to 13d connecting a first set of beams 111a and 111b and a second set of beams 112a and 112b. The connection parts are disposed at four corners of the frame 110 corresponding to apexes of the foursquare. The first set of beams 111a and 111b and the second set of beams 112a and 112b each have projection parts p projecting toward an inside of a foursquare S with the connection parts 13a to 13d as apexes (FIG. 26), and are formed as a whole in the shape of an arch.

The beams 111a, 11b, 112a, and 112b have the projection parts p and slant parts v fixing both ends of the projection parts p to the connection parts 13a to 13d. The slant parts v are formed on the both ends of the projection parts p to support the projection parts p such that the projection parts p are located on the inside of the foursquare S.

The projection parts p in the first set of beams 111a and 111b are formed parallel to the a-axis direction and opposed to each other in the b-axis direction. The projection parts p in the second set of beams 112a and 112b are formed parallel to the b-axis direction and opposed to each other in the a-axis direction. The projection parts p have on surfaces drive electrodes as in the foregoing embodiments. The projection part in a predetermined beam has a detection electrode and a reference electrode.

In the thus configured frame 110, the beams 111a, 111b, 112a, and 112b are formed in the shape of an arch. Accordingly, even if an area occupied by the frame is reduced, the beams forming the frame are not made shorter, thereby causing less change in resonance frequency in the oscillation mode. Therefore, if an angular velocity acts about a c-axis (z-axis), for example, the strain deformation within the ab plane as shown in FIG. 5 is not inhibited, thereby making it possible to maintain detection sensitivity for an angular velocity about the c-axis (z-axis).

Meanwhile, the angular velocity sensor 7 of this embodiment has coupling parts 86a, 86b, 86c, and 86d for coupling the frame 110 with the fixing part 81, as shown in FIG. 26. The coupling parts 86a to 86d have coupling end portions wa to wd extending linearly from the connection parts 13a to 13d toward the opposed connection parts in the a-axis direction, respectively.

Specifically, the coupling part 86a has the coupling end portion wa extending linearly from the connection part 13a toward the connection part 13d, and the coupling part 86b has the coupling end portion wb extending linearly from the connection part 13b toward the connection part 13c. Similarly, the coupling part 86c has the coupling end portion wc extending linearly from the connection part 13c toward the connection part 13b, and the coupling part 86d has the coupling end portion wd extending linearly from the connection part 13d toward the connection part 13a.

The coupling end portions wa to wd may extend not only in the a-axis direction but also in the b-axis direction. When the coupling end portions wa to wd extend in the a-axis direction or the b-axis direction, the shape of the angular velocity sensor 7 become symmetrical with respect to the a-axis direction or the b-axis direction, which facilitates adjustment of oscillation characteristics of the frame 110. As a matter of course, besides the foregoing arrangement, the coupling end portion extending in the a-axis direction and the coupling end portion extending in the b-axis direction may coexist. In addition, the coupling end portions may extend in an oblique direction with respect to the a-axis or b-axis direction, but the coupling end portions are advantageously formed along the a-axis or b-axis direction as described later for miniaturization of the element.

Figure 27:
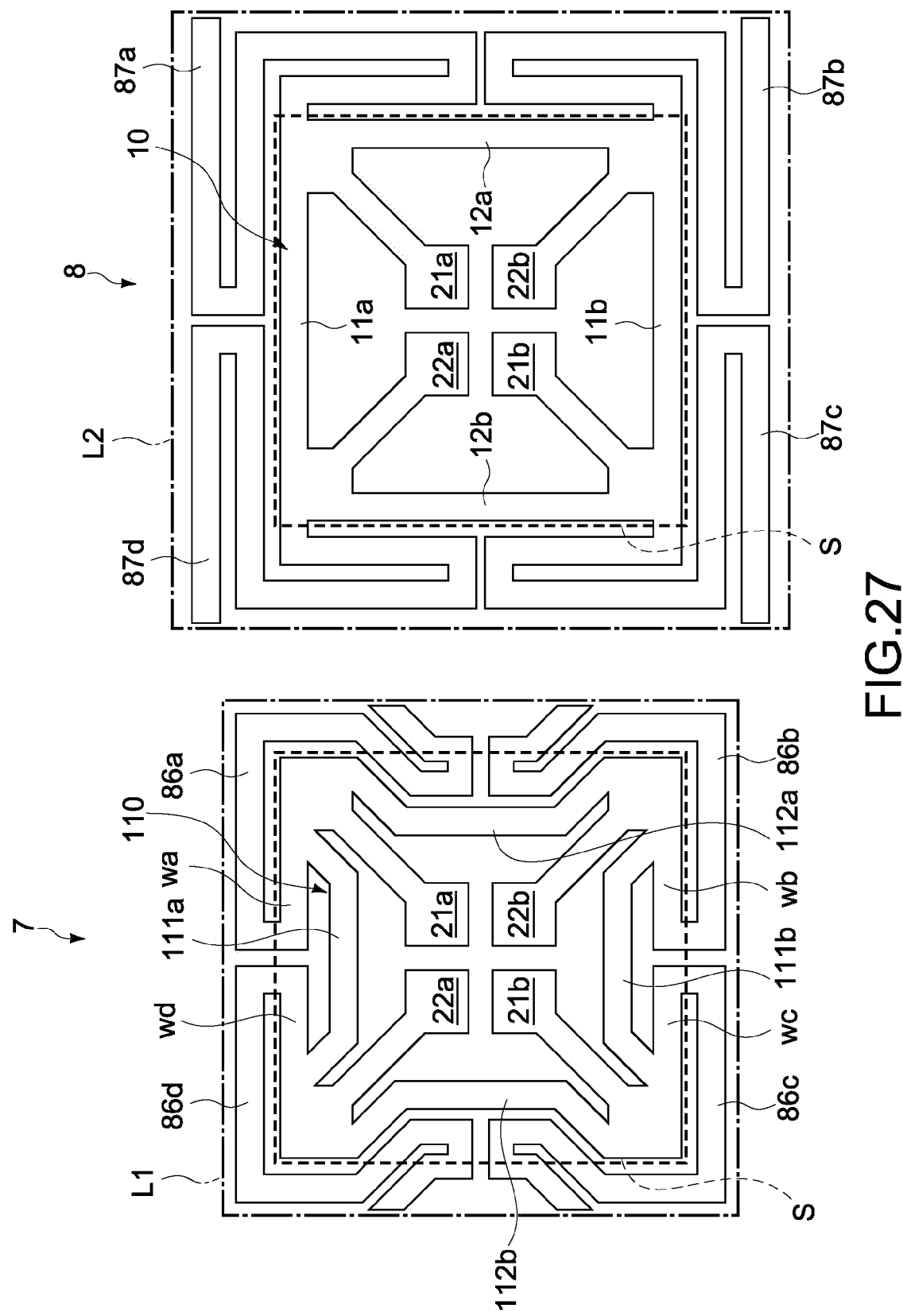
FIG. 27 is a plane view of one example of an element size of the angular velocity sensor shown in FIG. 26, in comparison with another angular velocity sensor.

Configuring the coupling parts 86a to 86d as described above realizes size reduction of the angular velocity sensor 7. FIG. 27 is a plane view of comparison in size between the angular velocity sensor 7 of this embodiment and an angular velocity sensor 8 of another embodiment: (A) shows the angular velocity sensor 7; and (B) shows the angular velocity sensor 8.

The angular velocity sensor 8 as a comparative example has a foursquare frame 10 and four coupling parts 87a, 87b, 87c, and 87d for fixing the frame 10 to a fixing part not shown.

The frame 10 is formed by first and second sets of linear beams 11a, 11b, 12a, and 12b as in the first embodiment, for example.

Here, the assumption is made that an outer shape of the frame 110 of the angular velocity sensor 7 is formed by a foursquare S of a size corresponding to the frame 10 of the angular velocity sensor 8. In the angular velocity sensor 8, the beams 11a, 11b, 12a, and 12b are formed linearly, and therefore the coupling parts 87a to 87d need to be formed in an area on an outside of the frame 10 shown by L2, for example. On the other hand, in the angular velocity sensor 7, the beams 111a, 111b, 112a, and 112b are formed in the shape of an arch and the coupling end portions wa to wd of the coupling parts 86a to 86d are formed linearly as described above, and therefore the coupling parts 86a to 86d can be formed in an area smaller than L2 as shown by L1, for example.

Specifically, if the middle portions of the beams in the frame project in the shape of an arch toward the inside of the frame, then concaves in the shape of an arch are formed on the outsides of the middle portions of the beams. Disposing the coupling parts partially at the concaves allows compact placement of the coupling parts and miniaturization of the angular velocity sensor. From the standpoint of not inhibiting strain deformation of the frame by the influence of oscillation mode or Coriolis force, the coupling parts need to be lower in elasticity to some degree, and therefore the coupling parts may be provided with at least one bend portion, preferably two or more bend portions. If two each bend portions of the coupling parts are arranged at the concaves on the outside of the beams of the frame, as shown in FIG. 26, it is possible to arrange only one each beam of the coupling parts, not bend portions of the same, in a clearance between the four connection parts of the frame and the base. This allows both size reduction of the angular velocity sensor and provision of drive detection characteristics by maintaining elasticity of the coupling parts.

According to this embodiment as described above, it is possible to realize size reduction of the angular velocity sensor. In addition, according to the angular velocity sensor 7 of this embodiment, it is possible to make smaller space between the beams 111a, 111b, 112a, and 112b and the pendulum parts 21a, 21b, 22a, and 22b. Accordingly, if the frame 110 is formed from one silicon substrate using an etching technique, it is possible to reduce an area to be removed by etching and realize stable etching due to smaller distribution of density in an etching area. Accordingly, the angular velocity sensor can be formed with high accuracy.

Although the foregoing are descriptions on embodiments of the present invention, the present invention is not limited to these embodiments. The embodiments can be modified in various manners on the basis of the technical idea of the present invention.

Figure 28:
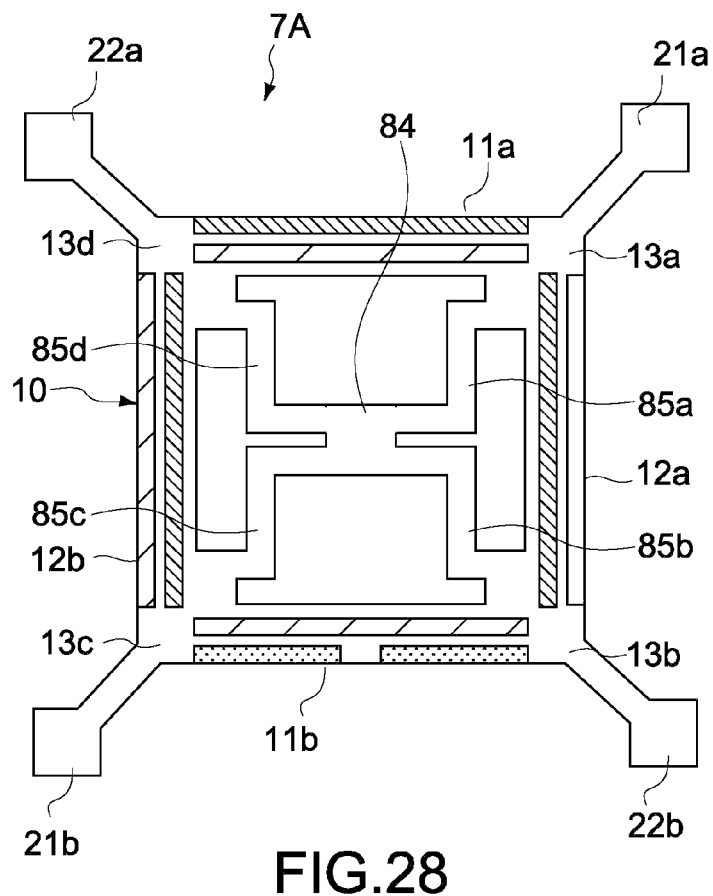
FIG. 28 is a plane view of one modification example of a configuration of the angular velocity sensor shown in FIG. 18.

For example, in the foregoing embodiments, the pendulum parts 21a, 21b, 22a, and 22b of the frame 10 are formed so as to project from the connection parts 13a to 13d toward the inside of the frame 10, respectively. The present invention is not limited to this arrangement, and the pendulum parts 21a, 21b, 22a, and 22b may be formed so as to project from the connection parts 13a to 13d toward the outside of the frame 10, as shown in FIG. 28.

In addition, the electrode disposition on the frame 10 may not be limited to the foregoing examples, and may be modified as described below.

(1) Position of Formation

The electrodes to be formed on the frame 10 (the drive electrodes, the detection electrodes, and the reference electrode) may not be formed only on one surface of the frame 10.

For example, these electrodes may be separately disposed on a front surface, back surface, and side surfaces of the frame 10, for example.

(2) Reference Electrode

In the embodiment shown in FIG. 6 and others, the reference electrode 61 is on the outside of the middle portion of the beam 12a. Alternatively, the reference electrode may be formed at a position of formation of the second drive electrode 302. In addition, the reference electrode does not need to be formed on a particularly limited beam, and may be formed any of the beams 11a, 11b, 12a, and 12b.

Figure 29:
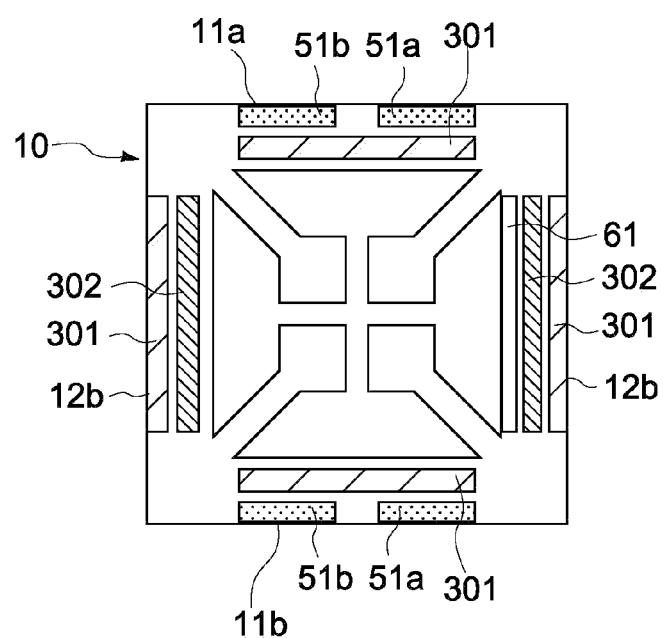
FIG. 29 is a plane view of one modification example of a configuration of the angular velocity sensor shown in FIG. 6.
Figure 30:
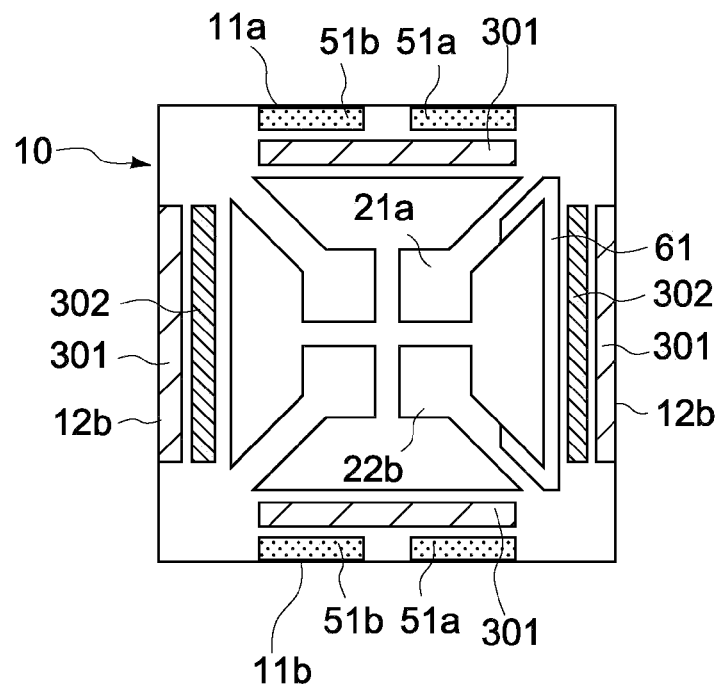
FIG. 30 is a plane view of one modification example of a configuration of the angular velocity sensor shown in FIG. 6.

In the embodiment shown in FIG. 6 and others, the first drive electrode 301 is not formed and the reference electrode 61 is formed instead at a position of formation of the drive electrode 301. Alternatively, the reference electrode 61 may be formed in addition to the first and second drive electrodes 301 and 302, as shown in FIG. 29. The reference electrode 61 may also be formed on the pendulum parts 21a and 22b so as to straddle the beam 12b, as shown in FIG. 30. In the examples shown in FIGS. 29 and 30, the detection electrodes 51a and 51b are disposed not only on the beam 11b but also on the beam 11a.

(3) Detection Electrodes

Figure 31:
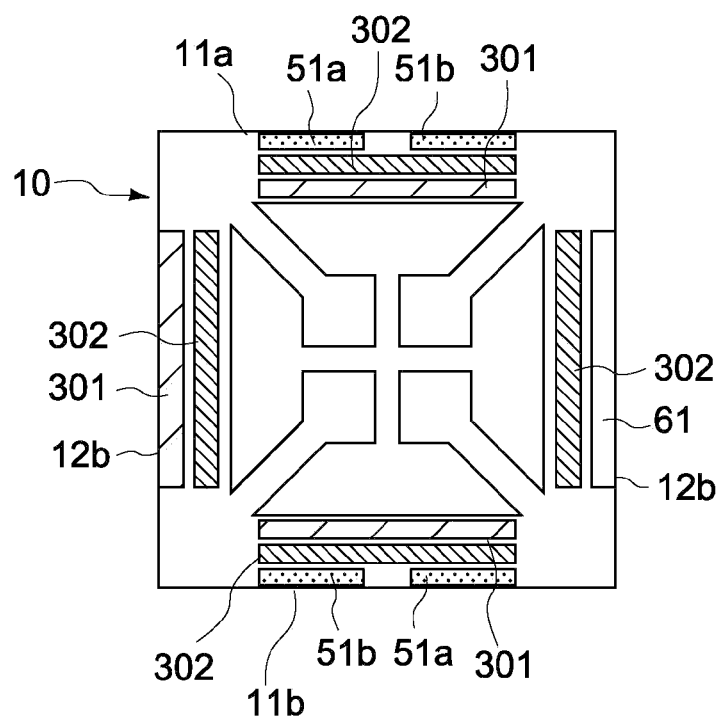
FIG. 31 is a plane view of one modification example of a configuration of the angular velocity sensor shown in FIG. 6.
Figure 32:
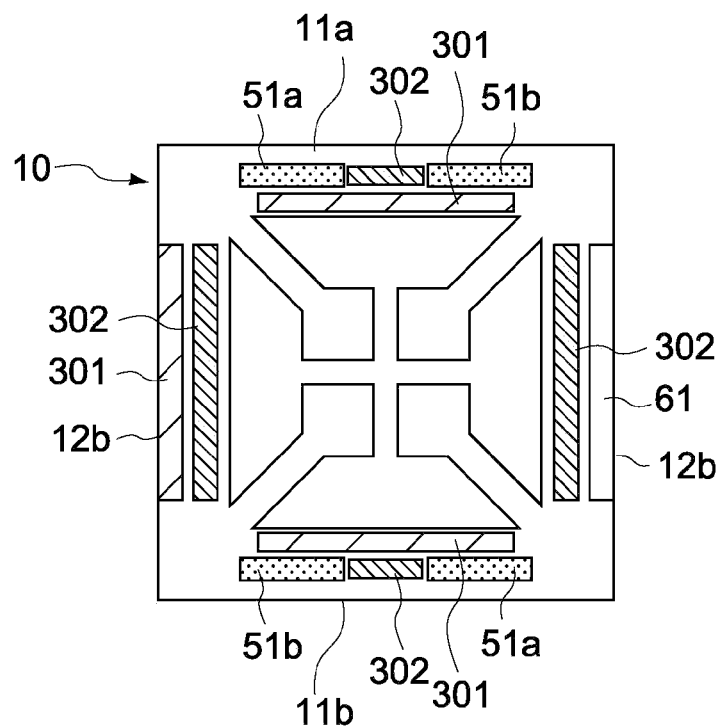
FIG. 32 is a plane view of one modification example of a configuration of the angular velocity sensor shown in FIG. 6.
Figure 33:
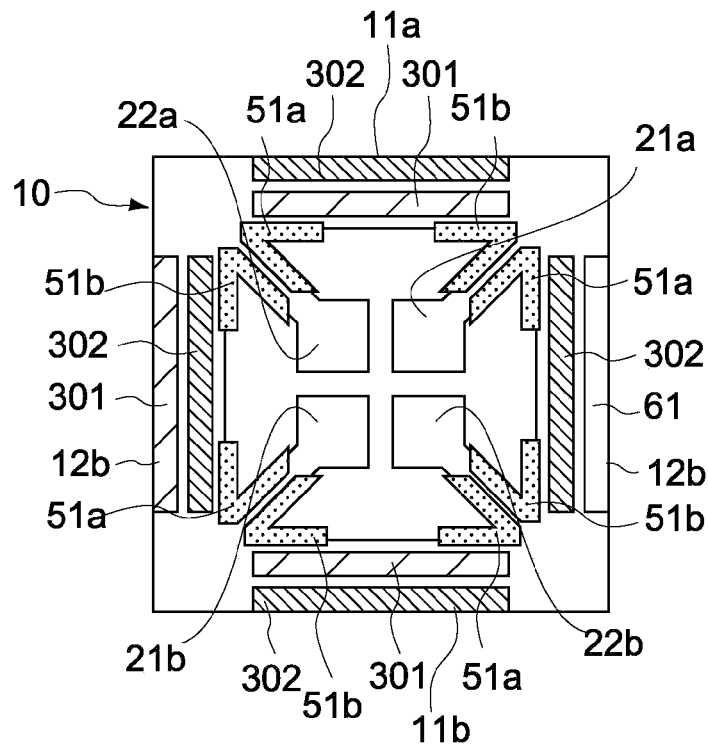
FIG. 33 is a plane view of one modification example of a configuration of the angular velocity sensor shown in FIG. 6.

Similarly, the detection electrodes 51a and 51b for detecting an angular velocity about the Z-axis may not be formed in place of either of the first and second drive electrodes 301 and 301. The detection electrodes 51a and 51b may be formed together with the drive electrodes 301 and 302, as shown in FIGS. 31 and 32. FIG. 31 shows an example in which the second drive electrodes 302 are sandwiched between the first drive electrodes 301 and the pairs of detection electrodes 51a and 51b. FIG. 32 shows an example in which the second drive electrodes 302 are sandwiched between the pairs of detection electrodes 51a and 51b. Alternatively, as shown in FIG. 33, at least one set of detection electrodes 51a and 51b may be formed on the pendulum parts 21a, 21b, 22a, and 22b so as to straddle the beams 11a, 11b, 12a, and 12b.

Figure 34:
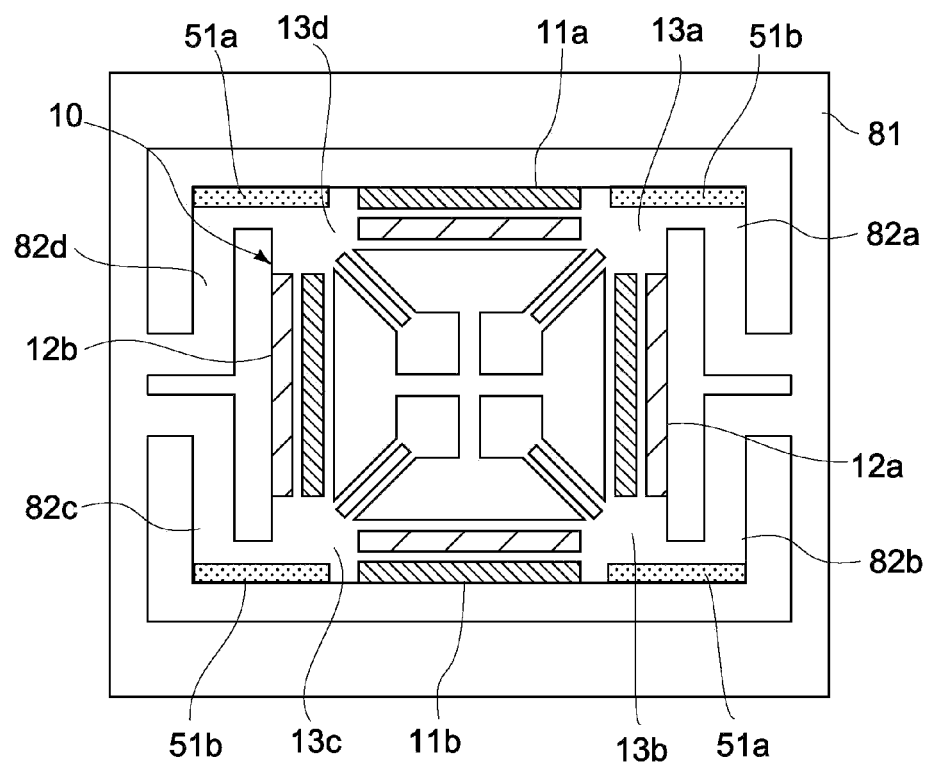
FIG. 34 is a plane view of one modification example of a configuration of the angular velocity sensor shown in FIG. 15.
Figure 35:
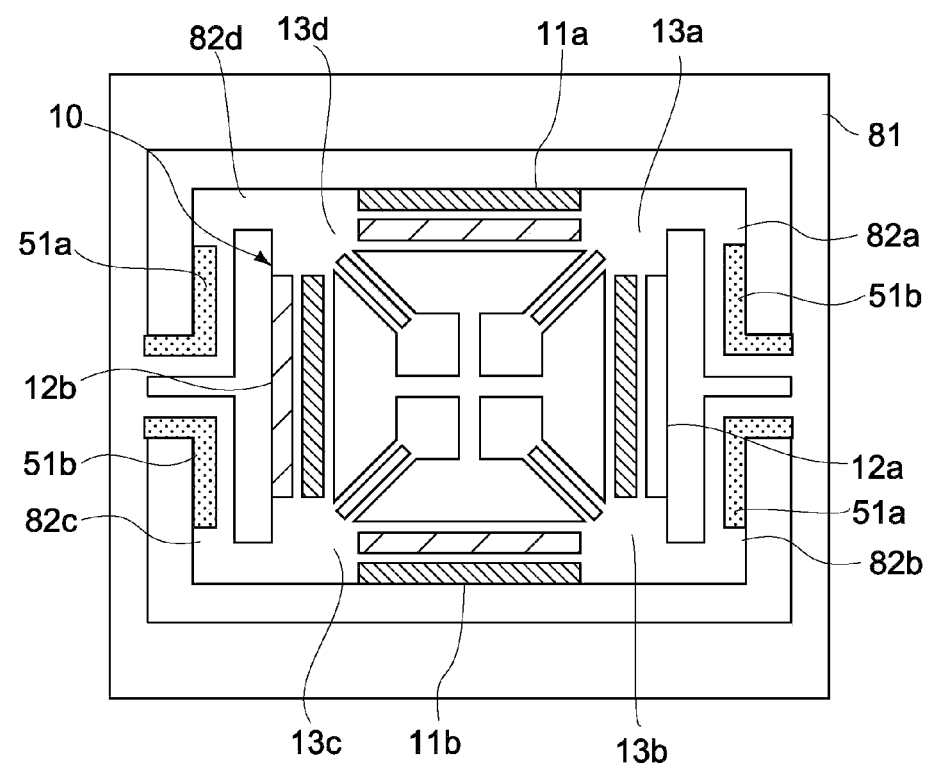
FIG. 35 is a plane view of one modification example of a configuration of the angular velocity sensor shown in FIG. 15.

In the embodiment shown in FIG. 15 and others, the coupling parts 82a to 82d coupling the frame 10 with the base 81 are configured within the XY plane in a deformable manner. Accordingly, the detection electrodes 51a and 51b detecting an angular velocity about the Z-axis may be disposed on the coupling parts. FIGS. 34 and 35 show examples of such a disposition. FIG. 34 shows an example in which the detection electrodes 51a and 51b are disposed on the coupling parts 82a to 82d at the connection parts 13a to 13d side ends. FIG. 35 shows an example in which the detection electrodes 51a and 51b are disposed on the coupling parts 82a to 82d at the base 81 side ends. Besides the foregoing disposition examples, the detection electrodes 51a and 51b may be disposed in middle portions of the both ends of the coupling parts 82a to 82d. In addition, the detection electrodes 51a and 51b may not be formed on all the coupling parts 82a to 82d. For example, the detection electrodes 51a and 51b may be disposed only on either the set of the coupling part 82a and the coupling part 82d or the set of the coupling part 82c and the coupling part 82d.

Figure 36:
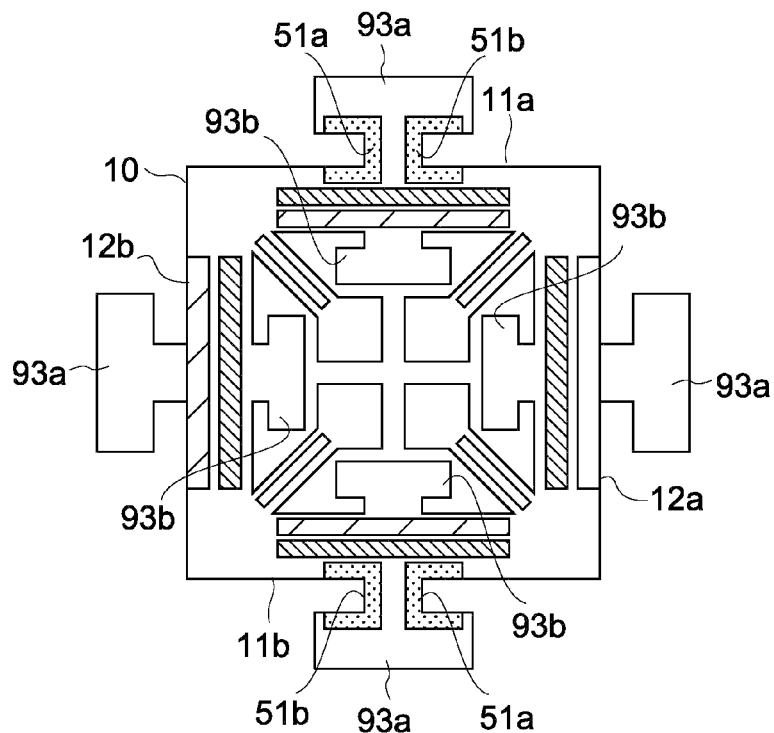
FIG. 36 is a plane view of one modification example of a configuration of the angular velocity sensor shown in FIG. 21.
Figure 37:
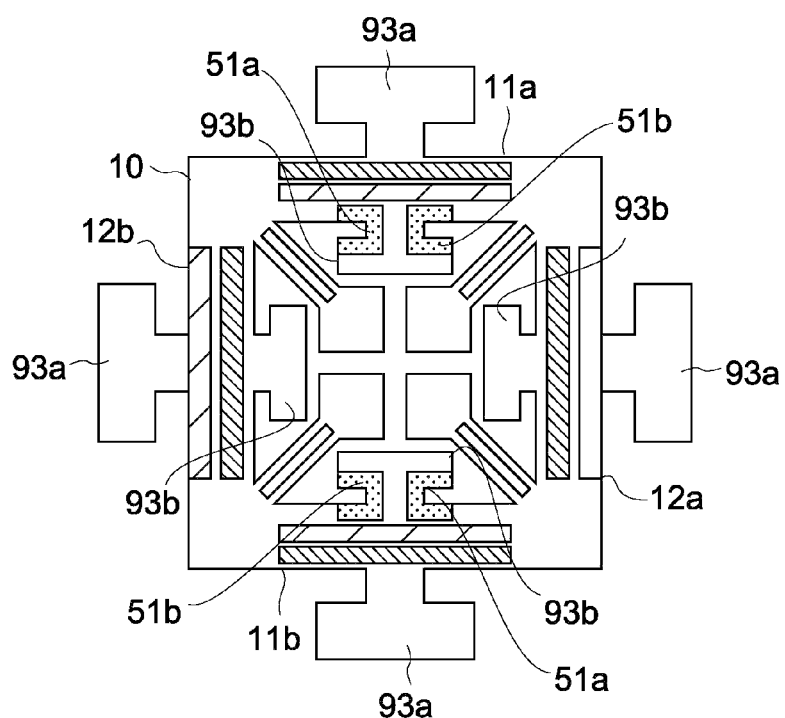
FIG. 37 is a plane view of one modification example of a configuration of the angular velocity sensor shown in FIG. 21.

In the embodiment shown in FIG. 21 and others, if the weight portions 93a and 93b are configured in a deformable manner with respect to the beams 11a, 11b, 12a, and 12b, for example, the detection electrodes 51a and 51b for detecting an angular velocity about the Z-axis may be disposed in deformable areas of the weight portions 93a and 93b. FIG. 36 shows an example in which the detection electrodes 51a and 51b are disposed between the beam 11a and 11b and the weight portions 93a on outsides of the beams. FIG. 37 shows an example in which the detection electrodes 51a and 51b are disposed between the beams 11a and 11b and the weight portions 93b on insides of the beams. Besides the illustrated examples, the detection electrodes 51a and 51b may be disposed on both of the weight portions 93a and 93b or may be formed on all the weight portions of the beams.

Figure 38:
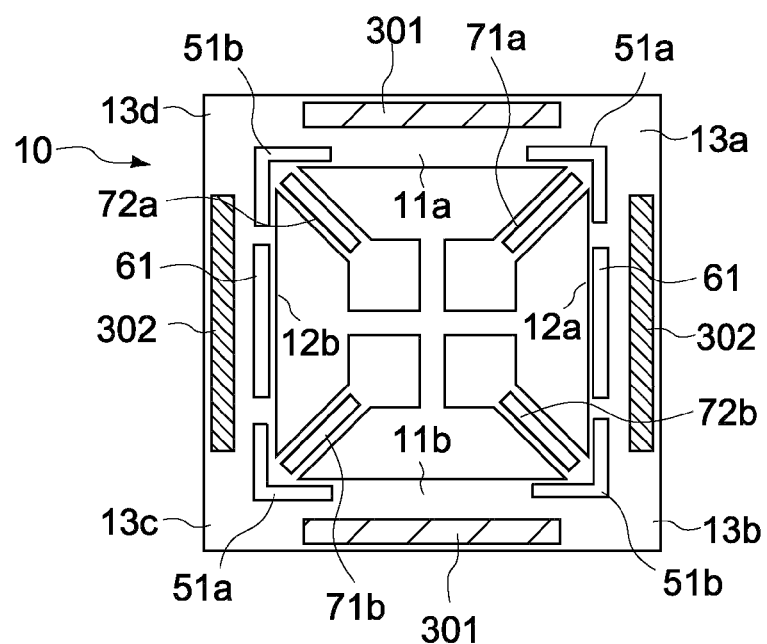
FIG. 38 is a plane view of one modification example of a configuration of the angular velocity sensor shown in FIG. 13.
Figure 39:
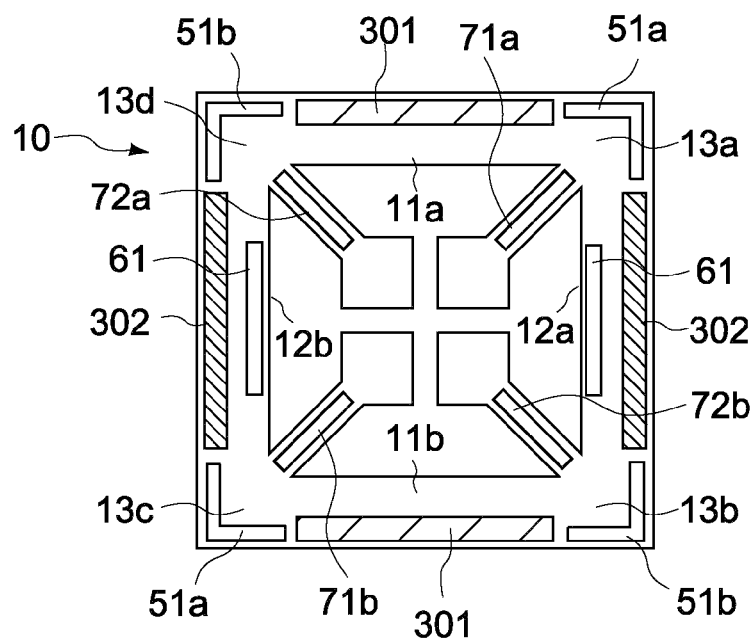
FIG. 39 is a plane view of one modification example of a configuration of the angular velocity sensor shown in FIG. 13.

Further, the detection electrodes for detecting an angular velocity about the Z-axis may be formed in the vicinities of the connection parts connecting the first and second beams, as shown in FIGS. 38 and 39. The vicinities of the connection parts here refer to "connection parts," "connection parts and connection part-adjacent portions of beams connected to the connection parts", or "connection part-adjacent portions of beams connected to the connection parts." For example, the angular velocity sensor shown in FIG. 38 has the detection electrodes 51a and 51b for detecting an angular velocity about the Z-axis formed in the vicinities of the connection parts 13a to 13d on inner periphery sides. The angular velocity sensor shown in FIG. 39 has the detection electrodes 51a and 51b formed in the vicinities of the connection parts 13a to 13d on outer periphery sides.

The detection electrodes 51a are formed in the vicinities of one set of connection parts 13a and 13c in a diagonal relationship. One of the detection electrodes 51a extends from the connection part 13a in two directions along the beams 11a and 12a. The other detection electrode 51a extends from the connection part 13c in two directions along the beams 11b and 12b. In addition, the detection electrodes 51b are formed in the vicinities of the other set of connection parts 13b and 13d in a diagonal relationship. One of the detection electrodes 51b extends from the connection part 13b in two directions along the beams 11b and 12a. The other electrode 51b extends from the connection part 13d in two directions along the beams 11a and 12b.

The detection electrodes extending from the connection parts along the beams are preferably disposed in the vicinities of the connection parts within a range not exceeding ¼ of a length of one side of the frame, from the standpoint of increasing strain detection efficiency.

In the angular velocity sensor shown in FIGS. 38 and 39, when an angular velocity acts about the Z-axis, the frame 10 changes periodically in inner angle as shown in FIG. 5. At that time, one set of connection parts 13a and 13c in a diagonal relationship and the other set of connection parts 13b and 13d in a diagonal relationship vary in inner angle in opposite phases. Therefore, output from the detection electrode 51a on the connection part 13a and output from the detection electrode 51a on the connection part 13c are identical in principle, and output from the detection electrode 51b on the connection part 13b and output from the detection electrode 51b on the connection part 13d are identical in principle. Accordingly, it is possible to detect with high sensitivity the magnitude and direction of an angular velocity about the Z-axis acting on the frame 10 by calculating a difference between the sum of outputs from the two detection electrodes 51a and the sum of outputs from the two detection electrodes 51b.

This calculation may be performed within an IC circuit, inputting the outputs from the four detection electrodes 51a and 51b into the IC circuit. Alternatively, the two sums of outputs from the detection electrodes 51a and 51b may be input into the IC circuit such that only a difference between the two sums are calculated within the IC circuit, because only one equation is defined for calculating an angular velocity about the Z-axis. The sums of outputs may also be realized by connecting the outputs from the two each detection electrodes 51a and 51b on the frame or the substrate on which the angular velocity sensor is mounted. This achieves reduction of IC input terminals in number.

In addition, the angular velocity sensors shown in FIGS. 38 and 39 each have the first drive electrodes 301 in line symmetry on outsides of longitudinal center lines of the first set of beams 11a and 11b, and have the second drive electrodes 302 formed in line symmetry on outsides of longitudinal center lines of the second set of beams 12a and 12b. In this example, the frame 10 is subjected to basic oscillation by piezoelectric oscillation of the first and second drive electrodes 301 and 302 in opposite phases. The reference electrodes 61 are formed in line symmetry on insides of longitudinal center lines of the second beams 12a and 12b, but may also be formed on the first beams 11a and 11b instead.

The drive electrodes preferably have a length of about ½ that of one side of the frame, from the standpoint of improving drive efficiency per unit electric power. Similarly to the drive electrodes, the reference electrodes preferably have a length of about ½ that of one side of the frame, from the standpoint of improving strain detection efficiency.

The electrodes do not necessarily need to be disposed in line symmetry. However, disposing all the drive electrodes, the detection electrodes, and the reference electrodes in line symmetry realizes a stable oscillation mode and an increased detection accuracy, as compared with the cases of other arrangement patterns.

Figure 45:
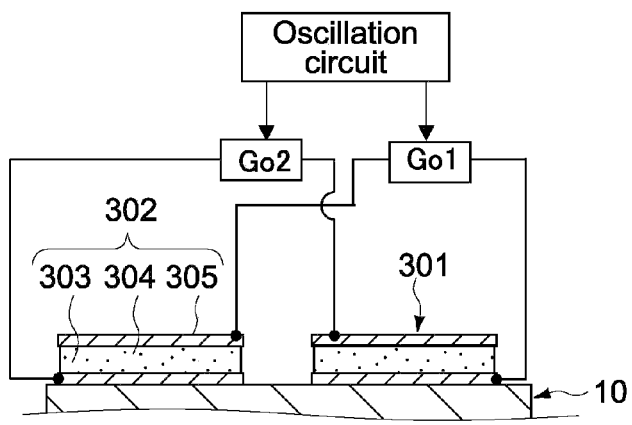
FIG. 45 is a cross-sectional view of major components of the angular velocity sensor as a modification example of the configuration in FIG. 8.

The foregoing embodiments use a circuit in which at least either of the lower and the upper electrodes, two of which sandwich the piezoelectric layers of the drive electrodes, is connected to the reference potential (Vref). In the examples of FIGS. 38 and 39, drive signals are connected in opposite phases to the upper electrodes and the lower electrodes, as shown in FIG. 45. Accordingly, the electrodes can be driven by twofold voltage as compared with the case where only either one is at the reference potential. This makes it possible to prevent decrease in amplitude resulting from the presence of only one drive electrode corresponding to one beam.

The arrangements shown in FIGS. 23 to 39 may be combined to one another or may be incorporated as appropriate into the first to fifth embodiments.

(Adjustment of Angular Velocity Detection Frequencies)

Figure 40:
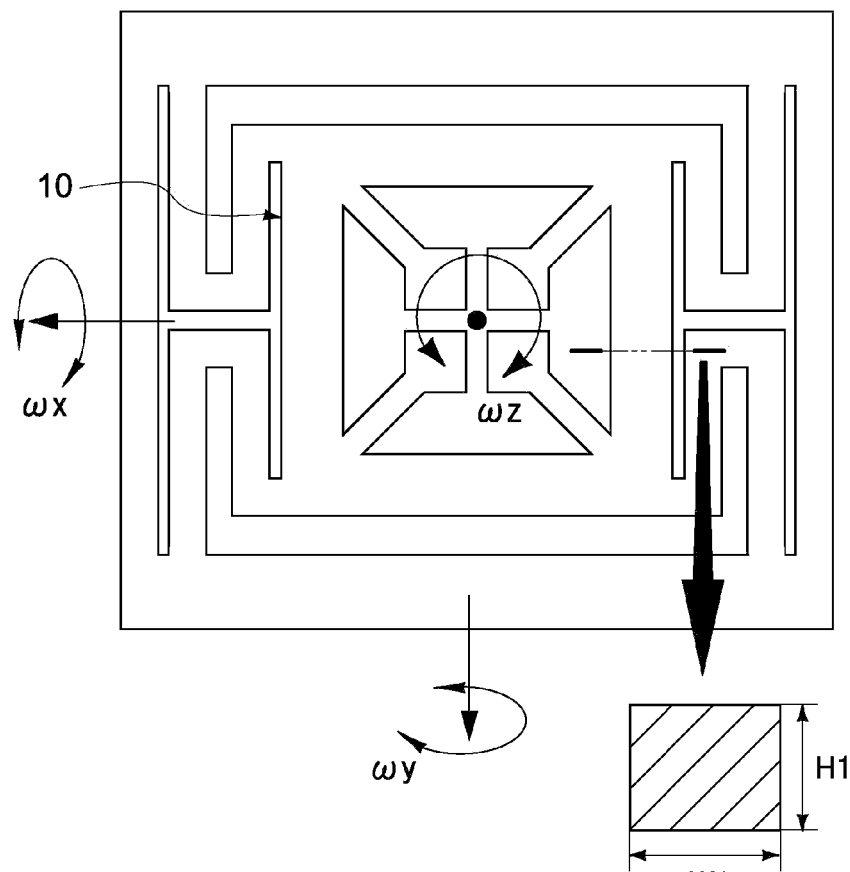
FIG. 40 is a diagram showing a cross-section structure of a beam constituting the frame of the angular velocity sensor shown in FIG. 13.

Meanwhile, for stable detection of angular velocities about the X-, Y-, and Z-axes on a single gyro sensor, it is necessary to make adjustment between a drive frequency and a detection frequency for each of the axes. In general, a gyro sensor is designed such that a drive frequency fd and a detection frequency fs are almost identical. Nevertheless, the values of fd and fs are not made absolutely identical but adjusted in a range of 0.95<(fd/fs)<1.05 in order to provide the stable characteristics. The assumption is made that the beams of the frame 10 each have a width W1 and a thickness H1 as shown in plots of FIGS. 40 and 41. A finite element calculation has revealed that, if W1:H1=1:1, 1.15<(fd/fs)<1.25 holds even with variations in size of the frame 10 or the pendulum parts 21a, 21b, 22a, and 22b. This means that no satisfactory sensitivity for detecting angular velocities about the X-axis and Y-axis can be provided due to a high degree of detuning.

Here, the detection frequency fs is almost proportional to the thickness of the oscillator, whereas the drive frequency fd does not depend on the thickness of the same. Accordingly, if W1 and H1 are set as 1.15≤W1/H1≤1.25, the values of fd and fs can be adjusted so as to satisfy (fd/fs)=1 where the drive frequency of the frame 10 is designated as fd and the detection frequency for angular velocities about the X-axis and Y-axis is designated as fs. Therefore, W/H can be set within a range of 1.1≤W/H≤1.3 to adjust (fd/fs) within a range of 0.95<(fd/fs)<1.05, for stable characteristics of angular velocity detection.

Figure 41:
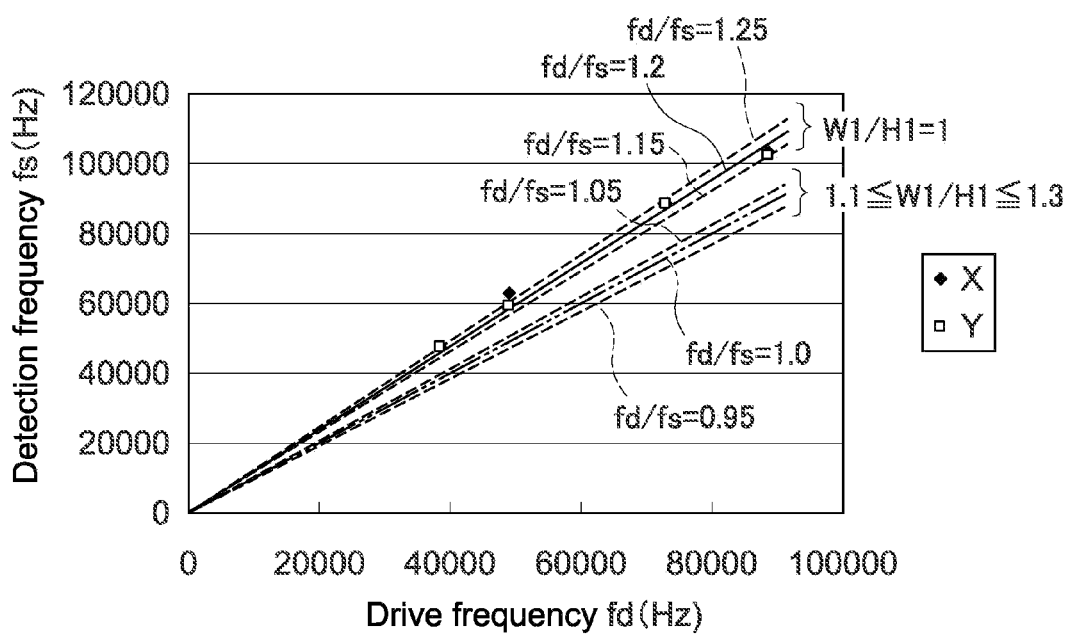
FIG. 41 is a diagram showing relationships among a drive frequency of the angular velocity sensor shown in FIG. 13 and detection frequencies for angular velocities about the X-axis and Y-axis.

FIG. 41 shows a relationship between fd and fs ((fd/fs)≈1.2) with W:H=1:1 by a solid line. By setting 1.1≤W/H≤1.3, it is possible to obtain a relationship 0.95<(fd/fs)<1.05 as shown by a dashed line in FIG. 41.

Figure 42:
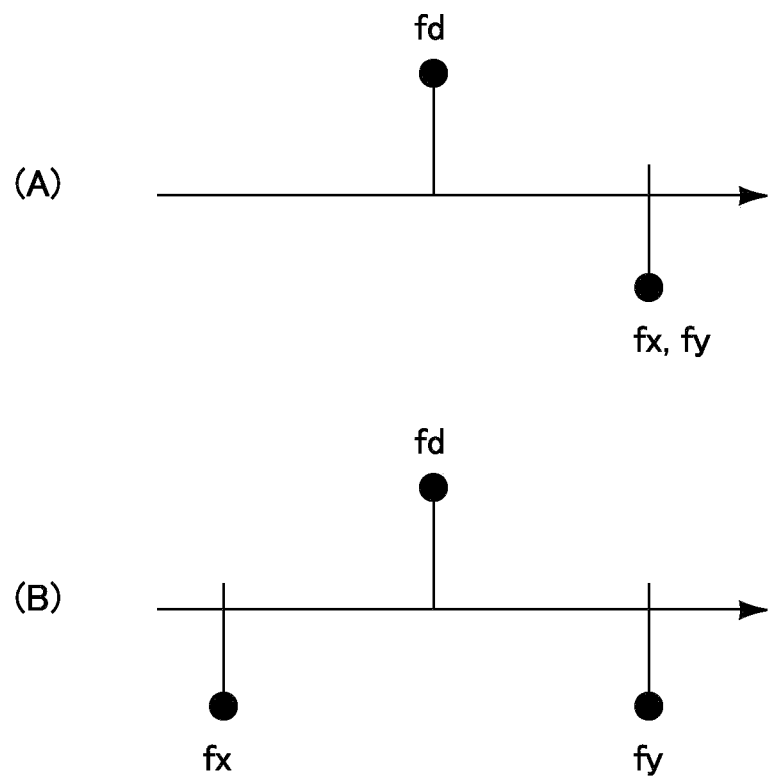
FIG. 42 are diagrams showing relationships among a drive frequency of the angular velocity sensor shown in FIG. 13 and detection frequencies for angular velocities about the X-axis and Y-axis.

The degree of detuning of the drive frequency fd and the detection frequency fs is generally expressed by |fd−fs|. If it is assumed that the detection frequency for an angular velocity about the X-axis is designated as fx and the detection frequency for an angular velocity about the Y-axis is designated as fy, fx and fy are set so as to satisfy relationships with the drive frequency fd, 0.95<(fd/fx)<1.05 and 0.95<(fd/fy)<1.05. For example, fx and fy can be set so as to be identical in magnitude as shown in FIG. 42(A), to thereby obtain a relationship |fd−fx|=|fd−fy|. In this case, however, the oscillation mode at detection of an angular velocity about the X-axis and the oscillation mode at detection of an angular velocity about the Y-axis may be combined to generate an unexpected oscillation mode.

Meanwhile, if fx and fy are set so as to satisfy fx<fd<fy and |fd−fx|=|fd−fy| as shown in FIG. 42(B), it is possible to avoid such combination between the oscillation mode at detection of an angular velocity about the X-axis and the oscillation mode at detection of an angular velocity about the Y-axis, to thereby prevent emergence of an unnecessary oscillation mode. Alternatively, fx and fy may also be set so as to satisfy fy<fd<fx.

In the embodiments including the oscillation weights (weight portions) at the beams of the frame 10, a frequency ratio fd/fs varies slightly with changes in shape and size of the weight portions. For example, if the weight portions increase in size and weight, the detection frequencies fx and fy for angular velocities about the X-axis and Y-axis become lower. Accordingly, the frequency ratio fd/fs can be finely adjusted with the shape of the weight portions.

Figure 43:
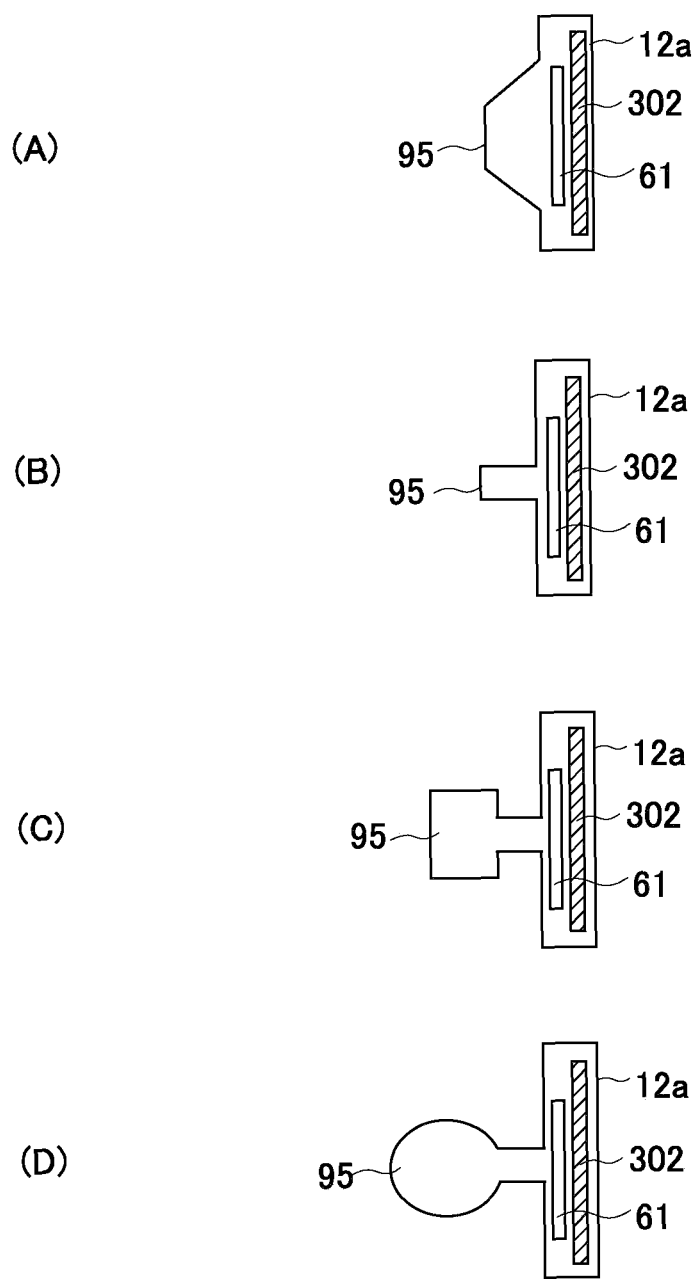
FIG. 43 are diagrams for describing a modification example of major components of the angular velocity sensor shown in FIG. 19.

Meanwhile, FIGS. 43(A) to 43(D) are schematic plane views of the beam 12a having the weight portion and the reference electrode. FIG. 43(A) shows an example in which a width of connection between the weight portion 95 and the beam 12a is made relatively large and the reference electrode 61 is disposed within the width of connection. In this example, since the weight portion 95 is virtually effective in widening the beam 12a, the weight portion 95 suppresses oscillation of the beam 12a so that the oscillation mode of the drive electrode 302 may be inhibited with smaller amplitude. Accordingly, the width of connection between the weight portion 95 and the beam 12a is made as smaller as possible as shown in FIGS. 43(B) to 43(D). This allows the reference electrode 61 to perform proper oscillation detection without inhibition of oscillation of the beam 12a by the weight portion 95. In particular, considering the influence of the weight portion, it is preferred to make the width of the weight portion larger around a leading end and smaller at a connection with the base of the beam, as shown in FIGS. 43(C) and 43(D). There is no particular limitation on the width of connection between the weight portion 95 and the beam 12a. For example, the width of connection may be almost identical to the width of the beam 12a at minimum, from the standpoint of preventing local damage.

For maintaining a stable oscillation mode, the weight portions are desirably provided to both beams in one set of beams. More preferably, the weight portions are provided to all the four beams in the both sets of beams.

The weight portions may be provided on either the inner edge side or the outer edge side of each beam or on the both edge sides of the same. However, the weight portions are desirably provided on only the inner edge side, in terms of miniaturization of the angular velocity sensor.

(Others)

In the foregoing embodiments, the frame 10 is constituted by monocrystalline silicon on which a thin-film piezoelectric drive layer is formed. Alternatively, the frame 10 may be formed by any other material such as carbon or elinvar alloy, or may be formed by any other piezoelectric material such as crystal or lithium niobate. In addition, the piezoelectric drive layers oscillating the frame 10 may be formed not on all the beams but on only one beam in each set of beams. Further, the piezoelectric drive layer may be constituted not by the first and second drive electrodes 301 and 302 but by a single piezoelectric driver. Moreover, the drive source for oscillating the frame 10 is not limited to piezoelectric drive, and may be any other drive system such as electromagnetic drive and electrostatic drive.

In the foregoing embodiments, the angular velocity sensor is formed by one silicon substrate. Alternatively, the angular velocity sensor can be formed by a laminated plate such as an SOI substrate with a plurality of laminated substrates.

Figure 44:
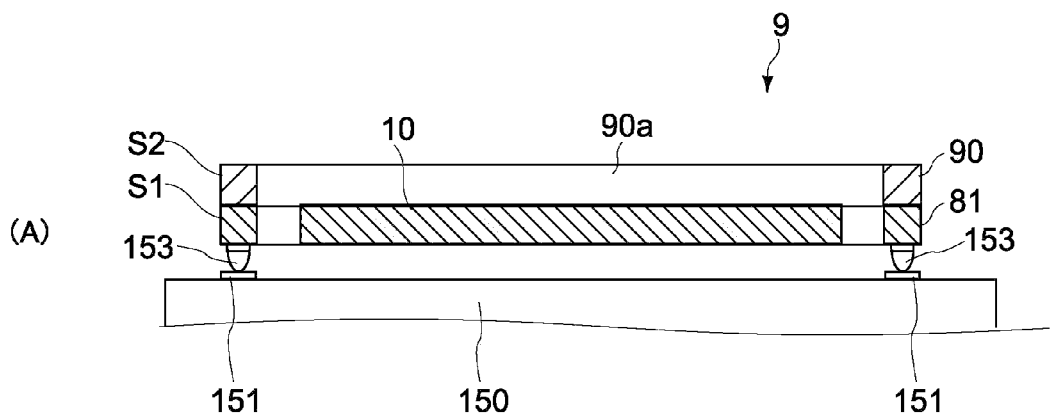
FIG. 44 are cross-sectional views of one modification example of a configuration of the angular velocity sensor shown in FIG. 16.
Figure 44:
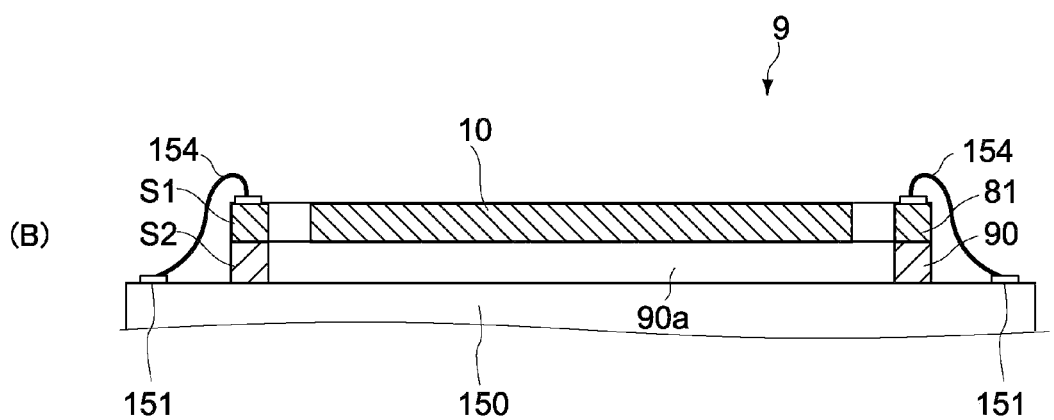

FIGS. 44(A) and 44(B) show an angular velocity sensor 9 constituted by a laminate of a first silicon substrate S1 and a second silicon substrate S2. The first silicon substrate S1 has a frame 10, a base 81, and coupling parts for coupling the two. The second silicon substrate S2 is attached to the first silicon substrate S1 via a silicon oxide film, and has an opening 90a. The opening 90a constitutes an oscillation space of the frame 10. The frame 10 and the coupling parts are made identical in thickness to the first silicon substrate S1 and thus are not subject to influence of manufacturing processes. Accordingly, the frame 10 and the coupling parts have few variations in thickness, which provides stable characteristics of frame oscillation. In addition, the coupling parts are capable of supporting the frame stably without inhibiting strain deformation of the frame due to an oscillation mode or Coriolis force. The second silicon substrate S2 is laminated on the base 81 to enhance the base 81 in mechanical strength. This improves handling properties of the product at the time of manufacture.

The base is provided with a plurality of electrode pads for electrical and mechanical connection with the circuit substrate 150. When the angular velocity sensor is mounted by the flip-chip method as shown in FIG. 44(A), the second silicon substrate exerts a stiffening effect to prevent deformation and damage of the base. In addition, a cap is disposed on the substrate to protect the angular velocity sensor 9 from mechanical damage and affection of ambient light. Since the base is formed in the shape of a box and made thicker than the frame by the thickness of the silicon substrate S2, a clearance between the base and the cap may be smaller than usual, for example, 0.2 mm or less. Accordingly, the angular velocity sensor including the cap can be made thin without any influence of the cap on operation of the frame.

The angular velocity sensor may be mounted not by the foregoing method but by the wire-bonding method as shown in FIG. 44(B). In this case, the angular velocity sensor 9 is reversed with respect to the circuit substrate 150 as compared with the example shown in FIG. 44(A), that is, the angular velocity sensor 9 is mechanically connected with adhesion or the like to the circuit substrate 150 such that the plurality of electrode pads are located upside. Subsequently, bonding is made via bonding wires 154 to electrically connect lands 151 on the circuit substrate 150 on the outside of the angular velocity sensor and the electrode pads on the base of the angular velocity sensor. In this case, it is also possible to prevent damage of the base at adhesion and wire bonding, owing to the stiffening effect of the second silicon substrate.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

DESCRIPTION OF SYMBOLS 1 to 4, 5A to 5C, 6A to 6D, and 7 to 9 angular velocity sensor
10 frame
11a, 11b, 12a, 12b, 111a, 111b, 112a, and 112b beam
13a, 13b, 13c, and 13d connection part
21a, 21b, 22a, and 22b pendulum part
31a and 31b piezoelectric drive layer
51 piezoelectric drive layer
51a and 51b detection electrode (for detecting angular velocity about Z-axis)
61 reference electrode
71a and 71b detection electrode (for detecting angular velocity about X-axis)
72a and 72b detection electrode (for detecting angular velocity about Y-axis)
81 and 84 base
82a to 82d, 83a to 83d, and 84a to 84d coupling part
91, 92a, 92b, 93a, 93b, 94a, 94b, and 95 weight portion
100A to 100D drive circuit
150 circuit substrate
301 and 302 drive electrode
303 lower electrode layer
304 piezoelectric material layer
305 upper electrode layer

The invention claimed is:

1. An angular velocity sensor comprising:
   an annular frame having:
   (a) a first set of beams extending in a first direction and opposed to each other in a second direction orthogonal to the first direction;
   (b) a second set of beams extending in the second direction and opposed to each other in the first direction; and
   (c) a plurality of connection parts connecting the first beams and the second beams;
   a drive part configured to cause the annular frame to oscillate within a first plane to which the first and second directions belong, in an oscillation mode where, when one of the first and second sets of beams comes closer to each other, the other set separates from each other, and when the one set separates from each other, the other set comes closer to each other;
   a first detection part configured to detect an angular velocity about an axis in a third direction orthogonal to the first and second directions, based on an amount of deformation of the annular frame oscillating in the oscillation mode within the first plane;
   a support part which is connected to the connection parts to support the annular frame;
   a first pendulum part which is disposed at the connection parts so as to extend in a fourth direction intersecting with the first and second directions within the first plane, and oscillates within the first plane in synchronization with oscillation of the annular frame;
   a second pendulum part which is disposed at the connection parts so as to extend in a fifth direction intersecting with the first, second, and fourth directions within the first plane, and oscillates within the first plane in synchronization with oscillation of the annular frame; and
a second detection part which detects angular velocities about axes in two predetermined directions within the first plane, based on amounts of deformation of the first and second pendulum parts in directions orthogonal to the first plane.

2. The angular velocity sensor of claim 1, wherein the second detection part detects angular velocities about axes in the first and second directions.

3. The angular velocity sensor of claim 1, wherein the second detection part includes a piezoelectric layer disposed on the first and second pendulums to detect electrically deformation of the first and second pendulum parts in directions orthogonal to the first plane.

4. The angular velocity sensor of claim 1, wherein the drive part includes piezoelectric drive layers disposed on the first and second beams.

5. The angular velocity sensor of claim 1, which includes:
   (a) a reference part which is disposed on at least one of the first and second beams; and
   (b) a piezoelectric layer for detecting deformation of the beam due to oscillation in the oscillation mode.

6. The angular velocity sensor of claim 1, wherein the support part includes:
   (a) a base fixed mechanically to a fixing part; and
   (b) coupling parts that connect the base with the connection parts and are capable of deformation.

7. The angular velocity sensor of claim 6, wherein the base is formed in the shape of a box surrounding an outside of the annular frame.

8. The angular velocity sensor of claim 6, wherein the base includes an electrode pad connected electrically to the fixing part.

9. The angular velocity sensor of claim 1, wherein the annular frame includes a weight portion formed on at least one of the first and second beams.

10. An angular velocity sensor comprising:
    an annular frame having:
      (a) a first set of beams extending in a first direction and opposed to each other in a second direction orthogonal to the first direction;
      (b) a second set of beams extending in the second direction and opposed to each other in the first direction; and
      (c) a plurality of connection parts connecting the first beams and the second beams;
    a drive part configured to cause the annular frame to oscillate within a first plane to which the first and second directions belong, in an oscillation mode where, when one of the first and second sets of beams comes closer to each other, the other set separates from each other, and when the one set separates from each other, the other set comes closer to each other;
    a first detection part configured to detect an angular velocity about an axis in a third direction orthogonal to the first and second directions, based on an amount of deformation of the annular frame oscillating in the oscillation mode within the first plane;
    a support part which is connected to the connection parts to support the annular frame;
    a first pendulum part which is disposed at the connection parts so as to extend in a fourth direction intersecting with the first and second directions within the first plane, and oscillates within the first plane in synchronization with oscillation of the annular frame; and
    a second detection part which detects an angular velocity about an axis in the fourth direction, on the basis of an amount of deformation of the first pendulum part in a direction orthogonal to the first plane;
    a second pendulum part which is disposed at the connection parts so as to extend in a fifth direction intersecting with the first, second, and fourth directions within the first plane, and oscillates within the first plane in synchronization with oscillation of the annular frame; and
    a third detection part which detects an angular velocity about an axis in the fifth direction, based on an amount of deformation of the second pendulum part in a direction orthogonal to the first plane.

11. The angular velocity sensor of claim 10, wherein:
    (a) the second detection part includes a piezoelectric layer disposed on the first pendulum part to detect electrically deformation of the first pendulum part in a direction orthogonal to the first plane; and
    (b) the third detection part includes a piezoelectric layer disposed on the second pendulum part to detect electrically deformation of the second pendulum part in a direction orthogonal to the first plane.

12. The angular velocity sensor of claim 1, wherein the first detection part is disposed on at least one of the first and second beams and includes a piezoelectric layer for detecting electrically deformation of the beam.

13. The angular velocity sensor of claim 1, wherein the first and second beams have projection parts projecting toward an inside of the annular frame.

14. An angular velocity sensor comprising:
    an annular frame having a first set of beams extending in a first direction and opposed to each other in a second direction orthogonal to the first direction, a second set of beams extending in the second direction and opposed to each other in the first direction, and a plurality of connection parts connecting the first beams and the second beams;
    a drive part to cause the annular frame to oscillate within a first plane to which the first and second directions belong, in an oscillation mode where, when one of the first and second sets of beams comes closer to each other, the other set separates from each other, and when the one set separates from each other, the other set comes closer to each other;
    a first pendulum part which is disposed at the connection parts so as to extend in a third direction intersecting with the first and second directions within the first plane, and oscillates within the first plane in synchronization with oscillation of the annular frame;
    a second pendulum part which is disposed at the connection parts so as to extend in a fourth direction intersecting with the first, second, and third directions within the first plane, and oscillates within the first plane in synchronization with oscillation of the annular frame;
    a detection part to detect angular velocities about axes in two predetermined directions within the first plane, based on amounts of deformation of the first and second pendulum parts in directions orthogonal to the first plane; and
    a support part which is connected to the connection parts to support the annular frame.

15. An electronic apparatus equipped with an angular velocity sensor comprising:
    an annular frame having a first set of beams extending in a first direction and opposed to each other in a second direction orthogonal to the first direction, a second set of beams extending in the second direction and opposed to each other in the first direction, and a plurality of connection parts connecting the first beams and the second beams;
a drive part to cause the annular frame to oscillate within a plane to which the first and second directions belong, in an oscillation mode where, when one of the first and second sets of beams comes closer to each other, the other set separates from each other, and when the one set separates from each other, the other set comes closer to each other;
a first detection part to detect an angular velocity about an axis in a third direction orthogonal to the first and second directions, based on an amount of deformation of the annular frame oscillating in the oscillation mode within the plane;
a support part which is connected to the connection parts to support the annular frame
a first pendulum part which is disposed at the connection parts so as to extend in a fourth direction intersecting with the first and second directions within the first plane, and oscillates within the first plane in synchronization with oscillation of the annular frame;
a second pendulum part which is disposed at the connection parts so as to extend in a fifth direction intersecting with the first, second, and fourth directions within the first plane, and oscillates within the first plane in synchronization with oscillation of the annular frame; and
a second detection part which detects angular velocities about axes in two predetermined directions within the first plane, based on amounts of deformation of the first and second pendulum parts in directions orthogonal to the first plane.

16. A method of detecting an angular velocity comprising:
supporting by a support part an annular frame having a first set of beams extending in a first direction and opposed to each other in a second direction orthogonal to the first direction, a second set of beams extending in the second direction and opposed to each other in the first direction, and a plurality of connection parts connecting the first beams and the second beams, the support part being connected to the connection parts;
oscillating the annular frame within a first plane to which the first and second directions belong, in an oscillation mode where, when one of the first and second sets of beams comes closer to each other, the other set separates from each other, and when the one set separates from each other, the other set comes closer to each other; and
detecting an angular velocity about an axis in a third direction orthogonal to the first and second directions, on the basis of an amount of deformation of the annular frame oscillating in the oscillation mode within the first plane,
wherein:
(a) a first pendulum part which is disposed at the connection parts so as to extend in a fourth direction intersecting with the first and second directions within the first plane, and oscillates within the first plane in synchronization with oscillation of the annular frame;
(b) a second pendulum part which is disposed at the connection parts so as to extend in a fifth direction intersecting with the first, second, and fourth directions within the first plane, and oscillates within the first plane in synchronization with oscillation of the annular frame; and
(c) a detection part which detects angular velocities about axes in two predetermined directions within the first plane, based on amounts of deformation of the first and second pendulum parts in directions orthogonal to the first plane.

* * * * *